United States Patent [19]

Yamashita et al.

[11] Patent Number: 5,785,890
[45] Date of Patent: Jul. 28, 1998

[54] LIQUID CRYSTAL COMPOSITION, LIQUID CRYSTAL DEVICE, AND LIQUID CRYSTAL DISPLAY APPARATUS USING SAME

[75] Inventors: Masataka Yamashita, Chigasaki; Kazuharu Katagiri, Tama; Masahiro Terada, Hadano; Shosei Mori, Hiratsuka; Syuji Yamada, Atsugi; Hiroshi Mizuno, Zama; Ikuo Nakazawa; Koji Noguchi, both of Atsugi, all of Japan

[73] Assignee: Canon Kabushiki Kaisha, Tokyo, Japan

[21] Appl. No.: 729,575

[22] Filed: Oct. 11, 1996

[30] Foreign Application Priority Data

Oct. 12, 1995 [JP] Japan ..................... 7-289162

[51] Int. Cl.$^6$ ................. C09K 19/32; C09K 19/34
[52] U.S. Cl. ................. 252/299.62; 252/299.61
[58] Field of Search ................ 252/299.61, 299.62

[56] References Cited

U.S. PATENT DOCUMENTS

| | | | |
|---|---|---|---|
| 4,367,924 | 1/1983 | Clark et al. | 350/334 |
| 4,655,561 | 4/1987 | Kanbe et al. | 359/56 X |
| 4,798,680 | 1/1989 | Nohira et al. | 252/299.01 |

(List continued on next page.)

FOREIGN PATENT DOCUMENTS

| | | |
|---|---|---|
| 0546338 | 6/1993 | European Pat. Off. . |
| 0604921 | 7/1994 | European Pat. Off. . |
| 0640677 | 3/1995 | European Pat. Off. . |
| 0647695 | 4/1995 | European Pat. Off. . |
| 0648826 | 4/1995 | European Pat. Off. . |
| 0711818 | 5/1996 | European Pat. Off. . |
| 59-193426 | 11/1984 | Japan . |
| 59-193427 | 11/1984 | Japan . |
| 60-031120 | 2/1985 | Japan . |
| 60-156046 | 8/1985 | Japan . |
| 60-156047 | 8/1985 | Japan . |
| 62-093248 | 4/1987 | Japan . |
| 62-198633 | 9/1987 | Japan . |
| 63-022042 | 1/1988 | Japan . |
| 63-088161 | 4/1988 | Japan . |
| 63-104949 | 5/1988 | Japan . |
| 63-107951 | 5/1988 | Japan . |
| 63-122651 | 5/1988 | Japan . |
| 63-192732 | 8/1988 | Japan . |
| 63-196553 | 8/1988 | Japan . |
| 63-196571 | 8/1988 | Japan . |

(List continued on next page.)

OTHER PUBLICATIONS

N.A. Clark et al., Structures and Applications of SSFLC Devices, Sep. 30–Oct. 2, 1986, pp. 456–458.

Yukio Ouchi et al, Smetic C* Chevron Layer Structure Studied by X-Ray Diffraction, Apr. 18, 1988, pp. L725–L728.

Fumio Nakano et al, Simple Method of Determining Liquid Crystal Tilt-Bias Angle, Jpn. J. Appl. Phys. 19 (1980), No. 19, pp. 2013–2014.

Keita Miyasato et al., Direct Method with Triangular Waves for Measuring Spontaneous Polarization in Ferroelectric Liquid Crystals, Jpn. J. Appl. Phys. Letters 22(1983), No. 10, pp. L661–L663.

Primary Examiner—C. H. Kelly
Attorney, Agent, or Firm—Fitzpatrick, Cella, Harper & Scinto

[57] ABSTRACT

A liquid crystal composition comprises at least three compounds represented by formulae (A), (B) and (C), respectively as in Claim 1. The compound of the formula (A) has an indan skeleton, the compound of the formula (B) has a quinoxaline skeleton, and the compound of the formula (C) has a pyrimidine skeleton or a benzothiazole skeleton and a terminal cyclic group comprising a cyclohexyl group or a phenyl group. The liquid crystal composition is effective in improving a display quality and drive characteristics of a liquid crystal device using the composition when the liquid crystal device is continuously driven for a long time.

18 Claims, 13 Drawing Sheets

U.S. PATENT DOCUMENTS

| | | | |
|---|---|---|---|
| 4,867,903 | 9/1989 | Nohira et al. | 252/299.61 |
| 4,873,018 | 10/1989 | Nohira et al. | 252/299.01 |
| 4,904,410 | 2/1990 | Nohira et al. | 252/299.61 |
| 4,917,821 | 4/1990 | Mori et al. | 252/299.63 |
| 4,918,213 | 4/1990 | Nohira et al. | 558/271 |
| 5,073,306 | 12/1991 | Nohira et al. | 252/299.61 |
| 5,076,961 | 12/1991 | Nakamura et al. | 252/299.61 |
| 5,091,723 | 2/1992 | Kanno et al. | 340/784 |
| 5,092,665 | 3/1992 | Kanbe et al. | 359/56 |
| 5,093,737 | 3/1992 | Kanbe et al. | 359/56 |
| 5,098,600 | 3/1992 | Nakamura et al. | 252/299.61 |
| 5,119,219 | 6/1992 | Tereda et al. | 359/56 |
| 5,172,107 | 12/1992 | Kanno et al. | 340/784 |
| 5,189,536 | 2/1993 | Hanyu et al. | 359/56 |
| 5,190,690 | 3/1993 | Takiguchi et al. | 252/299.61 |
| 5,194,177 | 3/1993 | Nohira et al. | 252/299.61 |
| 5,213,709 | 5/1993 | Takiguchi et al. | 252/299.61 |
| 5,217,644 | 6/1993 | Nohira et al. | 252/299.6 |
| 5,236,619 | 8/1993 | Iwaki et al. | 252/299.61 |
| 5,284,599 | 2/1994 | Iwaki et al. | 252/299.61 |
| 5,328,639 | 7/1994 | Nohira et al. | 252/299.61 |
| 5,381,254 | 1/1995 | Kanbe et al. | 359/54 |
| 5,381,256 | 1/1995 | Hanyu et al. | 359/75 |
| 5,385,692 | 1/1995 | Iwaki et al. | 252/299.62 |
| 5,418,634 | 5/1995 | Kanbe et al. | 359/56 |
| 5,460,749 | 10/1995 | Terada et al. | 252/299.61 |
| 5,462,694 | 10/1995 | Kosaka et al. | 252/299.61 |
| 5,481,387 | 1/1996 | Hanyu et al. | 359/78 |
| 5,512,209 | 4/1996 | Takiguchi et al. | 252/299.61 |
| 5,580,488 | 12/1996 | Nakamura et al. | 252/299.61 |
| 5,582,763 | 12/1996 | Yamada et al. | 252/299.01 |
| 5,589,103 | 12/1996 | Yamada et al. | 252/299.61 |

FOREIGN PATENT DOCUMENTS

| | | |
|---|---|---|
| 63-215661 | 9/1988 | Japan . |
| 63-216878 | 9/1988 | Japan . |
| 63-218647 | 9/1988 | Japan . |
| 63-225337 | 9/1988 | Japan . |
| 63-243059 | 10/1988 | Japan . |
| 63-303951 | 12/1988 | Japan . |
| 64022990 | 1/1989 | Japan . |
| 640341740 | 2/1989 | Japan . |
| 64038077 | 2/1989 | Japan . |
| 01121244 | 5/1989 | Japan . |
| 01140198 | 6/1989 | Japan . |
| 01160986 | 6/1989 | Japan . |
| 01207280 | 8/1989 | Japan . |
| 01242543 | 9/1989 | Japan . |
| 01265052 | 10/1989 | Japan . |
| 01272571 | 10/1989 | Japan . |
| 02000127 | 1/1990 | Japan . |
| 0200227 | 1/1990 | Japan . |
| 02028158 | 1/1990 | Japan . |
| 02069427 | 3/1990 | Japan . |
| 02069440 | 3/1990 | Japan . |
| 02069467 | 3/1990 | Japan . |
| 02115145 | 4/1990 | Japan . |
| 02295943 | 12/1990 | Japan . |
| 03035220 | 2/1991 | Japan . |
| 03043488 | 2/1991 | Japan . |
| 03058980 | 3/1991 | Japan . |
| 03193774 | 8/1991 | Japan . |
| 03223232 | 10/1991 | Japan . |
| 03227980 | 10/1991 | Japan . |
| 03236353 | 10/1991 | Japan . |
| 03252624 | 11/1991 | Japan . |
| 04013977 | 1/1992 | Japan . |
| 04253789 | 9/1992 | Japan . |
| 04264052 | 9/1992 | Japan . |
| 04300871 | 10/1992 | Japan . |
| 05262678 | 10/1993 | Japan . |
| 05273537 | 10/1993 | Japan . |
| 06242450 | 9/1994 | Japan . |
| 06256231 | 9/1994 | Japan . |
| 07010849 | 1/1995 | Japan . |
| 07118178 | 12/1995 | Japan . |

C1 ALIGNMENT   $\text{H} + \delta > \alpha$

C2 ALIGNMENT   $\text{H} - \delta > \alpha$

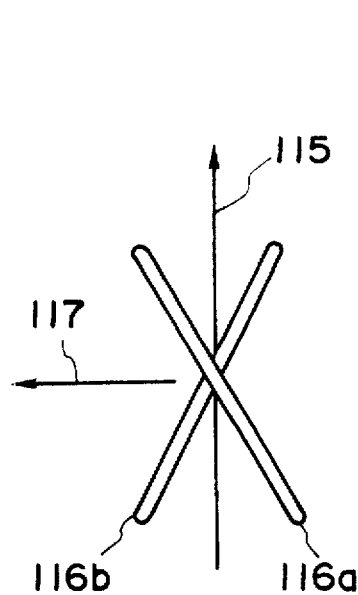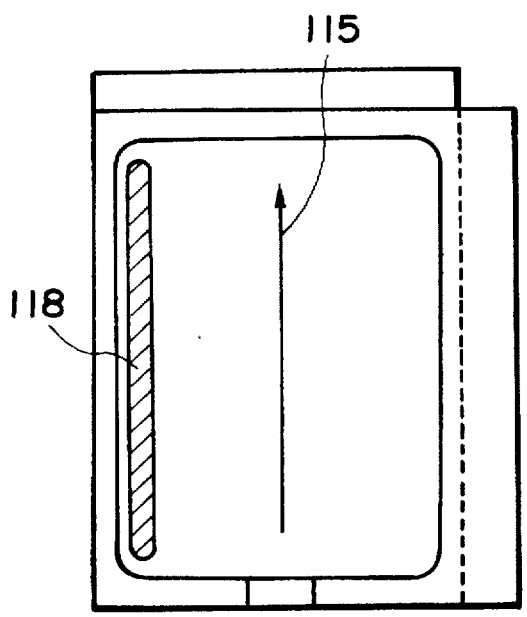
FIG. 11A  FIG. 11B
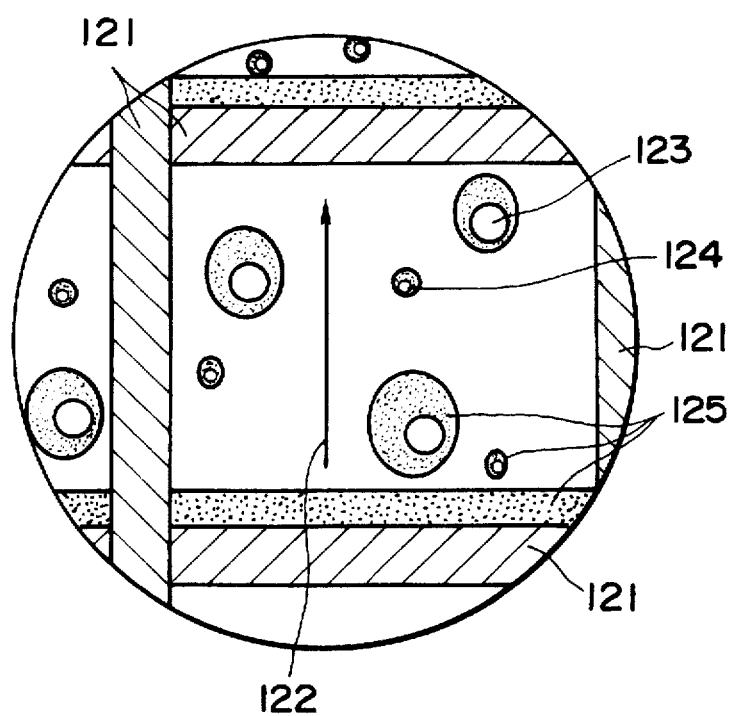
FIG. 12

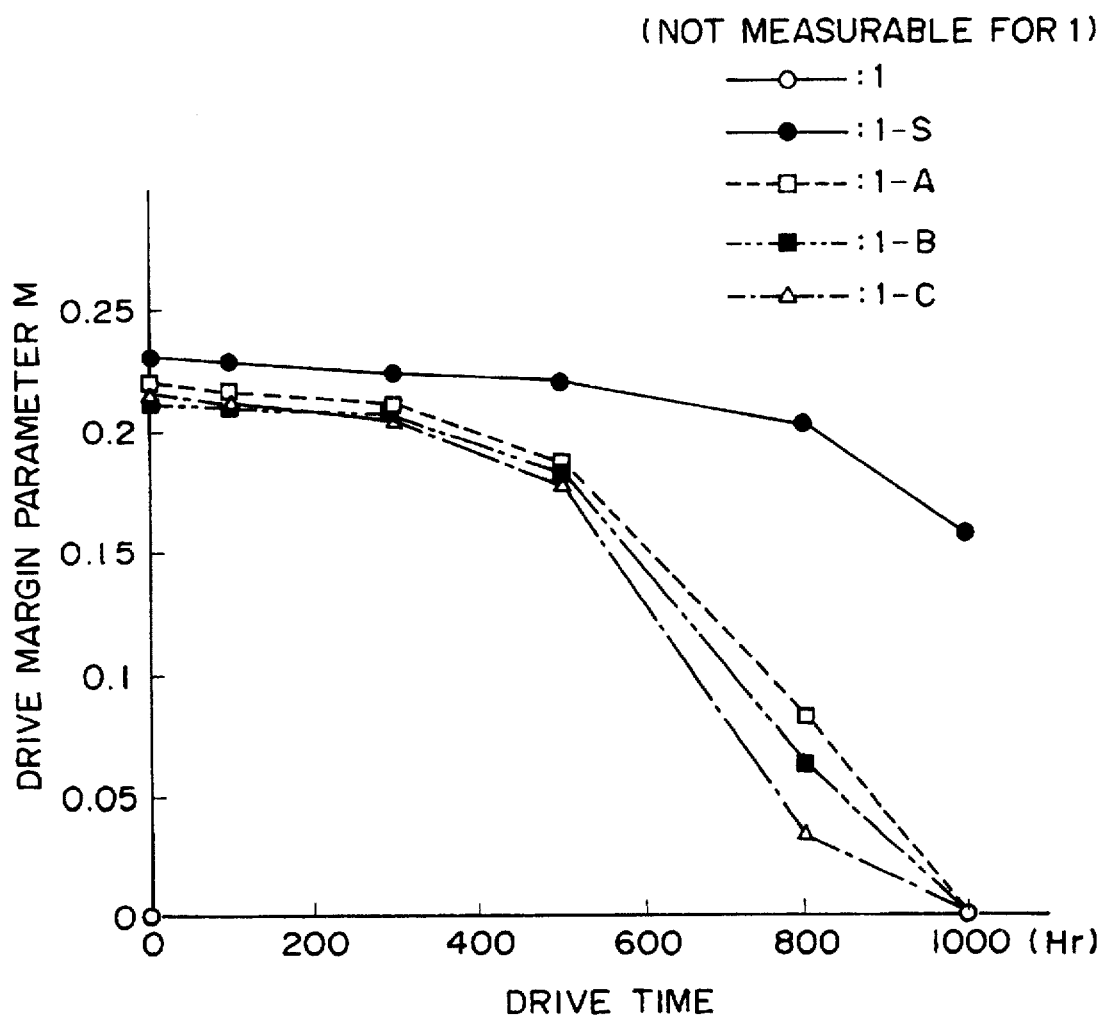
F I G. 13

LIQUID CRYSTAL COMPOSITION, LIQUID CRYSTAL DEVICE, AND LIQUID CRYSTAL DISPLAY APPARATUS USING SAME

FIELD OF THE INVENTION AND RELATED ART

The present invention relates to a liquid crystal composition, a liquid crystal device using the composition to be used in a liquid crystal display device or a liquid crystal-optical shutter, etc., and a liquid crystal apparatus using the device. Particularly, the present invention relates to a chiral smectic (ferroelectric) liquid crystal composition containing three-types of specific compounds in combination, a liquid crystal device using the composition in which a display quality and drive characteristics in continuous drive are improved, and a liquid crystal display apparatus using the device.

A display device of the type which controls transmission of light in combination with a polarizing device by utilizing the refractive index anisotropy of ferroelectric (or chiral smectic) liquid crystal molecules has been proposed by Clark and Lagerwall (U.S. Pat. No. 4,367,924, etc.). The ferroelectric liquid crystal has generally chiral smectic C phase (SmC*) or H phase (SmH*) and, in the SmC* or SmH* phase, shows a property of assuming either one of a first optically stable state and a second optically stable state responding to an electrical field applied thereto and maintaining such a state in the absence of an electrical field, namely bistability, and also has a quick responsiveness to the change in electrical field. Thus, it is expected to be utilized in a high speed and memory type display device and particularly to provide a large-area and high-resolution display based on its excellent function.

Heretofore, there have been pointed out various problems as to such a ferroelectric liquid crystal (composition), a ferroelectric liquid crystal device and a ferroelectric liquid crystal apparatus, and there have been also proposed various means for solving the problems.

For example, Japanese Laid-Open Patent Application (JP-A) 3-252624 has disclosed a method for improving a transmittance (contrast) in a bistable alignment state by utilizing C1 uniform alignment state based on specific device structure and specific alignment state of liquid crystal molecules used in combination.

Further, a display apparatus using a ferroelectric (or chiral smectic) liquid crystal can realize a large display area (panel size) and a high resolution. However, as the panel size and resolution are increased, the frame frequency (frequency constituting one picture) becomes low. This leads to a problem that the picture-rewriting speed becomes slow and the motion picture display speed becomes slow, e.g., in cases of smooth scrolling and cursor movement on character editing or a graphic display. A solution to this problem has been given in, e.g., JP-A 60-31120 and JP-A 1-140198.

More specifically, there has been proposed a display apparatus including a display panel comprising scanning electrodes and data electrodes arranged in a matrix, whole-area writing means for selecting all or a prescribed part of the scanning electrodes for writing and partial writing means for selecting a part of the above-mentioned all or a prescribed part of the scanning electrodes. As a result, a partial motion picture display can be performed at a high speed by the partial writing mode, and the partial writing and the whole-area writing can be performed compatibly.

Further, in order to realize a ferroelectric liquid crystal display device with a large display area and high definition, good drive characteristics including a wider drive voltage margin have been required (JP-A 3-35220).

On the other hand, JP-A 5-273537 has pointed out a problem that, when such a ferroelectric liquid crystal device is continually driven for a long time, a liquid crystal composition (material) sandwiched between a pair of glass plates is moved in a particular direction to gradually increase a spacing (cell gap) between the glass plats, thus showing a pale yellow tint to lower a display image quality. In order to solve the problem, JP-A 5-273537 has proposed a liquid crystal device using alignment control films having a specific surface shape (uneven surface) and contacting the liquid crystal material.

The above phenomenon of the liquid crystal movement will be described with reference to FIGS. 11A and 11B.

Referring to FIG 11A, liquid crystal molecules in the ferroelectric liquid crystal device have either one of average molecular axis directions 116a and 116b and are moved in, e.g., a direction 117 perpendicular to a uniaxial aligning direction (rubbing direction) 115 due to a long term drive of the device.

If such a movement of the liquid crystal molecules in the direction 117 is caused over the entire liquid crystal device, the liquid crystal material is locally concentrated in a region 118 shown in FIG. 11B. As a result, the cell gap of the liquid crystal device increases in the region 118.

Further, European Patent Application (EP-0648826 A2) has proposed a means (method) of preventing the liquid crystal movement from the point of view of a relationship between a device-constituting factor of a liquid crystal device and a phase transition behavior of a liquid crystal composition (a temperature region where a cholesteric phase and a smectic A phase are co-present in mixture on temperature decrease).

We have further studied on such characteristics during a long term drive of a (ferroelectric) liquid crystal device. As a result, we have found a problem of a lowering (deterioration) in drive characteristics, particularly a lowering in a drive voltage margin in such a long term drive of the device.

We also found that the lowering in drive voltage margin is attributable to a phenomenon that a region gradually affected with time by a surface unevenness (due to formation of respective color filters and metal wiring) portion or materials for keeping and reinforcing a cell gap (e.g., spacer beads and adhesive particles) appears and extends around such a portion or materials to remarkably lower a crosstalk voltage value (one of drive characteristics of the liquid crystal device) in the vicinity of the surface unevenness portion or materials for keeping and reinforcing the cell gap.

FIG. 12 is a schematic explanatory view for illustrating such a lowering in drive characteristic in the long term drive of the device.

Referring to FIG. 12, regions 125 wherein a crosstalk voltage value is lowered are formed at an elongated portion in the vicinity of a metal wire 121 in a direction perpendicular to a rubbing (uniaxial aligning) direction 122 and at surrounding portions of adhesive beads 123 and spacer beads 124.

If such a region (125 as shown in FIG. 12) appears and extends in an entire display region, a region causing flickering is increased to lower a contrast in the entire display region, thus resulting in an inferior display quality. Further, a drive voltage margin at an initial stage is remarkably lowered under the influence of irregularities in cell gap of the device and temperature distribution within a display panel, thus resulting in a poor image quality.

In order to solve the above-mentioned several problems, there have been proposed various liquid crystal compositions comprising plural species of new or known mesomorphic (liquid crystal) compounds in combination. More specifically, these liquid crystal compositions exhibit a chiral smectic C phase in a wider temperature range including room temperature and are used for improving several characteristics, such as a high-speed responsiveness, an alignment characteristic, a drive temperature characteristic, a low-temperature storage characteristic and a transmittance (or contrast).

In this regard, it is generally well known that a certain mesomorphic compound is advantageous and disadvantageous to a particular characteristic. For this reason, it is important and necessary to select or choose an appropriate combination of respective components (compounds) of a chiral smectic (particularly ferroelectric) liquid crystal composition balanced in that advantages of the respective compounds are fully derived therefrom while mutually remedying (or alleviating) their disadvantages.

JP-A 6-242450 has proposed a combination or selection of such compounds.

This proposal is very effective in realizing large-area and high resolution-type liquid crystal display device and apparatus but fails to provide any solution to the above problems during a long term drive of a display device or apparatus, i.e., a lowering in a display image quality and a lowering in drive characteristics (particularly a drive voltage margin) with time.

SUMMARY OF THE INVENTION

An object of the present invention is to provide a liquid crystal composition effective in preventing a lowering in a display quality with time and a lowering in a drive characteristic with time when a liquid crystal device using the composition is driven for a long time.

Another object of the present invention is to provide a liquid crystal device and a liquid crystal apparatus which provide and keep excellent display and drive characteristics for a long time by using the liquid crystal composition.

Another object of the present invention is to provide improved performances in terms of the saving of structural members for a display apparatus, the saving of energy and the saving of space by using the above liquid crystal apparatus.

According to the present invention, there is provided a liquid crystal composition, comprising:

a compound represented by the following formula (A):

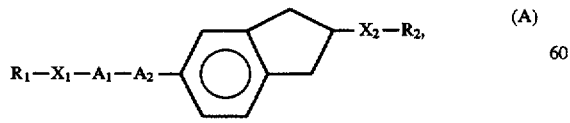

wherein $R_1$ and $R_2$ independently denote a linear or branched alkyl group having 1-18 carbon atoms; $X_1$ and $X_2$ independently denote a single bond, —O—, —CO—O— or —O—CO—; and $A_1$ denotes a single bond,

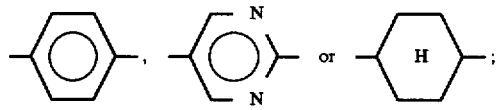

and $A_2$ denotes

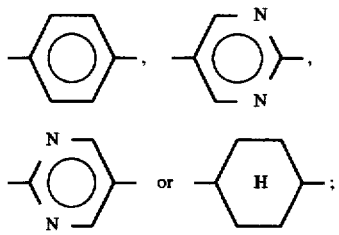

a compound represented by the following formula (B):

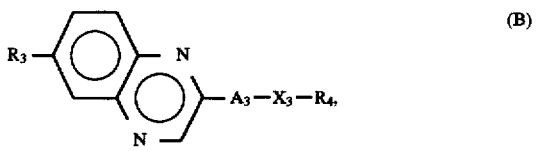

wherein $R_3$ and $R_4$ independently denote a linear or branched alkyl group having 1-18 carbon atoms; $X_3$ denotes a single bond, —O—, —CO—O— or —O—CO—; and $A_3$ denotes

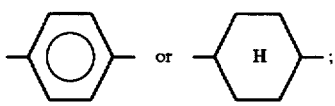

and a compound represented by the following formula (C):

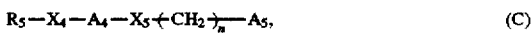

wherein $R_5$ denotes a linear or branched alkyl group having 1-18 carbon atoms; $X_4$ denotes a single bond, —O—, —CO—O— or —O—CO—; $X_5$ denotes a single bond, —OCH$_4$—, —CO—O— or —O—CO—; n is an integer of 3-16; and $A_2$ denotes

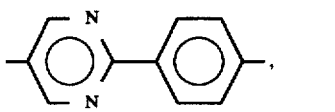

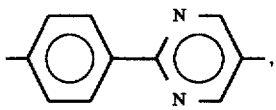

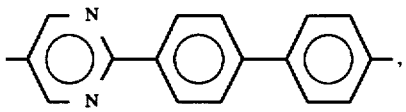

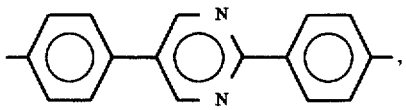

-continued

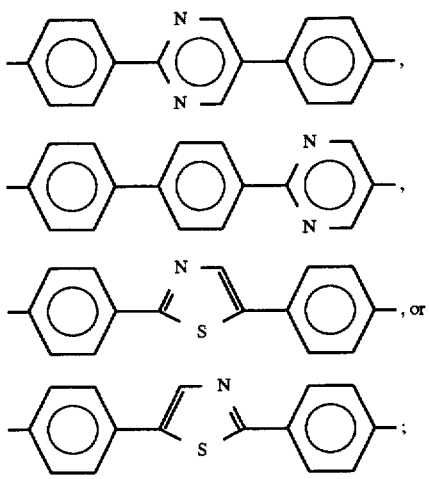

and $A_5$ denotes

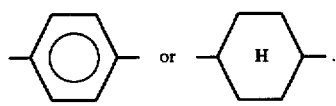

According to the present invention, there is also provided a liquid crystal device, comprising: a pair of oppositely disposed substrates each provided with an electrode at a corresponding opposite surface thereof for applying a voltage to a liquid crystal composition disposed between said substrates; wherein at least one of said substrates is further provided with an alignment control layer for controlling an alignment state of said liquid crystal composition at said corresponding opposite surface, and the liquid crystal composition is a liquid crystal composition described above.

According to the present invention, there is further provided a liquid crystal apparatus, including: a liquid crystal device described above and a drive circuit for driving the liquid crystal device.

JP-A 5-273537 includes a description such that the increase in cell thickness at the cell side is recognized to be caused by a pressure increase which in turn is caused by movement of liquid crystal molecules in a particular direction due to driving and that such a force causing the liquid crystal molecule movement may be presumably attributable to an electrodynamic effect caused by perturbation of liquid crystal molecule dipole moments in an AC-like electric field caused by continuation of drive pulses.

It is readily analogized that a change in a cell gap of a liquid crystal device (particularly one using a ferroelectric liquid crystal) having a small cell gap (about 1–5 µm) leads to a large change in a threshold drive voltage characteristic.

However, it has not been specifically clarified as yet how the cell gap change causes the change in a threshold drive voltage characteristic although we presume that the liquid crystal movement is a uniform movement phenomenon of the entire liquid crystal composition thereby to cause a cell gap change and a change in a (yellow) tint, thus inviting a change in a threshold drive voltage characteristic or that a liquid crystal composition is moved while generating a localization of a part of composition-constituting components (compounds) to cause changes in a proportion of such a localized component within a display region and a refractive index anisotropy (Δn) and a change in a cell gap by which a (yellow) tint of the display region is changed to increase a degree of a change in a threshold drive voltage.

In either case, if the liquid crystal movement is caused due to a dynamic factor, we have considered that it is possible to suppress the liquid crystal movement phenomenon by appropriately controlling and selecting a core-structural factor of (mesomorphic) compounds constituting the liquid crystal composition used.

We have investigated a specific combination of compounds having particular core skeletons not adversely affecting a switching characteristic and a mutual solubility among the respective compounds while preventing the liquid crystal movement. More specifically, we have investigated a specific combination from many known compounds including those having a core structure of a phenyl-pyrimidine type preferentially used as a main component of conventional liquid crystal composition, particularly conventional chiral liquid crystal compositions from the above viewpoint.

In the structure of a liquid crystal device, we presume that some dynamic effect is locally increased in a region in the vicinity of a stepwise portion (a portion providing a slight difference in cell gap) due to an electrode (e.g., transparent electrode) or a metal wire formed as an auxiliary electrode and/or regions surrounding or enclosing cell gap-holding materials, such as spacer beads and adhesive particles. Such regions create a portion where a threshold drive voltage characteristic is changed (i.e., a remarkable lowering in crosstalk voltage value) is liable to be increased with time when the liquid crystal device is driven for a long time. Accordingly, we have presumed that there is some relationship between such regions and the liquid crystal movement. Based on this presumption, we have also investigated a combination of compounds effective in preventing the liquid crystal movement (increase in cell thickness) leading to an improvement in a local change in a threshold drive voltage characteristic, thus improving a display quality.

As a result, we have found that the abovedescribed liquid crystal composition containing at least three-types of compounds of the formulae (A), (B) and (C) as a main component is effective in improving the above-described display and drive characteristics.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 11A and 11B are explanatory views for illustrating a cell thickness increase along a cell side in relation with liquid crystal movement directions.

FIG. 12 is a schematically enlarged view of a part of a liquid crystal device for illustrating drive characteristic-lowering regions in a long term drive of the device.

FIGS. 13, 14 and 15 are respectively a graph showing a change in a drive voltage margin parameter M with time.

DESCRIPTION OF THE PREFERRED EMBODIMENTS

Figure 1:
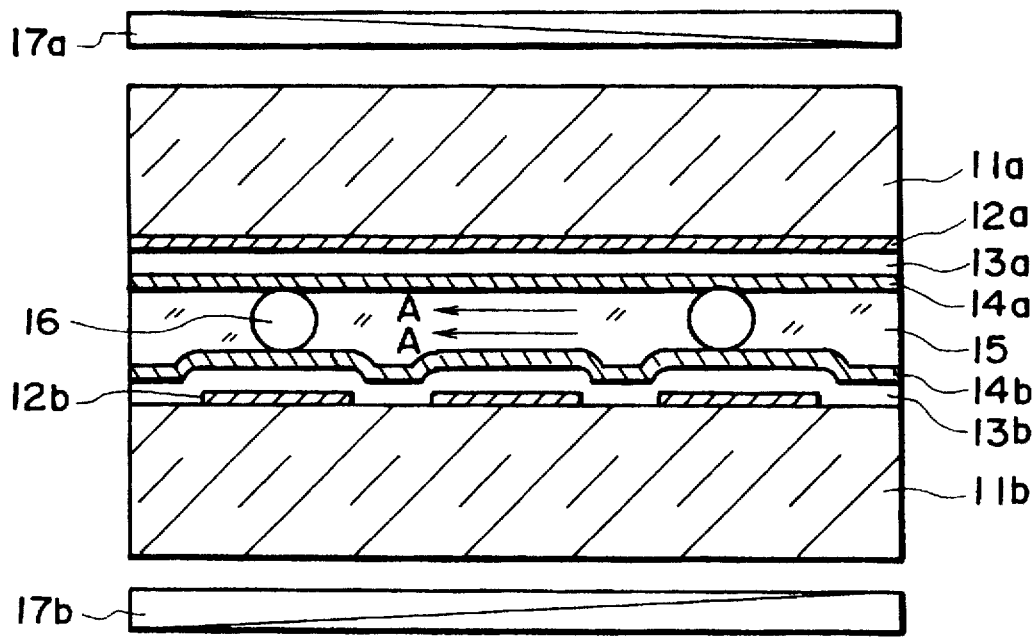
FIG. 1 is a schematic sectional view of an embodiment of the liquid crystal device according to the present invention.

The liquid crystal composition according to the present invention contains at least three essential components consisting of the above-mentioned mesomorphic compounds of the formulae (A), (B) and (C).

Each of the compounds of the formulae (A), (B) and (C) may preferably be a mesomorphic compound showing a mesomorphic (or liquid crystal) phase by itself but may be a compound not showing a mesomorphic phase so long as a resultant liquid crystal composition containing the compound shows a mesomorphic phase.

The liquid crystal composition of the present invention may preferably further contain at least one optically active compound to assume chiral smectic phase, thus functioning as a ferroelectric liquid crystal composition.

The compound represented by the formula (A) may generally be synthesized through a process as described in, e.g., JP-A 5-262678 (corr. to EP-A0546338 and U.S. Pat. No. 5,385,692).

Hereinbelow, preferred specific examples of the compound of the formula (A) may include those shown below, respectively.

In the following, for simplicity, the respective groups are indicated as follows.

met=$CH_3$, hep=$C_7H_{15}$, trd=$C_{13}H_{27}$,
eth=$C_2H_5$, oct=$C_8H_{17}$, ted=$C_{14}H_{29}$,
pro=$C_3H_7$, non=$C_9H_{19}$, ped=$C_{15}H_{31}$,
but=$C_4H_9$, dec=$C_{10}H_{21}$, hexd=$C_{16}H_{33}$,
pen=$C_5H_{11}$, und=$C_{11}H_{23}$, hepd=$C_{17}H_{35}$,
hex=$C_6H_{13}$, dod=$C_{12}H_{25}$, ocd=$C_{18}H_{37}$,
2mb=2-methyl-1-butyl, -=single bond,

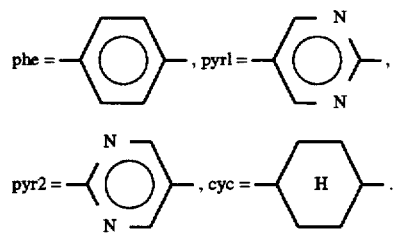

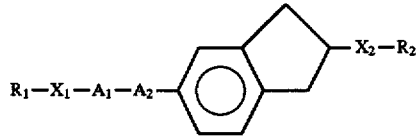

Formula (A):

R₁—X₁—A₁—A₂—[indane structure]—X₂—R₂

| | | | | | | |
|---|---|---|---|---|---|---|
| A-1 | met— | — | — | —phe— | — | —pro |
| A-2 | pen— | — | — | —phe— | — | —dec |
| A-3 | ted— | — | — | —phe— | — | —ocd |
| A-4 | dec— | —COO— | — | —phe— | — | —oct |
| A-5 | 2mb— | —O— | — | —phe— | — | —hep |
| A-6 | oct— | — | —phe— | —phe— | — | —oct |
| A-7 | dec— | — | —phe— | —phe— | — | —oct |
| A-8 | ted— | — | —phe— | —phe— | — | —hep |
| A-9 | oct— | —OOC— | —phe— | —phe— | — | —oct |
| A-10 | dod— | — | — | —phe— | —O— | —oct |
| A-11 | dod— | — | — | —phe— | —COO— | —oct |
| A-12 | dod— | — | — | —phe— | —OOC— | —hep |
| A-13 | hex— | — | — | —pyr1 | — | —oct |
| A-14 | oct— | — | — | —pyr1 | — | —oct |
| A-15 | oct— | — | — | —pyr1 | — | —dec |
| A-16 | non— | — | — | —pyr1 | — | —hex |
| A-17 | non— | — | — | —pyr1 | — | —oct |
| A-18 | non— | — | — | —pyr1 | — | —dec |
| A-19 | dec— | — | — | —pyr1 | — | —pen |
| A-20 | dec— | — | — | —pyr1 | — | —hex |
| A-21 | dec— | — | — | —pyr1 | — | —hep |
| A-22 | dec— | — | — | —pyr1 | — | —oct |
| A-23 | dec— | — | — | —pyr1 | — | —dec |
| A-24 | dec— | — | — | —pyr1 | — | —dod |
| A-25 | dec— | — | — | —pyr1 | — | —ted |
| A-26 | dec— | —COO— | — | —pyr1 | — | —oct |
| A-27 | und— | — | — | —pyr1 | — | —pen |
| A-28 | und— | — | — | —pyr1 | — | —hep |
| A-29 | und— | — | — | —pyr1 | — | —oct |
| A-30 | und— | — | — | —pyr1 | — | —non |
| A-31 | und— | — | — | —pyr1 | — | —dec |
| A-32 | dod— | — | — | —pyr1 | — | —hex |
| A-33 | dod— | — | — | —pyr1 | — | —hep |
| A-34 | dod— | — | — | —pyr1 | — | —oct |

Formula (A):

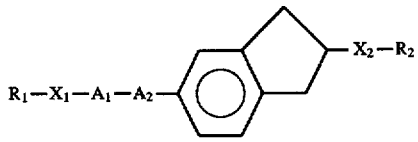

| Ex. Comp. No. | R₁– | –X₁– | –A₁– | –A₂– | –X₂– | –R₂ |
|---|---|---|---|---|---|---|
| A-35 | dod— | — | — | —pyrl | — | —dec |
| A-36 | dod— | — | — | —pyrl | — | —dod |
| A-37 | trd— | — | — | —pyrl | — | —oct |
| A-38 | pro— | — | — | —cyc— | — | —dec |
| A-39 | non— | — | —phe— | —cyc— | — | —hex |
| A-40 | pen— | — | —cyc— | —phe— | — | —hep |
| A-41 | pen— | — | —cyc— | —phe— | — | —oct |
| A-42 | hex— | —O— | — | —pyrl | — | —dec |
| A-43 | oct— | —O— | — | —pyrl | — | —oct |
| A-44 | oct— | —O— | — | —pyrl | — | —dec |
| A-45 | dec— | —O— | — | —pyrl | — | —hex |
| A-46 | dec— | —O— | — | —pyrl | — | —dec |
| A-47 | dod— | —O— | — | —pyrl | — | —oct |
| A-48 | dex— | —COO— | — | —pyrl | — | —oct |

The compound represented by the formula (B) may generally be synthesized through a process as shown in, e.g., JP-A 7-10849.

Hereinbelow, preferred specific examples of the compound of the formula (B) may include those shown below, respectively.

In the following, for simplicity, the respective groups are indicated similarly as a in those for the formula (A).

Formula (B):

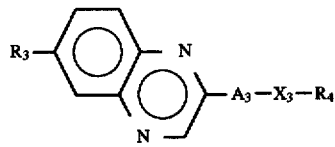

| Ex. Comp. No. | R₃– | –A₃– | –X₃– | –R₄ |
|---|---|---|---|---|
| B-1 | met— | —phe— | — | —but |
| B-2 | pro— | —phe— | — | —hex |
| B-3 | hex— | —phe— | — | —oct |
| B-4 | oct— | —phe— | — | —oct |
| B-5 | dec— | —phe— | — | —oct |
| B-6 | und— | —phe— | — | —dec |
| B-7 | dod— | —phe— | — | —dec |
| B-8 | ted— | —phe— | — | —dec |
| B-9 | ocd— | —phe— | — | —dec |
| B-10 | dec— | —phe— | — | —dec |
| B-11 | oct— | —phe— | — | —dec |
| B-12 | hex— | —phe— | —O— | —dec |
| B-13 | oct— | —phe— | —O— | —dec |
| B-14 | dec— | —phe— | —O— | —dec |
| B-15 | hex— | —phe— | — | —dec |
| B-16 | oct— | —phe— | — | —dod |
| B-17 | oct— | —phe— | — | —ocd |
| B-18 | hex— | —phe— | —COO— | —oct |
| B-19 | oct— | —phe— | —COO— | —oct |
| B-20 | dec— | —phe— | —COO— | —oct |
| B-21 | hex— | —phe— | —OOC— | —oct |
| B-22 | oct— | —phe— | —OOC— | —oct |
| B-23 | dec— | —phe— | —OOC— | —oct |
| B-24 | hex— | —cyc— | — | —und |
| B-25 | oct— | —cyc— | — | —und |

Formula (B):

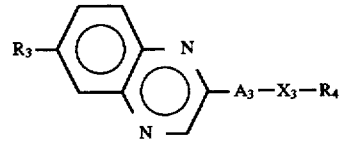

| Ex. Comp. No. | R₃– | –A₃– | –X₃– | –R₄ |
|---|---|---|---|---|
| B-26 | dec— | —cyc— | — | —dod |
| B-27 | dod— | —cyc— | — | —dod |
| B-28 | 2mb— | —phe— | — | —oct |
| B-29 | oct— | —phe— | —O— | —2mb |
| B-30 | oct— | —phe— | — | —pen |
| B-31 | oct— | —phe— | — | —hep |
| B-32 | but— | —phe— | — | —dec |
| B-33 | but— | —phe— | — | —dod |
| B-34 | hex— | —phe— | — | —dec |
| B-35 | hex— | —phe— | — | —dod |
| B-36 | oct— | —phe— | — | —hex |
| B-37 | oct— | —phe— | — | —dod |
| B-38 | oct— | —phe— | —OOC— | —dod |

The compound represented by the formula (C) may generally be synthesized through processes as shown in, e.g., JP-A 6-256231 and JP-A 7-118178 (corr. to EP-A-0640677 and U.S. Pat. No. 5,462,694).

Hereinbelow, preferred specific examples of the compound of the formula (C) may include those shown below, respectively.

In the following, for simplicity, the respective groups are indicated similarly as a in those for the formula (A) except for the following groups.

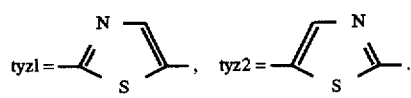

Formula (C): $R_4-X_4-A_4-X_5-(CH_2)_n-A_5$

| Ex. Comp. No. | $R_5$ | $X_4$ | $A_4$ | $X_5$ | n | $A_5$ |
|---|---|---|---|---|---|---|
| C-1 | met | — | —pyr1—phe— | — | 3 | —phe |
| C-2 | but | — | —pyr1—phe— | — | 3 | —phe |
| C-3 | hex | — | —pyr1—phe— | — | 4 | —phe |
| C-4 | oct | — | —pyr1—phe— | — | 4 | —phe |
| C-5 | dec | — | —pyr1—phe— | — | 4 | —phe |
| C-6 | und | — | —pyr1—phe— | — | 4 | —phe |
| C-7 | dod | — | —pyr1—phe— | — | 4 | —phe |
| C-8 | ted | — | —pyr1—phe— | — | 4 | —phe |
| C-9 | ocd | — | —pyr1—phe— | — | 4 | —phe |
| C-10 | oct | —O— | —pyr1—phe— | — | 4 | —phe |
| C-11 | dec | —O— | —pyr1—phe— | — | 4 | —phe |
| C-12 | ted | —O— | —pyr1—phe— | —OCH$_2$— | 4 | —phe |
| C-13 | oct | — | —phe—pyr2— | —OCH$_2$— | 3 | —phe |
| C-14 | dec | — | —phe—pyr2— | —OCH$_2$— | 4 | —phe |
| C-15 | dod | — | —phe—pyr2— | — | 6 | —phe |
| C-16 | dec | —COO— | —phe—pyr2— | — | 5 | —phe |
| C-17 | dec | —OOC— | —phe—pyr2— | —OCH$_2$— | 4 | —phe |
| C-18 | dec | — | —pyr1—phe— | —COO— | 5 | —phe |
| C-19 | dec | — | —pyr1—phe— | —OOC— | 4 | —phe |
| C-20 | dec | — | —pyr1—phe— | — | 10 | —phe |
| C-21 | hex | — | —pyr1—phe— | — | 14 | —phe |
| C-22 | oct | — | —pyr1—phe— | — | 16 | —phe |
| C-23 | oct | — | —pyr1—phe—phe— | — | 4 | —phe |
| C-24 | hex | — | —phe—pyr1—phe— | — | 5 | —phe |
| C-25 | oct | — | —phe—pyr2—phe— | — | 3 | —phe |
| C-26 | dec | — | —phe—phe—phe2— | — | 4 | —phe |
| C-27 | dec | — | —pyr1—phe—phe— | —OCH$_2$— | 5 | —phe |
| C-28 | hep | —OOC— | —phe—phe—pyr2— | — | 5 | —phe |
| C-29 | 2mb | — | —pyr1—phe— | — | 5 | —phe |
| C-30 | trd | —O— | —pyr1—phe— | — | 5 | —phe |
| C-31 | und | —O— | —pyr1—phe— | — | 6 | —phe |
| C-32 | pen | —O— | —pyr1—phe— | — | 11 | —phe |
| C-33 | eth | —O— | —pyr1—phe— | — | 8 | —phe |
| C-34 | dec | — | —pyr1—phe— | —OCH$_2$— | 4 | —phe |
| C-35 | dec | —O— | —pyr1—phe— | —OCH$_2$— | 4 | —phe |
| C-36 | dec | — | —pyr1—phe— | — | 3 | —phe |
| C-37 | dec | — | —pyr1—phe— | — | 5 | —phe |
| C-38 | dec | — | —pyr1—phe— | — | 8 | —phe |
| C-39 | oct | — | —phe—pyr2— | — | 4 | —phe |
| C-40 | dec | — | —phe—pyr2— | —OCH$_2$— | 3 | —phe |
| C-41 | oct | — | —phe—pyr2— | —OCH$_2$— | 4 | —phe |
| C-42 | non | — | —phe—pyr2— | —OCH$_2$— | 4 | —phe |
| C-43 | oct | — | —phe—pyr2— | —OCH$_2$— | 6 | —phe |
| C-44 | dec | — | —phe—pyr2— | —OCH$_2$— | 6 | —phe |
| C-45 | dec | — | —pyr1—phe— | —OOC— | 10 | —phe |
| C-46 | hep | — | —pyr1—phe— | —OCH$_2$— | 4 | —phe |
| C-47 | oct | — | —pyr1—phe— | —OCH$_2$— | 4 | —phe |
| C-48 | oct | — | —pyr1—phe— | —OCH$_2$— | 6 | —phe |
| C-49 | non | — | —pyr1—phe— | —OCH$_2$— | 4 | —phe |
| C-50 | dec | — | —pyr1—phe— | —OCH$_2$— | 3 | —phe |
| C-51 | dec | — | —pyr1—phe— | —OCH$_2$— | 6 | —phe |
| C-52 | und | — | —pyr1—phe— | —OCH$_2$— | 5 | —phe |
| C-53 | hex | — | —pyr1—phe—phe— | — | 4 | —phe |
| C-54 | dec | — | —pyr1—phe—phe— | — | 4 | —phe |
| C-55 | hex | — | —phe—pyr1—phe— | — | 4 | —phe |
| C-56 | pen | — | —phe—phe—pyr2— | — | 4 | —phe |
| C-57 | hep | — | —phe—phe—pyr2— | — | 4 | —phe |
| C-58 | met | — | —pyr1—phe— | — | 3 | —cyc |
| C-59 | but | — | —pyr1—phe— | — | 3 | —cyc |
| C-60 | hex | — | —pyr1—phe— | — | 4 | —cyc |
| C-61 | oct | — | —pyr1—phe— | — | 4 | —cyc |
| C-62 | dec | — | —pyr1—phe— | — | 4 | —cyc |
| C-63 | und | — | —pyr1—phe— | — | 4 | —cyc |
| C-64 | dod | — | —pyr1—phe— | — | 4 | —cyc |
| C-65 | ted | — | —pyr1—phe— | — | 4 | —cyc |
| C-66 | ocd | — | —pyr1—phe— | — | 4 | —cyc |
| C-67 | oct | —O— | —pyr1—phe— | — | 4 | —cyc |
| C-68 | dec | —O— | —pyr1—phe— | — | 4 | —cyc |
| C-69 | ted | —O— | —pyr1—phe— | — | 4 | —cyc |
| C-70 | oct | — | —phe—pyr2— | —OCH$_2$— | 3 | —cyc |
| C-71 | dec | — | —phe—pyr2— | —OCH$_2$— | 4 | —cyc |
| C-72 | dod | — | —phe—pyr2— | —OCH$_2$— | 6 | —cyc |
| C-73 | dec | —COO— | —phe—pyr2— | — | 5 | —cyc |
| C-74 | dec | —OOC— | —phe—pyr2— | —OCH$_2$— | 4 | —cyc |
| C-75 | dec | — | —pyr1—phe— | —OCH$_2$— | 5 | —cyc |
| C-76 | dec | — | —pyr1—phe— | —COO— | 4 | —cyc |

-continued

Formula (C): $R_5-X_4-A_4-X_5-(CH_2)_n-A_5$

| Ex. Comp. No. | $R_5$ | $X_4$ | $A_4$ | $X_5$ | n | $A_5$ |
|---|---|---|---|---|---|---|
| C-77 | dec | — | —pyr1—phe— | —OOC— | 10 | —cyc |
| C-78 | hex | — | —pyr1—phe— | — | 14 | —cyc |
| C-79 | oct | — | —pyr1—phe— | — | 16 | —cyc |
| C-80 | oct | — | —pyr1—phe—phe— | — | 4 | —cyc |
| C-81 | hex | — | —phe—pyr1—phe— | — | 5 | —cyc |
| C-82 | oct | — | —phe—pyr2—phe— | — | 3 | —cyc |
| C-83 | dec | — | —phe—phe—pyr2— | — | 4 | —cyc |
| C-84 | dec | — | —pyr1—phe—phe— | —OCH$_2$— | 5 | —cyc |
| C-85 | hep | —OOC— | —phe—phe—pyr2— | — | 5 | —cyc |
| C-86 | 2mb | — | —pyr1—phe— | — | 5 | —cyc |
| C-87 | oct | — | —pyr1—phe— | —OCH$_2$— | 3 | —cyc |
| C-88 | dec | — | —pyr1—phe— | —OCH$_2$— | 3 | —cyc |
| C-89 | dec | —O— | —pyr1—phe— | —OCH$_2$— | 3 | —cyc |
| C-90 | dec | — | —pyr1—phe— | —OCH$_2$— | 4 | —cyc |
| C-91 | non | — | —pyr1—phe— | —OCH$_2$— | 3 | —cyc |
| C-92 | non | — | —pyr1—phe— | —OCH$_2$— | 4 | —cyc |
| C-93 | dec | — | —pyr1—phe— | —OCH$_2$— | 4 | —cyc |
| C-94 | und | — | —pyr1—phe— | —OCH$_2$— | 3 | —cyc |
| C-95 | und | — | —pyr1—phe— | —OCH$_2$— | 4 | —cyc |
| C-96 | oct | —O— | —pyr1—phe— | —OCH$_2$— | 3 | —cyc |
| C-97 | non | —O— | —pyr1—phe— | —OCH$_2$— | 3 | —cyc |
| C-98 | dec | —O— | —pyr1—phe— | —OCH$_2$— | 4 | —cyc |
| C-99 | dec | — | —phe—pyr2— | —OCH$_2$— | 3 | —cyc |
| C-100 | dec | —O— | —phe—pyr2— | —OCH$_2$— | 3 | —cyc |
| C-101 | dec | —O— | —phe—pyr2— | —OCH$_2$— | 4 | —cyc |
| C-102 | dec | — | —pyr1—phe— | —OOC— | 3 | —cyc |
| C-103 | met | — | —phe—tyz1—phe— | — | 3 | —cyc |
| C-104 | but | — | —phe—tyz1—phe— | — | 3 | —cyc |
| C-105 | hex | — | —phe—tyz1—phe— | — | 4 | —cyc |
| C-106 | oct | — | —phe—tyz1—phe— | — | 4 | —cyc |
| C-107 | dec | — | —phe—tyz1—phe— | — | 4 | —cyc |
| C-108 | und | — | —phe—tyz1—phe— | — | 4 | —cyc |
| C-109 | dod | — | —phe—tyz1—phe— | — | 4 | —cyc |
| C-110 | ted | — | —phe—tyz1—phe— | — | 4 | —cyc |
| C-111 | ocd | — | —phe—tyz1—phe— | — | 4 | —cyc |
| C-112 | oct | — | —phe—tyz1—phe— | —O— | 4 | —cyc |
| C-113 | dec | — | —phe—tyz1—phe— | —O— | 5 | —cyc |
| C-114 | dod | — | —phe—tyz1—phe— | —O— | 7 | —cyc |
| C-115 | oct | — | —phe—tyz1—phe— | —COO— | 5 | —cyc |
| C-116 | hex | — | —phe—tyz1—phe— | —OOC— | 8 | —cyc |
| C-117 | hex | —O— | —phe—tyz1—phe— | — | 4 | —cyc |
| C-118 | oct | —O— | —phe—tyz1—phe— | — | 4 | —cyc |
| C-119 | dec | —O— | —phe—tyz1—phe— | — | 4 | —cyc |
| C-120 | ted | —O— | —phe—tyz1—phe— | — | 4 | —cyc |
| C-121 | dec | —COO— | —phe—tyz1—phe— | — | 5 | —cyc |
| C-122 | dec | —OOC— | —phe—tyz1—phe— | —O— | 5 | —cyc |
| C-123 | oct | — | —phe—tyz1—phe— | — | 8 | —cyc |
| C-124 | dec | — | —phe—tyz1—phe— | — | 10 | —cyc |
| C-125 | hex | — | —phe—tyz1—phe— | — | 14 | —cyc |
| C-126 | oct | — | —phe—tyz1—phe— | — | 16 | —cyc |
| C-127 | oct | — | —phe—tyz2—phe— | — | 3 | —cyc |
| C-128 | oct | — | —phe—tyz2—phe— | — | 4 | —cyc |
| C-129 | hex | — | —phe—tyz2—phe— | — | 5 | —cyc |
| C-130 | dec | — | —phe—tyz2—phe— | — | 5 | —cyc |
| C-131 | dec | — | —phe—tyz2—phe— | —O— | 6 | —cyc |
| C-132 | hep | —OOC— | —phe—tyz2—phe— | — | 5 | —cyc |
| C-133 | 2mb | — | —phe—tyz1—phe— | — | 5 | —cyc |

As described above, the liquid crystal composition according to the present invention may preferably be a chiral smectic liquid crystal composition containing at least one species of an optically active compound. The liquid crystal composition may preferably assume at least a chiral smectic phase or ferroelectricity. The liquid crystal composition may also preferably exhibit an isotropic phase, a cholesteric phase (chiral nematic phase), a smectic phase and a chiral smectic phase on temperature decrease. The chiral smectic phase may preferably be a chiral smectic C phase.

The liquid crystal composition according to the present invention may preferably be prepared by mixing 1.0–30 wt. %, more preferably 1.0–20 wt. %, in total of at least one species of a mesomorphic compound of the formula (A); 0.3–20 wt. %, more preferably 0.5–10 wt. % in total of at least one species of a compound of the formula (B); 0.3–20 wt. %, more preferably 0.5–10 wt. % in total of at least one species of a compound of the formula (C); and at least one species of another (mesomorphic) compound (or liquid crystal composition) capable of including an optically active compound in an appropriate weight ratio.

Such another (mesomorphic) compound constitutes the (chiral smectic) liquid crystal composition of the present invention together with the above-described compounds of the formulae (A), (B) and (C) and may be used as a component for providing a base liquid crystal composition to which the compounds of the formulae (A), (B) and (C) are added. Another compound used in the present invention can be selected from known liquid crystal materials including those having a core structure having pyrimidine ring and benzene ring in view of desired properties (e.g., phase transition characteristics and drive characteristics) required for a resultant liquid crystal composition and a resultant liquid crystal device.

If the compounds of the formulae (A), (B) and (C) are each contained in the liquid crystal composition in an amount of the lower limit, respectively, the resultant liquid crystal composition fails to provide desired effects in some cases.

Above an amount of the upper limit, the resultant liquid crystal composition impairs desired properties in some cases. Further, if a liquid crystal composition contain 70 wt. % in total of the compounds of the formulae (A), (B) and (C), the composition fails to provide a desired property, such as a phase transition characteristic in some cases.

The above-mentioned another compound (or another liquid crystal composition) may preferably be constituted by at least one species of compounds represented by the formulae (1), (2), (3), and/or (4) shown below. In this case, each component for another compound may preferably be contained in the liquid crystal composition in an amount shown below:

(a) 20–75 wt. % for the compound of the formula (1), (b) 5–25 wt. % for the compound of the formula (2), (c) 5–30 wt. % for the compound of the formula (3), and (d) 0.1–30 wt. % for the compound of the formula (4).

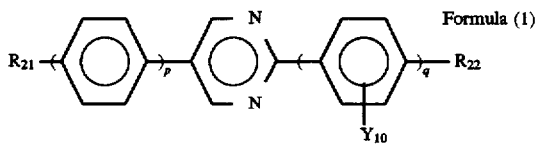

Formula (1)

wherein p and q independently denote 0, 1 or 2 satisfying p+q=1 or 2; $Y_{10}$ is hydrogen or fluorine; and $R_{21}$ and $R_{22}$ independently denote a linear or branched alkyl group having 1–18 carbon atoms capable of including at least one methylene group which can be replaced by —O—, —S—, —CO—, —CH=CH—, —C≡C—, or —CHW— where W is halogen, CN or $CF_3$ provided that heteroatoms are not adjacent to each other;

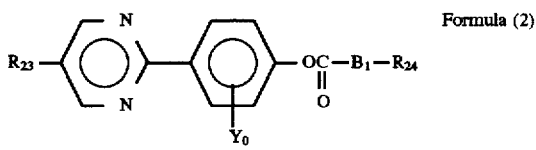

Formula (2)

wherein $B_1$ is

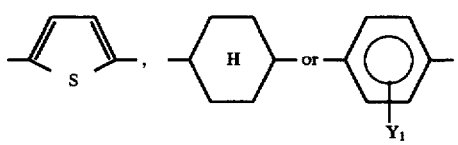

where $Y_1$ is hydrogen or fluorine; $Y_0$ is hydrogen or fluorine; $R_{23}$ is a linear or branched alkyl group having 1–18 carbon atoms; $R_{24}$ is hydrogen, halogen, CN, or a linear or branched alkyl group having 1–18 carbon atoms; and at least one methylene group in the alkyl group of $R_{23}$ or $R_{24}$ can be replaced by —O—, —S—, —CO—, —CH=CH—, —C≡C—, or —CHW— where W is halogen, CN or $CF_3$ provided that heteroatoms are not adjacent to each other;

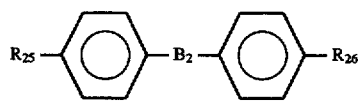

Formula (3)

wherein $B_2$ is

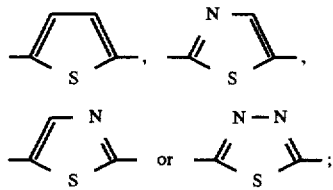

and and $R_{25}$ and $R_{26}$ independently denote a linear or branched alkyl group having 1–18 carbon atoms capable of including at least one methylene group which can be replaced by —O—, —S—, —CO—, —CH=CH—, —C≡C—, or —CHW— where W is halogen, CN or $CF_3$ provided that heteroatoms are not adjacent to each other; and

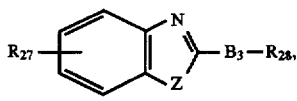

Formula (4)

wherein Z is —O— or —S—; $B_3$ is

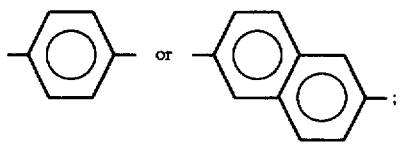

and $R_{27}$ and $R_{28}$ independently denote a linear or branched alkyl group having 1–18 carbon atoms capable of including at least one methylene group which can be replaced by —O—, —S—, —CO—, —CH=CH—, —C≡C—, or —CHW— where W is halogen, CN or $CF_3$ provided that heteroatoms are not adjacent to each other.

In the above formulae (1) to (4), the respective groups $R_{21}$ –$R_{28}$ may be an optically active group or optically inactive group.

With respect to the above another mesomorphic compound of the formulae (1)–(4) (capable of providing a base liquid crystal composition), examples of the compound of the formula (1) may preferably include those of the formulae (1-1) to (1-7); examples of the compound of the formula (2) may preferably include those of the formulae (2-1) to (2-5); examples of the compound of the formula (3) may preferably include those of the formulae (3-1) to (3-9); and examples of the compound of the formula (4) may preferably include those of the formula (4-1) to (4-6), respectively shown below:

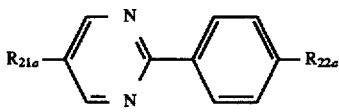

Formula (1-1)

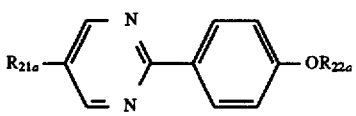

Formula (1-2)

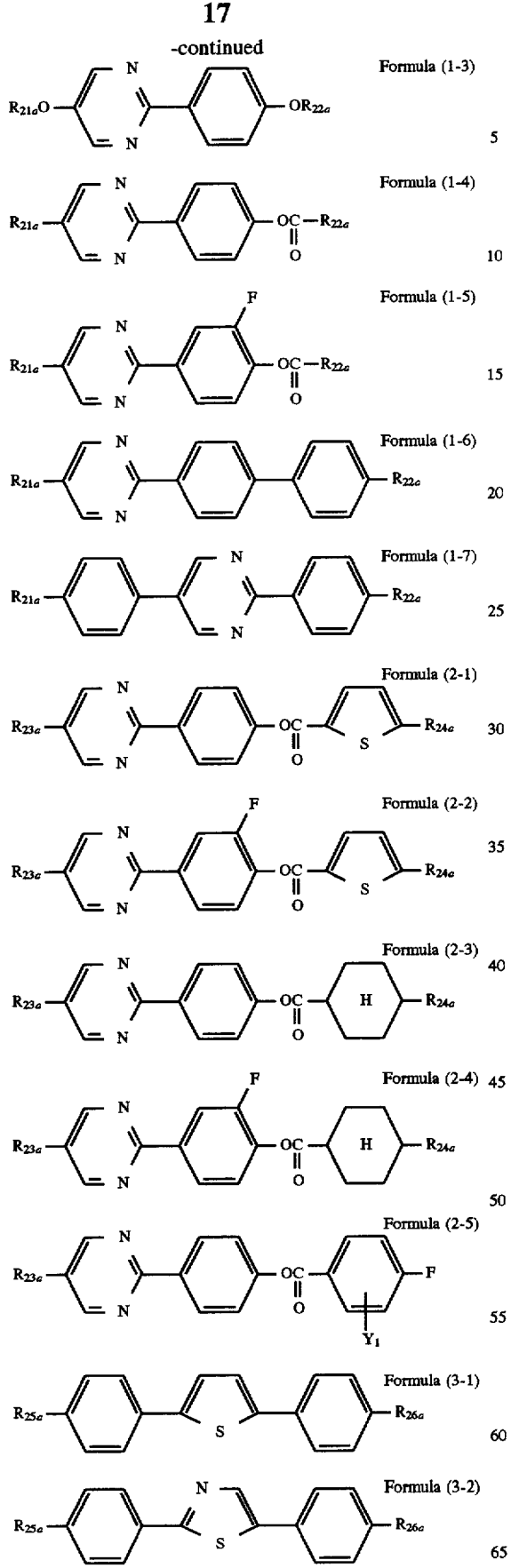
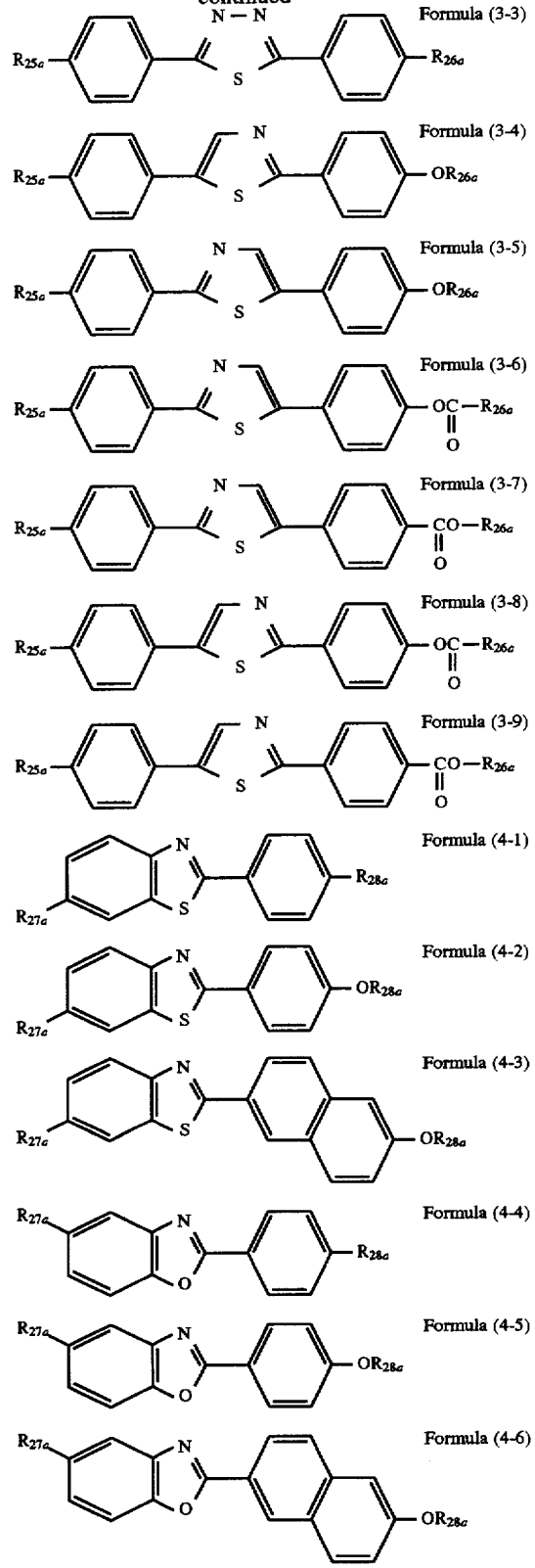
In the above formulae (1-1) to (4-6), $R_{21a}$ to $R_{28a}$ have the meanings as $R_{21}$ to $R_{28}$ in the formulae (1) to (4) and $Y_1$ has the same meaning as described above.
The mesomorphic compounds of the formulae (1-1) to (4-6) may be used singly or in combination of two or more species.

In the above formulae (1-1)–(1-5), $R_{21a}$ may preferably be a linear alkyl group having 4–14 carbon atoms and $R_{22a}$ may preferably be a linear alkyl group having 4–12 carbon atoms. Further, in the above formulae (1-6) and (1-7), $R_{21a}$ may preferably be a linear alkyl group having 4–14 carbon atoms and $R_{22a}$ may preferably be a linear alkyl group having 4–10 carbon atoms.

In the above formulae (2-1)–(2-5), $R_{23a}$ may preferably be a linear alkyl group having 4–14 carbon atoms and $R_{24a}$ may preferably be a linear alkyl group having 2–10 carbon atoms.

In the above formulae (3-1)–(3-9), $R_{25a}$ may preferably be a linear alkyl group having 2–10 carbon atoms and $R_{26a}$ may preferably be a linear alkyl group having 2–12 carbon atoms.

In the above formulae (4-1)–(4-6), $R_{27a}$ may preferably be a linear alkyl group having 2–10 carbon atoms and $R_{28a}$ may preferably be a linear alkyl group having 4–12 carbon atoms.

In the present invention, the optically active compound contained in the liquid crystal composition may preferably have a core structure comprising a pyrimidine ring and/or a substituted or unsubstituted benzene ring and have an optically active cite containing an asymmetric (chiral) carbon atom to which —$CH_3$, —$CF_3$ or —F is directly connected.

The optically active compound used in the present invention may preferably include compounds represented by formulae (5), (6) and (7) shown below.

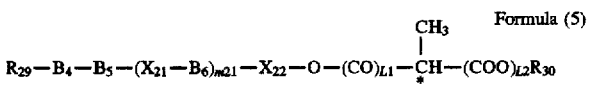
Formula (5)

in which $R_{29}$ is a linear or branched alkyl group having 1–18 carbon atoms capable of including at least one —$CH_2$— group which can be replaced by —$Y_2$—, —$Y_2$—CO—, —CO—$Y_2$—, —CO—, —OCOO—, —CH=CH— or —C≡C— wherein $Y_2$ is O or S;

$R_{30}$ is a linear or branched alkyl or alkoxy group having 1–11 carbon atoms;

m21 and L1 are 0, 1 or 2;

$B_4$, $B_5$ and $B_6$ each may have one or two substituents comprising F, Cl, Br, $CH_3$, $CF_3$ or CN and independently denote a single bond; 1,4-phenylene; pyridine-2,5-diyl; pyrimidine-2,5-diyl; pyrazine-2,5-diyl; pyridazine-3,6-diyl; 1,4-cyclohexylene; 1,3-dioxane-2,5-diyl; 1,3-dithiane-2,5-diyl; thiophene-2,5-diyl; thiazole-2,5-diyl; thiadiazole-2,5-diyl; benzoxazole-2,5-diyl; benzoxazole-2,6-diyl; benzothiazole-2,5-diyl; benzothiazole-2,6-diyl; benzofuran-2,5-diyl; benzofuran-2,6-diyl; quinoxaline-2,6-diyl; quinoline-2,6-diyl; 2,6-naphthylene; indan-2,5-diyl; 2-alkylindan-2,5-diyl having a linear or branched alkyl group having 1–18 carbon atom; indanone-2,6-diyl; 2-alkylindanone-2,6-diyl having a linear or branched alkyl group having 1–18 carbon atoms; coumaran-2,5-diyl; or 2-alkylcoumaran-2,5-diyl having a linear or branched alkyl group having 1–18 carbon atoms;

$X_{21}$ is a single bond, —COO—, —OCO—, —$CH_2$O— or —$OCH_2$—;

$X_{22}$ is a single bond, —CO— or —$CH_2$— when L1 is 0, or $X_{22}$ is a single bond or —$CH_2$— when L1 is 1;

L2 is 0 or 1; and

C* is an asymmetric carbon atom.

Examples of the compound of the formula (5) may include those as descried in JP-A Nos. 61-292388 and 63-44551. The compound (b) of the formula (5) may be produced through processes as described in these documents.

Specific and preferred examples of the optically active compound of the formula (5) may include those represented by the following structural formulae (Ex. Comp. Nos. 5-1 to 5-105 indicated as Nos. 1–105 in Table 1 below) including abbreviations or symbols used for the respective groups listed below (hereinbelow, the symbols in Tables 2 and 3 appearing hereinafter represent the same groups are those listed for Table 1). In Table 1, the structural formula (Ex. Comp. No. 5-59 indicated as No. 59) has m21 being 2.

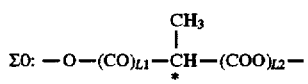

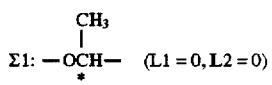

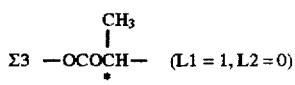

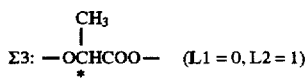

— : single bond.

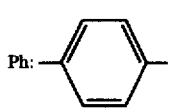
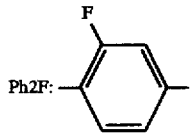

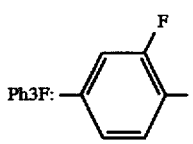
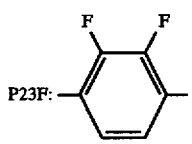

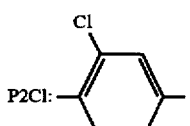
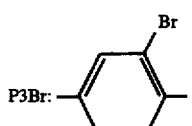

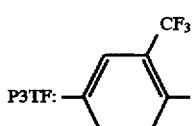
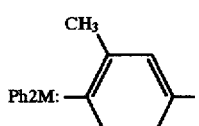

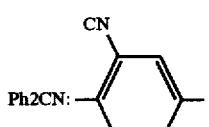
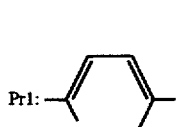

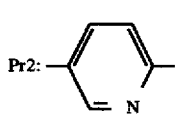
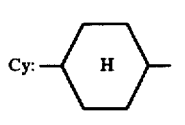

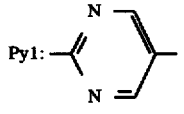
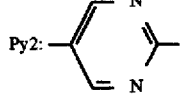

-continued

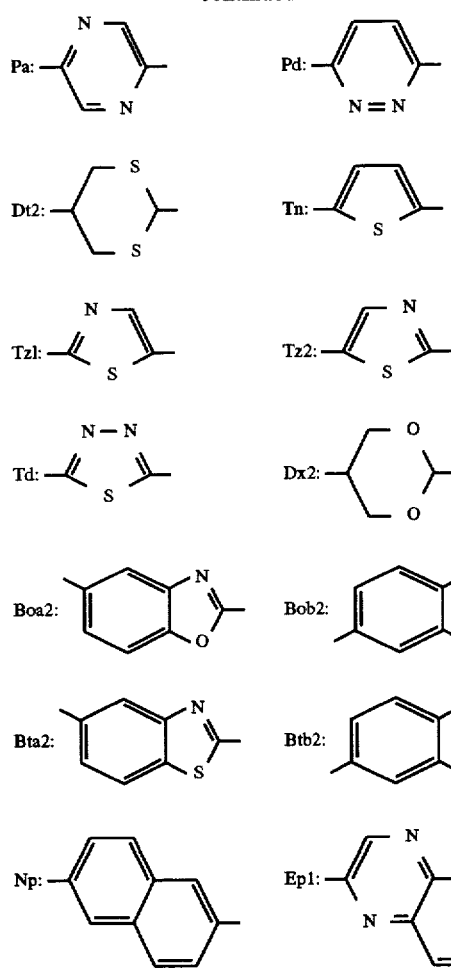

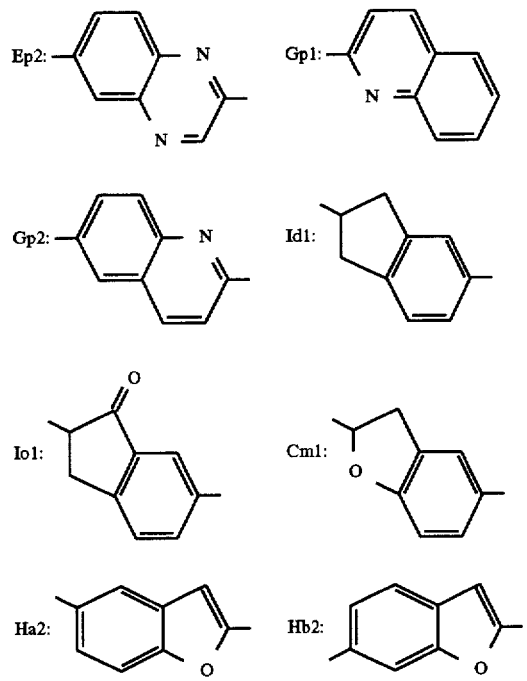

TABLE 1

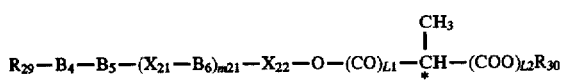

Formula (5)

$$R_{29}-B_4-B_5-(X_{21}-B_6)_{m21}-X_{22}-O-(CO)_{L1}-\overset{\overset{CH_3}{|}}{\underset{*}{C}H}-(COO)_{L2}R_{30}$$

| No. | $R_{29}$ | $B_4$ | $B_5$ | $X_{21}$ | $B_6$ | $X_{22}$ | $\Sigma_0$ | $R_{30}$ |
|---|---|---|---|---|---|---|---|---|
| 1 | $C_6H_{13}$ | Ph | Ph | — | — | — | $\Sigma_1$ | $C_8H_{17}$ |
| 2 | $C_8H_{17}O$ | Ph | Ph | — | — | — | $\Sigma_3$ | $C_8H_{17}$ |
| 3 | $C_5H_{11}O$ | Ph | Ph2F | — | — | — | $\Sigma_1$ | $C_6H_{13}$ |
| 4 | $CH_3O$ | Ph | Ph | — | — | — | $\Sigma_3$ | $C_6H_{13}$ |
| 5 | $C_6H_{13}CH(CH_3)(CH_2)_2O$ | Ph | Ph | — | — | — | $\Sigma_1$ | $C_6H_{13}$ |
| 6 | $C_7H_{15}O$ | Ph | P23F | — | — | — | $\Sigma_3$ | $C_6H_{13}$ |
| 7 | $C_6H_{13}$ | Ph | Ph | — | — | —CO— | $\Sigma_1$ | $C_9H_{19}$ |
| 8 | $C_7H_{15}O$ | Ph | Ph | — | — | —CO— | $\Sigma_3$ | $C_5H_{11}$ |
| 9 | $C_8H_{17}O$ | Ph | Ph | — | — | — | $\Sigma_1$ | $C_6H_{13}$ |
| 10 | $C_8H_{17}$ | Pr1 | Ph | — | — | — | $\Sigma_3$ | $C_8H_{17}$ |
| 11 | $C_{10}H_{21}$ | Pr2 | Ph | — | — | — | $\Sigma_1$ | $C_4H_9$ |
| 12 | $C_{11}H_{23}$ | Pr2 | Ph | — | — | — | $\Sigma_3$ | $C_6H_{13}$ |
| 13 | $C_{12}H_{25}$ | Pr2 | Ph | — | — | — | $\Sigma_1$ | $C_8H_{17}$ |
| 14 | $C_4H_9O$ | Py1 | Ph | — | — | — | $\Sigma_1$ | $C_{10}H_{21}$ |
| 15 | $C_{13}H_{27}$ | Py2 | Ph | — | — | — | $\Sigma_3$ | $C_5H_{11}$ |
| 16 | $C_7H_{15}$ | Py2 | Ph | — | — | — | $\Sigma_2$ | $OC_5H_{11}$ |
| 17 | $C_6H_{13}CH(CH_3)CH_2O$ | Py2 | Ph | — | — | — | $\Sigma_1$ | $C_9H_{19}$ |
| 18 | $C_5H_{11}O$ | Py2 | P23F | — | — | — | $\Sigma_2$ | $C_4H_9$ |
| 19 | $C_{10}H_{21}$ | Py2 | Ph | — | — | — | $\Sigma_3$ | $C_6H_{13}$ |
| 20 | $C_8H_{17}$ | Py2 | Ph$_3$F | — | — | — | $\Sigma_1$ | $C_8H_{17}$ |

TABLE 1-continued

Formula (5)

$$R_{29}-B_4-B_5-(X_{21}-B_6)_{m21}-X_{22}-O-(CO)_{L1}-\overset{CH_3}{\underset{*}{CH}}-(COO)_{L2}R_{30}$$

| No. | $R_{29}$ | $B_4$ | $B_5$ | $X_{21}$ | $B_6$ | $X_{22}$ | $\Sigma_0$ | $R_{30}$ |
|---|---|---|---|---|---|---|---|---|
| 21 | $C_6H_{13}$ | Cy | Ph | — | — | — | $\Sigma_2$ | $OC_4H_9$ |
| 22 | $C_3H_7$ | Cy | Ph | — | — | $-CH_2-$ | $\Sigma_3$ | $C_5H_{11}$ |
| 23 | $C_5H_{11}$ | Cy | Ph | — | — | — | $\Sigma_1$ | $C_4H_9$ |
| 24 | $C_{10}H_{21}$ | Cy | Ph | — | — | $-CO-$ | $\Sigma_3$ | $C_{10}H_{21}$ |
| 25 | $C_6H_{13}$ | Pa | Ph | — | — | — | $\Sigma_3$ | $C_{10}H_{21}$ |
| 26 | $C_7H_{15}OCO$ | Pd | Ph | — | — | — | $\Sigma_1$ | $C_3H_7$ |
| 27 | $C_6H_{13}$ | Dt2 | Ph | — | — | — | $\Sigma_3$ | $C_6H_{13}$ |
| 28 | $C_8H_{17}$ | Tn | Ph | — | — | — | $\Sigma_3$ | $C_9H_{19}$ |
| 29 | $C_5H_{11}$ | Tz1 | Ph | — | — | — | $\Sigma_1$ | $C_9H_{19}$ |
| 30 | $C_9H_{19}O$ | Tz2 | Ph | — | — | — | $\Sigma_2$ | $C_6H_{13}$ |
| 31 | $C_2H_5$ | Td | Ph | — | — | — | $\Sigma_1$ | $C_7H_{15}$ |
| 32 | $C_{10}H_{21}$ | Dx2 | Ph | — | — | — | $\Sigma_1$ | $C_8H_{17}$ |
| 33 | $C_6H_{13}$ | Boa2 | Ph | — | — | — | $\Sigma_2$ | $OC_{10}H_{21}$ |
| 34 | $C_{15}H_{31}$ | Bob2 | Ph | — | — | — | $\Sigma_3$ | $C_{10}H_{21}$ |
| 35 | $C_7H_{17}$ | Bta2 | Ph | — | — | — | $\Sigma_3$ | $C_6H_{13}$ |
| 36 | $C_{16}H_{33}O$ | Btb2 | Ph | — | — | — | $\Sigma_3$ | $C_9H_{19}$ |
| 37 | $C_6H_{13}$ | Np | Ph | — | — | $-CO-$ | $\Sigma_3$ | $C_6H_{13}$ |
| 38 | $C_5H_{11}$ | Np | Ph | — | — | — | $\Sigma_1$ | $C_4H_9$ |
| 39 | $C_8H_{17}CH(CH_3)CH_2O$ | Ep1 | Ph | — | — | — | $\Sigma_3$ | $C_6H_{13}$ |
| 40 | $C_4H_9$ | Ep2 | Ph | — | — | $-CH_2-$ | $\Sigma_1$ | $C_8H_{17}$ |
| 41 | $C_6H_{13}$ | Gp1 | Ph | — | — | — | $\Sigma_2$ | $C_6H_{13}$ |
| 42 | $C_7H_{15}$ | Gp2 | Ph | — | — | — | $\Sigma_1$ | $C_2H_5$ |
| 43 | $C_6H_{13}$ | Cm1 | Ph | — | — | — | $\Sigma_3$ | $C_{10}H_{21}$ |
| 44 | $C_8H_{17}$ | Io1 | Ph | — | — | — | $\Sigma_3$ | $C_2H_5$ |
| 45 | $C_{18}H_{37}$ | Id1 | Ph | — | — | — | $\Sigma_1$ | $C_6H_{13}$ |
| 46 | $C_{11}H_{23}$ | Id1 | Ph | — | — | — | $\Sigma_1$ | $C_5H_{11}$ |
| 47 | $C_8H_{17}$ | Id1 | Ph | — | — | — | $\Sigma_2$ | $C_5H_{11}$ |
| 48 | $C_5H_{11}$ | Id1 | Ph2F | — | — | — | $\Sigma_1$ | $C_6H_{13}$ |
| 49 | $C_6H_{13}$ | Tn | Ph | — | — | — | $\Sigma_3$ | $C_6H_{13}$ |
| 50 | $C_4H_9O$ | Tz2 | Ph | — | — | — | $\Sigma_3$ | $C_8H_{17}$ |
| 51 | $C_{12}H_{25}$ | Btb2 | Ph | — | — | — | $\Sigma_3$ | $C_{10}H_{21}$ |
| 52 | $C_6H_{13}O$ | Btb2 | Ph | — | — | — | $\Sigma_1$ | $C_6H_{13}$ |
| 53 | $CH_2=CH(CH_2)_3O$ | Ep2 | Ph | — | — | — | $\Sigma_2$ | $C_5H_{11}$ |
| 54 | $C_9H_{19}$ | Gp2 | Ph | — | — | — | $\Sigma_1$ | $C_6H_{13}$ |
| 55 | $C_5H_{11}$ | Np | Ph | — | — | — | $\Sigma_3$ | $C_6H_{13}$ |
| 56 | $C_6H_{13}$ | Ph | Ph | — | Ph | — | $\Sigma_3$ | $C_6H_{13}$ |
| 57 | $C_8H_{17}COO$ | Pr2 | Ph | — | Ph | — | $\Sigma_3$ | $C_5H_{11}$ |
| 58 | $C_3H_7$ | Py2 | Ph | — | Ph | — | $\Sigma_3$ | $C_4H_9$ |
| 59 | $C_5H_{11}$ | — | Ha2 | COO | Ph | — | $\Sigma_1$ | $C_4H_9$ ($m_{21}=2$) |
| 60 | $C_6H_{13}$ | Ph | Py2 | COO | Ph | — | $\Sigma_1$ | $C_6H_{13}$ |
| 61 | $C_9H_{19}$ | Ph | Py1 | — | Ph | — | $\Sigma_2$ | $C_6H_{13}$ |
| 62 | $C_{13}H_{27}$ | Ph | Cy | — | P3Br | — | $\Sigma_3$ | $C_5H_{11}$ |
| 63 | $C_{10}H_{21}O$ | Ph | Py1 | — | Ph | — | $\Sigma_3$ | $C_6H_{13}$ |
| 64 | $C_7H_{15}$ | Ph | Py2 | $OCH_2$ | Ph | — | $\Sigma_3$ | $C_5H_{11}$ |
| 65 | $C_4H_9$ | P3TF | Pa | COO | Ph | — | $\Sigma_3$ | $C_6H_{13}$ |
| 66 | $CH_3$ | Hb2 | Ph | — | — | — | $\Sigma_3$ | $C_8H_{17}$ |
| 67 | $C_8H_{17}$ | Ph | Tn | — | Ph | — | $\Sigma_2$ | $(CH_2)_3CH(CH_3)_2$ |
| 68 | $C_2H_5$ | Ph | Tz1 | — | Ph2M | — | $\Sigma_1$ | $C_8H_{17}$ |
| 69 | $C_6H_{13}$ | — | Ph | COO | Ph | — | $\Sigma_1$ | $C_8H_{17}$ |
| 70 | $C_{10}H_{21}$ | Ph | Td | — | Ph | — | $\Sigma_1$ | $(CH_2)_3CH(CH_3)_2$ |
| 71 | $C_{10}H_{21}$ | Ph | Py1 | — | — | — | $\Sigma_2$ | $C_6H_{13}$ |
| 72 | $C_6H_{13}$ | Ph | Py1 | — | — | — | $\Sigma_3$ | $C_4H_9$ |
| 73 | $C_6H_{13}OCO$ | Ph | Py1 | — | — | — | $\Sigma_3$ | $C_6H_{13}$ |
| 74 | $C_7H_{15}$ | Ph | Pr2 | — | — | — | $\Sigma_3$ | $C_3H_{11}$ |
| 75 | $C_9H_{19}$ | Ph | Pr2 | — | — | — | $\Sigma_3$ | $(CH_2)_3CH(CH_3)_2$ |
| 76 | $C_7H_{15}$ | Ph | Pr2 | — | — | — | $\Sigma_1$ | $C_6H_{13}$ |
| 77 | $C_5H_{11}O$ | Py2 | Cy | — | — | — | $\Sigma_1$ | $C_{10}H_{21}$ |
| 78 | $C_4H_9$ | Ph | Cy | — | — | — | $\Sigma_3$ | $C_2H_5$ |
| 79 | $C_{12}H_{25}$ | Ph | Cy | — | — | — | $\Sigma_2$ | $C_5H_{11}$ |
| 80 | $C_6H_{13}=C$ | Ph | Pa | — | — | — | $\Sigma_1$ | $C_{10}H_{21}$ |
| 81 | $C_8H_{17}O$ | Ph | Pd | — | — | — | $\Sigma_2$ | $C_6H_{13}$ |
| 82 | $C_3H_7$ | P2Cl | Tn | — | — | — | $\Sigma_2$ | $C_{10}H_{21}$ |
| 83 | $C_4H_9$ | Ph | Tn | — | — | — | $\Sigma_3$ | $C_8H_{17}$ |
| 84 | $C_8H_{17}$ | Ph | Tz1 | — | — | — | $\Sigma_3$ | $C_8H_{17}$ |
| 85 | $C_4H_9OCH(CH_3)COO$ | Ph | Tz1 | — | — | — | $\Sigma_1$ | $C_7H_{15}$ |
| 86 | $C_6H_{13}$ | Ph2F | Td | — | — | — | $\Sigma_3$ | $(CH_2)_3CH(CH_3)C_6H_{13}$ |
| 87 | $C_5H_{11}$ | Py2 | Np | — | — | — | $\Sigma_1$ | $C_9H_{19}$ |
| 88 | $CH_3$ | Ph | Np | — | — | — | $\Sigma_3$ | $C_2H_5$ |
| 89 | $C_{11}H_{23}$ | Ph | Np | — | — | — | $\Sigma_3$ | $C_6H_{13}$ |
| 90 | $C_5H_{11}$ | Py1 | Ep1 | — | — | — | $\Sigma_3$ | $C_5H_{11}$ |

TABLE 1-continued

Formula (5)

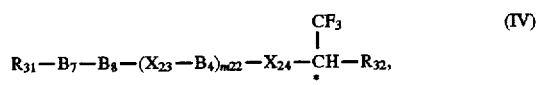

$$R_{29}-B_4-B_5-(X_{21}-B_6)_{m21}-X_{22}-O-(CO)_{L1}-\overset{*}{C}H-(COO)_{L2}R_{30}$$

| No. | $R_{29}$ | $B_4$ | $B_5$ | $X_{21}$ | $B_6$ | $X_{22}$ | $\Sigma_0$ | $R_{30}$ |
|---|---|---|---|---|---|---|---|---|
| 91 | $C_8H_{17}OC_2H_4$ | Ph | Ep1 | — | — | — | $\Sigma_3$ | $C_5H_{11}$ |
| 92 | $C_6H_{13}$ | Ph | Ep1 | — | — | — | $\Sigma_1$ | $C_8H_{17}$ |
| 93 | $C_9H_{19}$ | Py1 | Gp1 | — | — | — | $\Sigma_3$ | $C_5H_{11}$ |
| 94 | $C_8H_{17}$ | Ph | Gp1 | — | — | — | $\Sigma_3$ | $C_6H_{13}$ |
| 95 | $C_3H_7COO$ | Ph | Gp1 | — | — | — | $\Sigma_3$ | $C_8H_{17}$ |
| 96 | $C_4H_9$ | Ph | Id1 | — | — | — | $\Sigma_1$ | $C_8H_{17}$ |
| 97 | $C_{12}H_{25}$ | Ph | Io1 | — | — | — | $\Sigma_3$ | $C_6H_{13}$ |
| 98 | $C_{10}H_{21}$ | Ph | Cm1 | — | — | — | $\Sigma_2$ | $C_8H_{17}$ |
| 99 | $C_6H_{13}$ | Ph | Ph | — | — | — | $\Sigma_3$ | $C_8H_{17}$ |
| 100 | $C_3H_7$ | Ph | Ph | $OCH_2$ | Py1 | — | $\Sigma_3$ | $C_2H_5$ |
| 101 | $C_4H_9$ | Ph2CN | Ph | — | Pr1 | — | $\Sigma_1$ | $C_{10}H_{21}$ |
| 102 | $C_5H_{11}$ | Ph | Ph3F | $OCH_2$ | Tz1 | — | $\Sigma_3$ | $C_6H_{13}$ |
| 103 | $C_6H_{13}$ | Ph | Ph | — | Th | — | $\Sigma_1$ | $C_8H_{17}$ |
| 104 | $C_7H_{15}$ | Tn | Ph | — | Py1 | — | $\Sigma_2$ | $C_8H_{17}$ |
| 105 | $C_{10}H_{21}$ | Ph | Ph | — | Py1 | — | $\Sigma_3$ | $C_5H_{11}$ | formula (6)

$$R_{31}-B_7-B_8-(X_{23}-B_9)_{m22}-X_{24}-\overset{*}{C}H-R_{32}, \quad \text{(IV)}$$

with CF$_3$ on the CH in which $R_{31}$ is a linear or branched alkyl group having 1–18 carbon atoms capable of including at least one —$CH_2$— group which can be replaced by —$Y_3$—, —$Y_3$—CO—, —CO—$Y_3$—, —CO—, —OCOO—, —CH=CH— or —C≡C— wherein $Y_3$ is O or S;

$R_{32}$ is a linear or branched alkyl group having 1–11 carbon atoms;

m22 is 0, 1 or 2;

$B_7$, $B_8$ and $B_9$ independently denote a single bond, 1,4-phenylene; pyridine-2,5-diyl; pyrimidine-2,5-diyl; pyrazine-2,5-diyl; pyridazine-3,6-diyl; 1,4-cyclohexylene; 1,3-dioxane-2,5-diyl; 1,3-dithiane-2,5-diyl; thiophene-2,5-diyl; thiazole2,5-diyl; thiadiazole-2,5-diyl; benzoxazole-2,5-diyl; benzoxazole-2,6-diyl; benzothiazole-2,5-diyl; benzothiazole-2,6-diyl; benzofuran-2,5-diyl; benzofuran-2,6-diyl; quinoxaline-2,6-diyl; quinoline-2,6-diyl; 2,6-naphthylene; indan-2,5-diyl; 2-alkylindan-2,5-diyl having a linear or branched alkyl group having 1–18 carbon atom; indanone-2,6-diyl; 2-alkylindanone-2,6-diyl having a linear or branched alkyl group having 1–18 carbon atoms; coumaran-2,5-diyl; or 2-alkylcoumaran-2,5-diyl having a linear or branched alkyl group having 1–18 carbon atoms;

$X_{23}$ is a single bond, —COO—, —OCO—, —$CH_2O$— or —$OCH_2$—;

$X_{24}$ is —O—, —COO—, —$OCH_2$—, —$OCH_2CH_2$—, —$OCOCH_2$—, —$CH_2O$—, —$COOCH_2CH_2$—, —$CH_2OCH_2CH_2$— or —$CH_2COOCH_2$—; and C* is an asymmetric carbon atom, $B_7$, $B_8$ and $B_9$ each may have one or two substituents comprising F, Cl, Br, $CH_3$, $CF_3$ or CN.

Examples of the compound of the formula (6) may include those as descried in JP-A Nos. 1-160986, 1-242543, 2-000127, 2-069440, 2-295943, 3-043488, 3-058980, 3-083791, 3-193774, 3-223232, 3-236353, 4-013797, 4-253789 and 4-264052. The compound (b) of the formula (6) may be produced through processes as described in these documents.

Specific and preferred examples of the optically active compound of the formula (6) may include those represented by the following structural formulae (Ex. Comp. Nos. 6-1 to 6-105 indicated as Nos. 1–105 in Table 2 below) including abbreviations used for the respective groups listed below in addition to those listed for Table 1. In Table 2, the structural formula (Ex. Comp. No. 6-60 indicated as No. 60) has m22 being 2.

Om: —$OCH_2$—, Od: —$OCH_2CH_2$—, Em: —$OCOCH_2$—, Mo: —$CH_2$—O—, Ced: —$COOCH_2CH_2$—,

Mod: —$CH_2OCH_2CH_2$—, Mce: —$CH_2COOCH_2$—,

Mcd: —$CH_2$—O—$CH_2$—.

TABLE 2

Formula (6)

$$R_{31}-B_7-B_8-(X_{23}-B_9)_{m22}-X_{24}-\overset{*}{C}H-R_{32}$$

with CF$_3$ on the CH

| No. | $R_{31}$ | $B_7$ | $B_8$ | $X_{23}$ | $B_9$ | $X_{24}$ | $R_{32}$ |
|---|---|---|---|---|---|---|---|
| 1 | $C_6H_{13}$ | Ph | Ph | — | — | Om | $C_8H_{17}$ |
| 2 | $C_8H_{17}O$ | Ph | Ph | — | — | Mo | $C_8H_7$ |
| 3 | $C_5H_{11}O$ | Ph | Ph2F | — | — | Om | $C_6H_{13}$ |

TABLE 2-continued

Formula (6)

$$R_{31}-B_7-B_8-(X_{23}-B_4)_{m22}-X_{24}-\overset{CF_3}{\underset{*}{C}H}-R_{32}$$

| No. | R$_{31}$ | B$_7$ | B$_8$ | X$_{23}$ | B$_9$ | X$_{24}$ | R$_{32}$ |
|---|---|---|---|---|---|---|---|
| 4 | CH$_3$O | Ph | Ph | — | — | Om | C$_6$H$_{13}$ |
| 5 | C$_6$H$_{13}$CH(CH$_3$)(CH$_2$)$_2$O | Ph | Ph | — | — | Om | C$_6$H$_{13}$ |
| 6 | C$_7$H$_{15}$O | Ph | P23F | — | — | Em | C$_6$H$_{13}$ |
| 7 | C$_6$H$_{13}$ | Ph | Ph | — | — | Od | C$_9$H$_{19}$ |
| 8 | C$_7$H$_{15}$O | Ph | Ph | — | — | Em | C$_5$H$_{11}$ |
| 9 | C$_8$H$_{17}$O | Ph | Ph | — | — | Om | C$_6$H$_{13}$ |
| 10 | C$_8$H$_{17}$ | Pr1 | Ph | — | — | Em | C$_8$H$_{17}$ |
| 11 | C$_{10}$H$_{21}$ | Pr2 | Ph | — | — | Od | C$_4$H$_9$ |
| 12 | C$_{11}$H$_{23}$ | Pr2 | Ph | — | — | Em | C$_6$H$_{13}$ |
| 13 | C$_{12}$H$_{25}$ | Pr2 | Ph | — | — | Om | C$_8$H$_{17}$ |
| 14 | C$_4$H$_9$O | Py1 | Ph | — | — | Em | C$_{10}$H$_{21}$ |
| 15 | C$_{12}$H$_{25}$ | Py2 | Ph | — | — | Em | C$_4$H$_9$ |
| 16 | C$_6$H$_{13}$ | Py2 | Ph | — | — | Em | C$_8$H$_{17}$ |
| 17 | C$_6$H$_{13}$CH(CH$_3$)CH$_2$O | Py2 | Ph | — | — | Om | C$_9$H$_{19}$ |
| 18 | C$_5$H$_{11}$O | Py2 | P23F | — | — | Em | C$_4$H$_9$ |
| 19 | C$_{10}$H$_{21}$ | Py2 | Ph | — | — | Em | C$_6$H$_{13}$ |
| 20 | C$_8$H$_{17}$ | Py2 | Ph3F | — | — | Om | C$_8$H$_{17}$ |
| 21 | C$_6$H$_{13}$ | Cy | Ph | — | — | Om | C$_4$H$_9$ |
| 22 | C$_3$H$_7$ | Cy | Ph | — | — | Em | C$_5$H$_{11}$ |
| 23 | C$_5$H$_{11}$ | Cy | Ph | — | — | Om | C$_4$H$_9$ |
| 24 | C$_{10}$H$_{21}$ | Cy | Ph | — | — | Em | C$_{10}$H$_{21}$ |
| 25 | C$_6$H$_{13}$ | Pa | Ph | — | — | Om | C$_{10}$H$_{21}$ |
| 26 | C$_7$H$_{15}$OCO | Pd | Ph | — | — | Om | C$_3$H$_7$ |
| 27 | C$_6$H$_{13}$ | Dt2 | Ph | — | — | Em | C$_6$H$_{13}$ |
| 28 | C$_8$H$_{17}$ | Tn | Ph | — | — | Em | C$_9$H$_{19}$ |
| 29 | C$_5$H$_{11}$ | Tz1 | Ph | — | — | Em | C$_9$H$_{19}$ |
| 30 | C$_9$H$_{19}$O | Tz2 | Ph | — | — | Od | C$_6$H$_{13}$ |
| 31 | C$_2$H$_5$ | Td | Ph | — | — | Mo | C$_7$H$_{15}$ |
| 32 | C$_{10}$H$_{21}$ | Dx2 | Ph | — | — | Om | C$_8$H$_{17}$ |
| 33 | C$_6$H$_{13}$ | Boa2 | Ph | — | — | Ced | C$_{10}$H$_{21}$ |
| 34 | C$_{15}$H$_{31}$ | Bob2 | Ph | — | — | Om | C$_{10}$H$_{21}$ |
| 35 | C$_7$H$_{15}$ | Bta2 | Ph | — | — | Om | C$_6$H$_{13}$ |
| 36 | C$_{16}$H$_{33}$O | Btb2 | Ph | — | — | Em | C$_9$H$_{19}$ |
| 37 | C$_6$H$_{13}$ | Np | Ph | — | — | Em | C$_6$H$_{13}$ |
| 38 | C$_5$H$_{11}$ | Np | Ph | — | — | Em | C$_4$H$_9$ |
| 39 | C$_8$H$_{17}$CH(CH$_3$)CH$_2$O | Ep1 | Ph | — | — | Om | C$_6$H$_{13}$ |
| 40 | C$_4$H$_9$ | Ep2 | Ph | — | — | Om | C$_8$H$_{17}$ |
| 41 | C$_6$H$_{13}$ | Gp1 | Ph | — | — | Em | C$_6$H$_{13}$ |
| 42 | C$_7$H$_{15}$ | Gp2 | Ph | — | — | Em | C$_2$H$_5$ |
| 43 | C$_6$H$_{13}$ | Cm1 | Ph | — | — | Om | C$_{10}$H$_{21}$ |
| 44 | C$_8$H$_{17}$ | Io1 | Ph | — | — | Om | C$_2$H$_5$ |
| 45 | C$_{18}$H$_{37}$ | Id1 | Ph | — | — | Em | C$_6$H$_{13}$ |
| 46 | C$_{11}$H$_{23}$ | Id1 | Ph | — | — | Em | C$_5$H$_{11}$ |
| 47 | C$_8$H$_{17}$ | Id1 | Ph | — | — | Od | C$_5$H$_{11}$ |
| 48 | C$_5$H$_{11}$ | Id1 | Ph2F | — | — | Om | C$_6$H$_{13}$ |
| 49 | C$_6$H$_{13}$ | Tn | Ph | — | — | Mo | C$_6$H$_{13}$ |
| 50 | C$_4$H$_9$O | Tz2 | Ph | — | — | Om | C$_8$H$_{17}$ |
| 51 | C$_{12}$H$_{25}$ | Btb2 | Ph | — | — | Om | C$_{10}$H$_{21}$ |
| 52 | C$_6$H$_{13}$O | Btb2 | Ph | — | — | Od | C$_6$H$_{13}$ |
| 53 | CH$_2$=CH(CH$_2$)$_3$O | Ep2 | Ph | — | — | Om | C$_5$H$_{11}$ |
| 54 | C$_9$H$_{19}$ | Gp2 | Ph | — | — | Mcd | C$_6$H$_{13}$ |
| 55 | C$_5$H$_{11}$ | Np | Ph | — | — | Em | C$_6$H$_{13}$ |
| 56 | C$_6$H$_{13}$ | Ph | Ph | COO | Ph | Od | C$_6$H$_{13}$ |
| 57 | C$_8$H$_{17}$COO | Pr2 | Ph | OCO | Ph | Om | C$_5$H$_{11}$ |
| 58 | C$_3$H$_7$ | Py2 | Ph | — | Ph | Em | C$_4$H$_9$ |
| 59 | C$_5$H$_{11}$ | — | Ha2 | — | Ph | Em | C$_4$H$_9$ |
| 60 | C$_6$H$_{13}$ | — | Py2 | COO | Ph | Em | C$_6$H$_{13}$ (m$_{22}$ = 2) |
| 61 | C$_9$H$_{19}$ | Ph | Py1 | — | Ph | Om | C$_6$H$_{13}$ |
| 62 | C$_{13}$H$_{27}$ | Ph | Cy | OCO | P3Br | Em | C$_5$H$_{11}$ |
| 63 | C$_{10}$H$_{21}$O | Ph | Py1 | — | Ph | Om | C$_6$H$_{13}$ |
| 64 | C$_7$H$_{15}$ | Ph | Py2 | OCH$_2$ | Ph | Em | C$_5$H$_{11}$ |
| 65 | C$_4$H$_9$ | P3TF | — | COO | Ph | Om | C$_6$H$_{13}$ |
| 66 | CH$_3$ | Hb2 | Ph | — | — | Em | C$_8$H$_{17}$ |
| 67 | C$_8$H$_{17}$ | Ph | Tn | — | Ph | Om | (CH$_2$)$_3$CH(CH$_3$)$_2$ |
| 68 | C$_2$H$_5$ | Ph | Tz1 | — | Ph2M | Em | C$_8$H$_{17}$ |
| 69 | C$_6$H$_{13}$ | Ph | Ph | — | Ph | Om | C$_8$H$_{17}$ |
| 70 | C$_{10}$H$_{21}$ | Ph | Td | — | Ph | Em | (CH$_2$)$_3$CH(CH$_3$)$_2$ |
| 71 | C$_{10}$H$_{21}$ | Ph | Py1 | — | — | Mce | C$_6$H$_{13}$ |
| 72 | C$_6$H$_{13}$ | Ph | Py1 | — | — | Em | C$_4$H$_9$ |
| 73 | C$_6$H$_{13}$OCO | Ph | Py1 | — | — | Em | C$_6$H$_{13}$ |

TABLE 2-continued

Formula (6)

$$R_{31}-B_7-B_8-(X_{23}-B_4)_{m22}-X_{24}-\underset{*}{\overset{CF_3}{\underset{|}{C}H}}-R_{32}$$

| No. | $R_{31}$ | $B_7$ | $B_8$ | $X_{23}$ | $B_9$ | $X_{24}$ | $R_{32}$ |
|---|---|---|---|---|---|---|---|
| 74 | $C_7H_{15}$ | Ph | Pr2 | — | — | Em | $C_5H_{11}$ |
| 75 | $C_9H_{19}$ | Ph | Pr2 | — | — | Em | $(CH_2)_3CH(CH_3)_2$ |
| 76 | $C_7H_{15}$ | Ph | Pr2 | — | — | Om | $C_6H_{13}$ |
| 77 | $C_5H_{11}O$ | Py2 | Cy | — | — | Em | $C_{10}H_{21}$ |
| 78 | $C_4H_9$ | Ph | Cy | — | — | Om | $C_2H_5$ |
| 79 | $C_{12}H_{25}$ | Ph | Cy | — | — | Em | $C_5H_{11}$ |
| 80 | $C_6H_{13}C\equiv C$ | Ph | Pa | — | — | Em | $C_{10}H_{21}$ |
| 81 | $C_8H_{17}O$ | Ph | Pd | — | — | Om | $C_6H_{13}$ |
| 82 | $C_3H_7$ | P2Cl | Tn | — | — | Em | $C_{10}H_{21}$ |
| 83 | $C_4H_9$ | Ph | Tn | — | — | Em | $C_8H_{17}$ |
| 84 | $C_8H_{17}$ | Ph | Tz1 | — | — | Em | $C_8H_{17}$ |
| 85 | $C_4H_9OCH(CH_3)COO$ | Ph | Tz1 | — | — | Om | $C_7H_{15}$ |
| 86 | $C_6H_{13}$ | Ph2F | Td | — | — | Om | $(CH_2)_3CH(CH_3)C_6H_{13}$ |
| 87 | $C_5H_{11}$ | Py2 | Np | — | — | Em | $C_9H_{19}$ |
| 88 | $CH_3$ | Ph | Np | — | — | Mce | $C_2H_5$ |
| 89 | $C_{11}H_{23}$ | Ph | Np | — | — | Mod | $C_6H_{13}$ |
| 90 | $C_5H_{11}$ | Py1 | Ep1 | — | — | Om | $C_5H_{11}$ |
| 91 | $C_8H_{17}OC_2H_4$ | Ph | Ep1 | — | — | Om | $C_5H_{11}$ |
| 92 | $C_6H_{13}$ | Ph | Ep1 | — | — | Em | $C_8H_{17}$ |
| 93 | $C_9H_{19}$ | Py1 | Gp1 | — | — | Om | $C_5H_{11}$ |
| 94 | $C_8H_{17}$ | Ph | Gp1 | — | — | Em | $C_6H_{13}$ |
| 95 | $C_3H_7COO$ | Ph | Gp1 | — | — | Om | $C_8H_{17}$ |
| 96 | $C_4H_9$ | Ph | Id1 | — | — | Om | $C_8H_{17}$ |
| 97 | $C_{12}H_{25}$ | Ph | Io1 | — | — | Em | $C_6H_{13}$ |
| 98 | $C_{10}H_{21}$ | Ph | Cm1 | — | — | Om | $C_8H_{17}$ |
| 99 | $C_6H_{13}$ | Ph | Ph | — | — | Em | $C_8H_{17}$ |
| 100 | $C_3H_7$ | Ph | — | $OCH_2$ | Py1 | Om | $C_2H_5$ |
| 101 | $C_4H_9$ | Ph2CN | Ph | — | Pr1 | Om | $C_{10}H_{21}$ |
| 102 | $C_5H_{11}$ | Ph | Ph3F | $OCH_2$ | Tz1 | Em | $C_6H_{13}$ |
| 103 | $C_6H_{13}$ | Ph | Ph | OCO | Tn | Om | $C_8H_{17}$ |
| 104 | $C_7H_{15}$ | Tn | Ph | — | Py1 | Od | $C_8H_{17}$ |
| 105 | $C_{10}H_{21}$ | Ph | Ph | — | Cy1 | Em | $C_5H_{11}$ |

Formula (7)

$$R_{33}-(B_{10}-X_{25})_{m23}-B_{11}-B_{12}-X_{26}-O-R_{34}-\underset{*}{\overset{F}{\underset{|}{C}(R_{35})}}-R_{36}$$

in which $R^{33}$ is a linear or branched alkyl group having 1–18 carbon atoms capable of including at least one —$CH_2$— group which can be replaced by —$Y_4$, —$Y_4$—CO—, —CO—$Y_4$—, —CO—, —OCOO—, —CH=CH— or —C≡C— wherein $Y_4$ is O or S;

$R^{36}$ is a linear or branched alkyl group having 1–18 carbon atoms;

m23 is 0, 1 or 2;

$R_{34}$ is —$CH_2$— or —CO—;

$R_{35}$ is H or $CH_3$;

$B_{10}$, $B_{11}$ and $B_{12}$ independently denote a single bond, 1,4-phenylene; pyridine-2,5-diyl; pyrimidine-2,5-diyl; pyrazine-2,5-diyl; pyridazine-3,6-diyl; 1,4-cyclohexylene; 1,3-dioxane-2,5-diyl; 1,3-dithiane-2,5-diyl; thiophene-2,5-diyl; thiazole-2,5-diyl; thiadiazole-2,5-diyl; benzoxazole-2,5-diyl; benzoxazole-2,6-diyl; benzothiazole-2,5-diyl; benzothiazole-2,6-diyl; benzofuran-2,5-diyl; benzofuran-2,6-diyl; quinoxaline-2,6-diyl; quinoline-2,6-diyl; 2,6-naphthylene; indan-2,5-diyl; 2-alkylindan-2,5-diyl having a linear or branched alkyl group having 1–18 carbon atom; indanone-2,6-diyl; 2-alkylindanone-2,6-diyl having a linear or branched alkyl group having 1–18 carbon atoms; coumaran-2,5-diyl; or 2-alkylcoumaran-2,5-diyl having a linear or branched alkyl group having 1–18 carbon atoms;

$X_{25}$ is a single bond, —COO—, —OCO—, —$CH_2O$— or —$OCH_2$;

$X_{26}$ is a single bond or —$CH_2$— when $R_{34}$ is —CO—, or $X_{26}$ is a single bond, —CO— or —$CH_2$— when $R_{34}$ is —$CH_2$—;

C* is an asymmetric carbon atom; and $B_{10}$, $B_{11}$ and $B_{12}$ each may have one or two substituents comprising F, Cl, Br, $CH_3$, $CF_3$ or CN.

Examples of the compound (b) of the formula (7) may include those as described in JP-A Nos. 62093248, 62-198633, 63-088161, 63-104949, 63-107951, 63-122651, 63-022042, 63-192732, 63-196553, 63-196571, 63-215661, 63-216878, 63-218647, 63-225337, 63-243059, 63-303951, 64-022990, 1-272571, 64-031740, 1-121244, 1-207280, 1-038077, 1-265052, 2-028158, 2-069427, 2-069467, 2-115145, 2-000227, 3-227980 and 4-300871.

The compound of the formula (7) may be produced through processes as described in these documents.

Specific and preferred examples of the optically active compound of the formula (7) may include those represented by the following structural formulae (Ex. Comp. Nos. 7-1 to 7-105 indicated as Nos. 1–105 in Table 2 below) including abbreviations used for the respective groups listed below in addition to those listed for Table 1. In Table 3, the structural formula (Ex. Comp. No. 7-64 indicated as No. 64) has m23 being 2.

M1: —CH$_2$—,　Cb: —C(=O)—,　My: —CH$_3$

TABLE 3

Formula (7)

$$R_{33}-(B_{10}-X_{25})_{m25}-B_{11}-B_{12}-X_{26}-O-R_{34}-\overset{F}{\underset{*}{C}}(R_{35})-R_{36}$$

| No. | R$_{33}$ | B$_{10}$ | X$_{25}$ | B$_{11}$ | B$_{12}$ | X$_{26}$ | R$_{34}$ | R$_{35}$ | R$_{36}$ |
|---|---|---|---|---|---|---|---|---|---|
| 1 | C$_6$H$_{13}$ | — | — | Ph | Ph | — | M1 | H | C$_8$H$_{17}$ |
| 2 | C$_8$H$_{17}$O | — | — | Ph | Ph | — | M1 | H | C$_{18}$H$_{37}$ |
| 3 | C$_5$H$_{11}$O | — | — | Ph | Ph2F | — | M1 | H | C$_6$H$_{13}$ |
| 4 | CH$_3$O | — | — | Ph | Ph | — | M1 | H | C$_6$H$_{13}$ |
| 5 | C$_6$H$_{13}$CH(CH$_3$)(CH$_2$)$_2$O | — | — | Ph | Ph | — | M1 | H | C$_6$H$_{13}$ |
| 6 | C$_7$H$_{15}$O | — | — | Ph | P23F | — | M1 | H | C$_6$H$_{13}$ |
| 7 | C$_6$H$_{13}$ | — | — | Ph | Ph | — | M1 | H | C$_9$H$_{19}$ |
| 8 | C$_7$H$_{15}$O | — | — | Ph | Ph | — | M1 | H | C$_5$H$_{11}$ |
| 9 | C$_8$H$_{17}$O | — | — | Ph | Ph | — | M1 | H | C$_6$H$_{13}$ |
| 10 | C$_8$H$_{17}$ | — | — | Pr1 | Ph | — | M1 | H | C$_8$H$_{17}$ |
| 11 | C$_{10}$H$_{21}$ | — | — | Pr2 | Ph | — | M1 | H | C$_4$H$_9$ |
| 12 | C$_{11}$H$_{23}$ | — | — | Pr2 | Ph | — | M1 | H | C$_6$H$_{13}$ |
| 13 | C$_{12}$H$_{25}$ | — | — | Pr2 | Ph | — | M1 | H | C$_8$H$_{17}$ |
| 14 | C$_4$H$_9$O | — | — | Py1 | Ph | — | M1 | H | C$_{10}$H$_{21}$ |
| 15 | C$_{13}$H$_{27}$ | — | — | Py2 | Ph | — | M1 | H | C$_5$H$_{11}$ |
| 16 | C$_{10}$H$_{21}$ | — | — | Py2 | Ph | — | M1 | H | C$_8$H$_{17}$ |
| 17 | C$_6$H$_{13}$CH(CH$_3$)CH$_2$O | — | — | Py2 | Ph | — | M1 | H | C$_9$H$_{19}$ |
| 18 | C$_5$H$_{11}$O | — | — | Py2 | P23F | — | M1 | H | C$_4$H$_9$ |
| 19 | C$_{10}$H$_{21}$ | — | — | Py2 | Ph | — | M1 | H | C$_6$H$_{13}$ |
| 20 | C$_8$H$_{17}$ | — | — | Py2 | Ph3F | — | M1 | H | C$_8$H$_{17}$ |
| 21 | C$_6$H$_{13}$ | — | — | Cy | Ph | — | M1 | H | C$_4$H$_9$ |
| 22 | C$_3$H$_7$ | — | — | Cy | Ph | — | M1 | H | C$_5$H$_{11}$ |
| 23 | C$_5$H$_{11}$ | — | — | Cy | Ph | — | M1 | H | C$_{14}$H$_{29}$ |
| 24 | C$_{10}$H$_{21}$ | — | — | Cy | Ph | — | M1 | H | C$_{10}$H$_{21}$ |
| 25 | C$_6$H$_{13}$ | — | — | Pa | Ph | — | M1 | H | C$_{10}$H$_{21}$ |
| 26 | C$_7$H$_{15}$OCO | — | — | Pd | Ph | — | M1 | H | C$_3$H$_7$ |
| 27 | C$_6$H$_{13}$ | — | — | Dt2 | Ph | — | M1 | H | C$_6$H$_{13}$ |
| 28 | C$_8$H$_{17}$ | — | — | Tn | Ph | — | M1 | H | C$_9$H$_{19}$ |
| 29 | C$_5$H$_{11}$ | — | — | Tz1 | Ph | — | M1 | H | C$_9$H$_{19}$ |
| 30 | C$_9$H$_{19}$O | — | — | Tz2 | Ph | — | M1 | H | C$_6$H$_{13}$ |
| 31 | C$_2$H$_5$ | — | — | Td | Ph | — | M1 | H | C$_7$H$_{15}$ |
| 32 | C$_{10}$H$_{21}$ | — | — | Dx2 | Ph | — | M1 | H | C$_8$H$_{17}$ |
| 33 | C$_6$H$_{13}$ | — | — | Boa2 | Ph | — | M1 | H | C$_{10}$H$_{21}$ |
| 34 | C$_{15}$H$_{31}$ | — | — | Bob2 | Ph | — | M1 | H | C$_{10}$H$_{21}$ |
| 35 | C$_7$H$_{15}$ | — | — | Bta2 | Ph | — | M1 | H | C$_6$H$_{13}$ |
| 36 | C$_{16}$H$_{33}$O | — | — | Btb2 | Ph | — | M1 | H | C$_9$H$_{19}$ |
| 37 | C$_6$H$_{13}$ | — | — | Np | Ph | — | M1 | H | C$_6$H$_{13}$ |
| 38 | C$_5$H$_{11}$ | — | — | Np | Ph | — | Cb | H | C$_4$H$_9$ |
| 39 | C$_8$H$_{17}$CH(CH$_3$)CH$_2$O | — | — | Ep1 | Ph | — | Cb | H | C$_6$H$_{13}$ |
| 40 | C$_4$H$_9$ | — | — | Ep2 | Ph | — | M1 | H | C$_8$H$_{17}$ |
| 41 | C$_6$H$_{13}$ | — | — | Gp1 | Ph | — | M1 | H | C$_6$H$_{13}$ |
| 42 | C$_7$H$_{15}$ | — | — | Gp2 | Ph | — | M1 | H | C$_{12}$H$_{25}$ |
| 43 | C$_6$H$_{13}$ | — | — | Cm1 | Ph | — | M1 | H | C$_{10}$H$_{21}$ |
| 44 | C$_8$H$_{17}$ | — | — | Io1 | Ph | — | M1 | H | C$_{12}$H$_{25}$ |
| 45 | C$_{18}$H$_{37}$ | — | — | Id1 | Ph | M1 | M1 | H | C$_6$H$_{13}$ |
| 46 | C$_{11}$H$_{23}$ | — | — | Id1 | Ph | — | M1 | H | C$_5$H$_{11}$ |
| 47 | C$_8$H$_{17}$ | — | — | Id1 | Ph | — | M1 | H | C$_5$H$_{11}$ |
| 48 | C$_5$H$_{11}$ | — | — | Id1 | Ph2F | — | M1 | H | C$_6$H$_{13}$ |
| 49 | C$_6$H$_{13}$ | — | — | Tn | Ph | — | M1 | H | C$_6$H$_{13}$ |
| 50 | C$_4$H$_9$O | — | — | Tz2 | Ph | — | M1 | H | C$_8$H$_{17}$ |
| 51 | C$_{12}$H$_{25}$ | — | — | Btb2 | Ph | — | M1 | H | C$_{10}$H$_{21}$ |
| 52 | C$_6$H$_{13}$O | — | — | Btb2 | Ph | — | M1 | H | C$_6$H$_{13}$ |
| 53 | CH$_2$=CH(CH$_2$)$_3$O | — | — | Ep2 | Ph | — | M1 | H | C$_5$H$_{11}$ |
| 54 | C$_9$H$_{19}$ | — | — | Gp2 | Ph | — | M1 | H | C$_6$H$_{13}$ |
| 55 | C$_5$H$_{11}$ | — | — | Np | Ph | — | M1 | H | C$_6$H$_{13}$ |
| 56 | C$_6$H$_{13}$ | Ph | — | Ph | Ph | Cb | M1 | H | C$_6$H$_{13}$ |
| 57 | C$_8$H$_{17}$COO | Pr2 | — | Ph | Ph | — | M1 | H | C$_5$H$_{11}$ |
| 58 | C$_3$H$_7$ | Py2 | — | Ph | Ph | — | M1 | H | C$_4$H$_9$ |
| 59 | C$_5$H$_{11}$ | — | — | Ha2 | Ph | — | M1 | H | C$_4$H$_9$ |
| 60 | C$_6$H$_{13}$ | Ph | COO | — | Ph | — | M1 | H | C$_6$H$_{13}$ |
| 61 | C$_9$H$_{19}$ | Ph | — | Pr1 | Ph | — | Cb | H | C$_6$H$_{13}$ |
| 62 | C$_{13}$H$_{27}$ | Ph | — | Cy | P3Br | M1 | Cb | H | C$_5$H$_{11}$ |
| 63 | C$_{10}$H$_{21}$O | Ph | OCO | Py1 | Ph | — | M1 | My | C$_6$H$_{13}$ |

TABLE 3-continued

Formula (7)

$$R_{33}-(B_{10}-X_{25})_{m25}-B_{11}-B_{12}-X_{26}-O-R_{34}-\overset{*}{\underset{|}{C}}(R_{35})-R_{36}$$
$$\phantom{xxxxxxxxxxxxxxxxxxxxxxxxxxxxxxxxxxxxxxxxxxx}F$$

| No. | $R_{33}$ | $B_{10}$ | $X_{25}$ | $B_{11}$ | $B_{12}$ | $X_{26}$ | $R_{34}$ | $R_{35}$ | $R_{36}$ |
|---|---|---|---|---|---|---|---|---|---|
| 64 | $C_7H_{15}$ | Ph | — | Py2 | Ph | — | M1 | H | $C_5H_{11}$ ($m_{23}=2$) |
| 65 | $C_4H_9$ | Ph3TF | COO | — | Ph | — | M1 | H | $C_6H_{13}$ |
| 66 | $CH_3$ | — | — | Hb2 | Ph | — | M1 | H | $C_8H_{17}$ |
| 67 | $C_8H_{17}$ | Ph | — | Tn | Ph | — | M1 | H | $(CH_2)_3CH(CH_3)_2$ |
| 68 | $C_2H_5$ | Ph | — | Tz1 | Ph2M | — | M1 | H | $C_8H_{17}$ |
| 69 | $C_6H_{13}$ | Ph | — | Ph | Ph | — | M1 | H | $C_8H_{17}$ |
| 70 | $C_{10}H_{21}$ | Ph | — | Td | Ph | — | M1 | H | $(CH_2)_3CH(CH_3)_2$ |
| 71 | $C_{10}H_{21}$ | — | — | Ph | Py1 | — | M1 | H | $C_6H_{13}$ |
| 72 | $C_6H_{13}$ | — | — | Ph | Py1 | — | M1 | H | $C_4H_9$ |
| 73 | $C_6H_{13}OCO$ | — | — | Ph | Py1 | — | M1 | H | $C_6H_{13}$ |
| 74 | $C_7H_{15}$ | — | — | Ph | Pr2 | — | M1 | H | $C_5H_{11}$ |
| 75 | $C_9H_{19}$ | — | — | Ph | Pr2 | — | M1 | H | $(CH_2)_3CH(CH_3)_2$ |
| 76 | $C_7H_{15}$ | — | — | Ph | Pr2 | — | M1 | H | $C_6H_{13}$ |
| 77 | $C_5H_{11}O$ | — | — | Py2 | Cy | — | M1 | H | $C_{10}H_{21}$ |
| 78 | $C_4H_9$ | — | — | Ph | Cy | — | M1 | H | $C_{12}H_{25}$ |
| 79 | $C_{12}H_{25}$ | — | — | Ph | Cy | — | M1 | H | $C_5H_{11}$ |
| 80 | $C_6H_{13}\equiv C$ | — | — | Ph | Pa | — | M1 | H | $C_{10}H_{21}$ |
| 81 | $C_8H_{17}O$ | — | — | Ph | Pd | — | M1 | My | $C_6H_{13}$ |
| 82 | $C_3H_7$ | — | — | P2Cl | Tn | — | M1 | H | $C_{10}H_{21}$ |
| 83 | $C_4H_9$ | — | — | Ph | Tn | — | M1 | H | $C_8H_{17}$ |
| 84 | $C_8H_{17}$ | — | — | Ph | Tz1 | — | M1 | H | $C_8H_{17}$ |
| 85 | $C_4H_9OCH(CH_3)COO$ | — | — | Ph | Tz1 | — | M1 | H | $C_7H_{15}$ |
| 86 | $C_6H_{13}$ | — | — | Ph2F | Td | — | M1 | My | $(CH_2)_3CH(CH_3)C_6H_{13}$ |
| 87 | $C_5H_{11}$ | — | — | Py2 | Np | — | M1 | H | $C_9H_{19}$ |
| 88 | $CH_3$ | — | — | Ph | Np | — | M1 | H | $C_{12}H_{25}$ |
| 89 | $C_{11}H_{23}$ | — | — | Ph | Np | — | M1 | H | $C_6H_{13}$ |
| 90 | $C_5H_{11}$ | — | — | Py1 | Ep1 | — | M1 | H | $C_5H_{11}$ |
| 91 | $C_8H_{17}OC_2H_4$ | — | — | Ph | Ep1 | — | M1 | H | $C_5H_{11}$ |
| 92 | $C_6H_{13}$ | — | — | Ph | Ep1 | — | M1 | H | $C_8H_{17}$ |
| 93 | $C_9H_{19}$ | — | — | Py1 | Gp1 | — | M1 | H | $C_5H_{11}$ |
| 94 | $C_8H_{17}$ | — | — | Ph | Gp1 | — | M1 | H | $C_6H_{13}$ |
| 95 | $C_3H_7COO$ | — | — | Ph | Gp1 | — | M1 | H | $C_8H_{17}$ |
| 96 | $C_4H_9$ | — | — | Ph | Id1 | — | M1 | H | $C_8H_{17}$ |
| 97 | $C_{12}H_{25}$ | — | — | Ph | Io1 | Cb | M1 | H | $C_6H_{13}$ |
| 98 | $C_{10}H_{21}$ | — | — | Ph | Cm1 | — | M1 | H | $C_8H_{17}$ |
| 99 | $C_6H_{13}$ | — | — | Ph | Ph | — | M1 | H | $C_8H_{17}$ |
| 100 | $C_3H_7$ | Ph | $OCH_2$ | — | Py1 | — | M1 | H | $C_{12}H_{25}$ |
| 101 | $C_4H_9$ | Ph2CN | — | Ph | Pr1 | — | M1 | H | $C_{10}H_{21}$ |
| 102 | $C_5H_{11}$ | Ph | $CH_2O$ | Ph3F | Tz1 | Cb | M1 | H | $C_6H_{13}$ |
| 103 | $C_6H_{13}$ | Ph | — | Ph | Tn | — | M1 | H | $C_8H_{17}$ |
| 104 | $C_7H_{15}$ | Tn | — | Ph | Py1 | — | M1 | H | $C_8H_{17}$ |
| 105 | $C_{10}H_{21}$ | Ph | — | Ph | Py1 | — | M1 | H | $C_5H_{11}$ |

In the present invention, when the liquid crystal composition assumes a chiral smectic C phase, the liquid crystal composition may preferably have a layer inclination angle δ (in a chiral smectic C phase) of 3–15 degrees in a temperature range of 0°–60° C.

The liquid crystal device according to the present invention may be constituted by disposing the above-described liquid crystal composition, particularly a chiral smectic liquid crystal composition between a pair of substrates each provided with an electrode for applying a voltage to the liquid crystal composition (herein, sometimes referred to as "electrode plate"). At least one (either one or both) of the electrode plates may preferably be provided with an alignment control layer for controlling an alignment state of the liquid crystal composition. The alignment control layer may be subjected to aligning treatment (e.g., rubbing) as desired.

The device according to the present invention may preferably provides a pretilt angle α and the liquid crystal composition (preferably a chiral smectic liquid crystal composition) may preferably be placed in such an alignment state that the chiral smectic liquid crystal shows a tilt angle Ⓗ, a layer inclination angle δ in chiral smectic C phase, and an apparent tilt angle θa satisfying the following relationships (I), (II) and (III) in a temperature range of 0°–60° C., particularly at around room temperature (e.g., 30° C.), in combination with the pretilt angle α:

$$Ⓗ < \alpha + \delta \quad \text{(I)}$$

$$\delta < \alpha \quad \text{(II)}$$

and $$Ⓗ > \theta a > Ⓗ/2 \quad \text{(III)}$$

Generally, in a liquid crystal device utilizing birefringence of a liquid crystal, the transmittance under right angle cross nicols is given by the following equation:

$$I/I_0 = \sin^2 4\theta a \, \sin^2 (\Delta n \cdot d/\lambda)\pi,$$

wherein $I_0$: incident light intensity,
I: transmitted light intensity,
θa: apparent tilt angle, Δn: refractive index anisotropy, d: thickness of the liquid crystal layer, λ: wavelength of the incident light.

The apparent tilt angle θa in a liquid crystal device wherein a non-helical structure extends in a long axis direction of liquid crystal molecules, i.e., in a so-called surface stabilized ferroelectric liquid crystal (SSFLC) device, is recognized as a half of an angle between the average molecular axis directions of (chiral smectic) liquid crystal molecules in a first orientation state and a second orientation state. Incidentally, in the SSFLC device, liquid crystal molecules are aligned in a twisted state in respective molecular axis directions. Thus, an average direction of these molecular axis directions in a taken as an average molecular axis direction.

According to the above equation, it is shown that an apparent tilt angle θa of 22.5 degrees provides a maximum transmittance and the apparent tilt angle θa in a non-helical structure for realizing bistability should desirably be as close as possible to 22.5 degrees in order to provide a high transmittance ($I/I_o$) and a high contrast thereby to enhance a display quality.

Figure 3A:
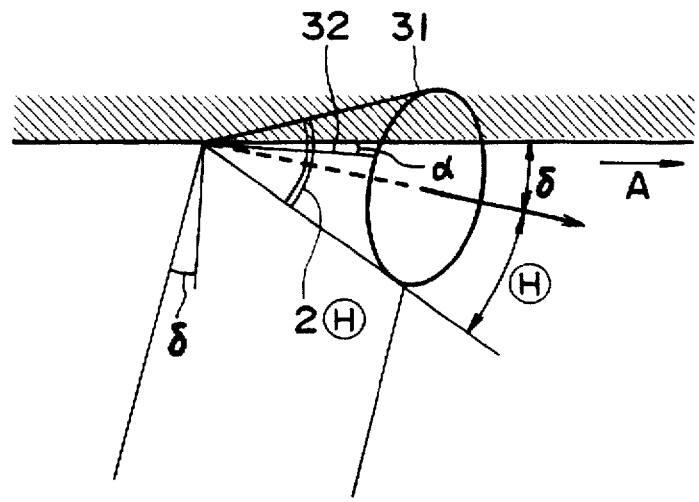
FIGS. 3A and 3B are illustrations of relationship among a tilt angle, a pretilt angle and a layer inclination angle in C1 alignment and C2 alignment, respectively.
Figure 3B:
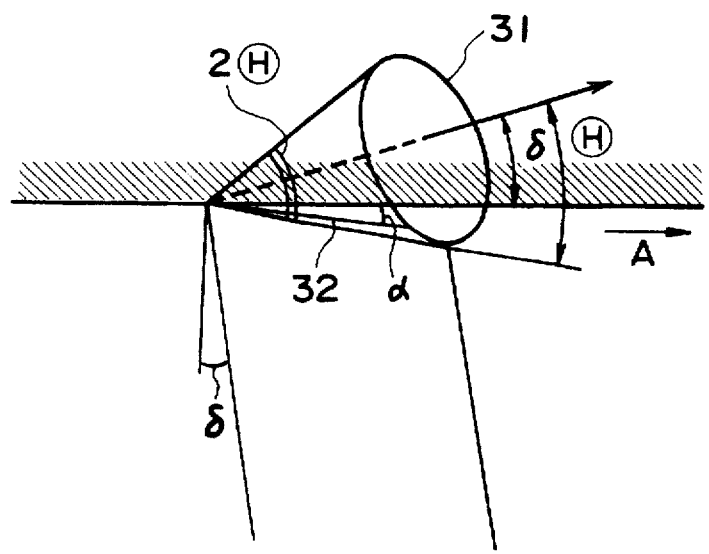

However, it has been found that an apparent tilt angle θa (a half of an angle formed between molecular axes of chiral smectic liquid crystal molecules in two stable states) in a ferroelectric liquid crystal device wherein liquid crystal molecules are aligned or oriented to assume a largely twisted alignment state by using a uniaxially aligned (or rubbing-treated) polyimide film as an alignment control film in a conventional manner has become smaller as compared with a tilt angle $\widehat{H}$ (the angle $\widehat{H}$ is a half of the apex angle of the cone along which chiral smectic liquid crystal molecules move shown in FIG. 3A or 3B as described below). More specifically, the apparent tilt angle θa in a ferroelectric liquid crystal with a non-helical structure was found to be generally on the order of 3–8 degrees, and the transmittance ($I/I_o$) at that time was at most about 3 to 5%.

Figure 2:
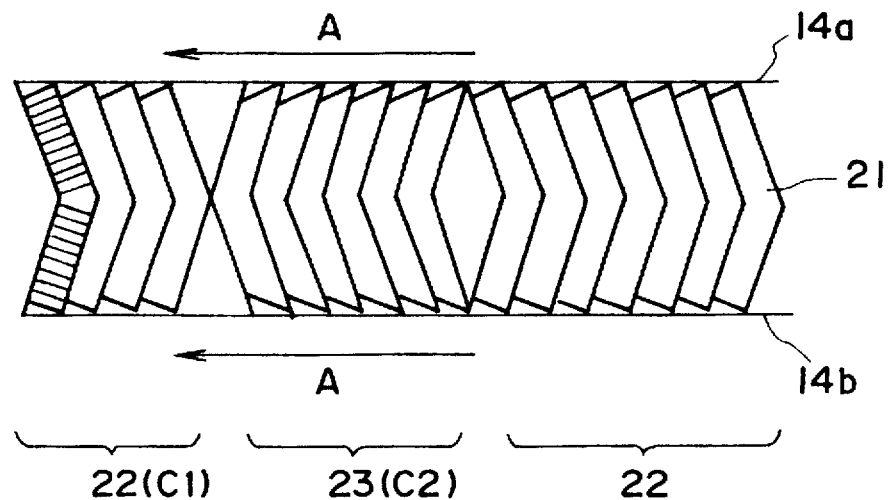
FIG. 2 is an illustration of C1 and C2 alignment states.

Incidentally, a smectic liquid crystal generally has a layer structure and, due to a shrinkage of spacing between layers when it causes a transition from smectic A phase (SmA) to chiral smectic C phase (SmC*) on temperature decrease, it assumes a chevron structure as shown in FIG. 2 where liquid crystal layers 21 are bent at a mid point between a pair of substrates provided with alignment control films 14a and 14b.

Referring to FIG. 2, there are two alignment states depending on the bending directions including a direction of a C1 alignment state 22 appearing immediately after transition from a higher temperature phase to SmC* phase and a direction of a C2 alignment state 23 which appears in mixture with the C1 alignment state on further cooling. It have been further discovered that in C1 alignment state, two stable states providing a high contrast (hereinafter inclusively called "uniform state") are formed in addition to hitherto-found two stable states providing low contrast (hereinafter inclusively called "twist (or splay) state") wherein liquid crystal directors are twisted between the substrates.

These states can be transformed from one to the other by applying a certain electric field. More specifically, transition between two twist states is caused under application of weak positive and negative pulse electric fields, and transition between two uniform states is caused under application of strong positive and negative pulse electric fields. By using the two uniform states in C1 alignment, it is possible to provide a large apparent tilt angle θa, thus realizing a display device which is brighter and shows a higher contrast than the conventional devices. Accordingly, it is expected that a display with a higher quality can be realized by using a display device wherein the entire display area is formed in C1 alignment state and the high-contrast two states in C1 alignment (C1 uniform state) are used as two states representing white and black display states.

Referring to FIGS. 3A and 3B, directors of liquid crystal molecules in the vicinity of the substrates in the C1 alignment and C2 alignment are disposed on cones 31 shown in FIGS. 3A and 3B, respectively. As is well known, as a result of uniaxial aligning treatment, such as rubbing, liquid crystal molecules contacting a substrate surface form a pretilt angle α, the direction of which is such that the liquid crystal molecules 32 raise a forward end up (i.e., are spaced from the substrate surface) in the direction of the rubbing indicated by an arrow A (as shown also in FIG. 2). From the above, it is required that the following relationships are satisfied among a tilt angle $\widehat{H}$, the pretilt angle α and a layer inclination angle δ (an angle formed between the smectic layer line and a normal to the substrate):

$$\widehat{H} + \delta > \alpha \text{ in C1 alignment,}$$

and $$\widehat{H} - \delta > \alpha \text{ in C2 alignment.}$$

Accordingly, the condition for preventing the formation of C2 alignment but allowing C1 alignment is $$\widehat{H} - \delta > \alpha, \text{ that is}$$

$$\widehat{H} < \alpha + \delta \quad \quad \text{(I).}$$

Further, from simple consideration of a torque acting on a liquid crystal molecule at a boundary surface in switching from one position to the other position under an electric field, the relationship of $\alpha > \delta$ ... (II) is given as a condition for easy switching of such a liquid crystal molecule at the boundary.

Accordingly, in order to form the C1 alignment more stably, it is effective to satisfy the condition (II) in addition to the condition (I).

From further experiments under the conditions of (I) and (II), the apparent tilt angle θa is increased from 3–8 degrees obtained when the above conditions (I) and (II) are not satisfied to 8–16 degrees when the above conditions (I) and (II) are satisfied, and also an empirical relationship of $\widehat{H} > \theta a > \widehat{H}/2$ ... (III) has been also found between the tilt angle $\widehat{H}$ and apparent tilt angle θa.

As described above, it has been clarified that the satisfaction of the conditions (I), (II) and (III) provides a display device capable of displaying a high-contrast image.

The liquid crystal device according to the present invention may preferably include alignment control layers disposed on both opposite surfaces of the pair of substrates. Further, at least one of the alignment control layers may preferably be subjected to a uniaxial aligning treatment for aligning liquid crystal molecules in one direction, so that the respective uniaxial alignment axes may be parallel to each other or preferably intersect with each other at a prescribed crossing angle to control an alignment state of the liquid crystal molecules. In this instances, the liquid crystal device may preferably satisfy the above C1 uniform conditions (I), (II) and (III).

In order to further stably form the above-mentioned C1 alignment state and uniform alignment state to provide a good alignment state (C1 uniform alignment state), the above-described crossing angle may preferably be in a range of above 0 degrees to at most 25 degrees, more preferably 1-25 degrees. Further, the liquid crystal device may preferably provide a pretilt angle of at least 5 degrees.

A preferred embodiment of the liquid crystal device will now be described with reference to FIG. 1 which is a schematic sectional view of the device. Referring to FIG. 1, the device includes a pair of substrates (glass plates) 11a and 11b coated with transparent electrodes 12a and 12b, respectively, of $In_2O_3$, $SnO_2$, ITO (indium tin oxide), etc., then successively further coated with insulating films 13a and 13b and alignment control films 14a and 14b, respectively.

The insulating films 13a and 13b may comprise a film of an inorganic substance or an organic substance as shown hereinbelow. Examples of such an inorganic substance may include silicon nitride, silicon carbide containing hydrogen, silicon oxide, boron nitride, boron nitride containing hydrogen, cerium oxide, aluminum oxide, zirconium oxide, titanium oxide, and magnesium fluoride.

The insulating film 13a or 13b may be formed in a single layer or plural layers, as desired, and has a short circuit-preventing function between opposite substrates (opposite electrode). On the insulating film 13a or 13b, it is possible to form a coating-type insulating layer of, e.g., Ti—Si by a known coating method. Further, in order to prevent liquid crystal movement at the time of driving a liquid crystal device, the insulating film 13a or 13b may comprise an insulating coating film containing insulating beads, such as silica beads by which the alignment control film formed thereon can be roughened to provide the alignment control film with an uneven or roughened surface (not shown).

The alignment control films 14a and 14b may comprise a film of an organic substance or inorganic substance as shown above. Examples of such an organic substance may include polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, acrylic resin, and photoresist resin.

These insulating films 13a and 13b and alignment control films 14a and 14b may be formed in a single layer of an inorganic or organic insulating alignment control layer as desired.

The alignment control film 14a or 14b may be formed in a single layer or plural layers as described above. In either case, at least one of such an alignment control films may be subjected to uniaxial aligning treatment, such as rubbing with, e.g., a gauze or acetate fiber planted cloth.

The insulating films 13a and 13b and alignment control films 14a and 14b each comprising an inorganic substance may be formed by vapor deposition, while those each comprising an organic substance may be formed by applying a solution of an organic substance or a precursor thereof in a concentration of 0.1 to 20 wt. %, preferably 0.2-10 wt. %, by spinner coating, dip coating, screen printing, spray coating or roller coating, followed by curing or hardening under prescribed hardening condition (e.g., by heating). The insulating films 13a and 13b and alignment control films 14a and 14b may have a thickness of ordinarily 3-1000 nm, preferably 4-300 nm, further preferably 4-100 nm, respectively.

In case where the liquid crystal device is used as a color liquid crystal display device, at least one glass substrates 11a and 11b is provided with a dotted or lined color filter pattern comprising various color materials of red (R), green (G), blue (B), white or transparent (W), etc. (not shown).

The color filter pattern formed on the glass substrate may be coated with a smoothing layer comprising an inorganic or organic material so as to minimize a stepwise difference between lines or dots constituting a color filter. Further, between the lines or dots of the color filter, a black light-interrupting (masking) layer comprising a metal or resin material may preferably be disposed (not shown) in order to prevent color-mixing of the respective colors. In such a color liquid crystal display device, the transparent electrode 11a and 11b may be designed in a prescribed pattern depending on the shape of the color filter pattern.

Between the substrates 11a and 11b is disposed a (chiral smectic) liquid crystal composition 15, and the spacing (cell gap) between the substrates 11a and 11b is set to a value (e.g., 0.1-20 µm, preferably 0.5-3µm). The small spacing (e.g., 0.5-3 µm) is sufficiently small to suppress the formation of a helical structure of the (chiral smectic) liquid crystal composition 15, thus resulting in bistable alignment states of the liquid crystal composition 15. The small spacing is held by spacer beads 16 composed of, e.g., silica beads, alumina beads, polymer film, glass fiber, etc., dispersed between the substrates. Further, it is possible to dispose (preferably disperse) particles of an adhesive agent between the spacing in order to hold and reinforce the spacing formed by spacer beads 16 and a sealing agent (not shown) and to improve a shock (impact) resistance of the resultant device (cell).

The periphery of the glass substrates IIa and 11b is sealed up with a sealing agent (not shown) such Further,y adhesive.

Further, outside the glass substrates 11a and 11b, a pair of polarizers 17a and 17b are applied to the respective glass substrates.

Incidentally, the crossing angle referred to herein as described above may be defined as follows.

The crossing angle may be determined by an angle (e.g., a positive crossing angle in the counterclockwise direction) formed between a uniaxial alignment axis provided to the upper alignment film 14a and that provided to the lower alignment film 14b on the basis of the latter axis when viewed from the upper alignment film 14a side. These alignment axes may preferably be directed in the same direction and intersect with each other at a crossing angle of within ±25 degrees, preferably at a crossing angle of above 0 degrees (as absolute value) and at most 25 degrees (as absolute value), particularly 1-25 degrees (as absolute value).

In forming a transmission-type liquid crystal device, the liquid crystal apparatus of the present invention may include a light source (not shown) disposed outside either one of the polarizers 17a and 17b.

The liquid crystal apparatus may include the above-mentioned liquid crystal device, drive means (e.g., drive circuit) and a light source as a backlight. The liquid crystal apparatus may preferably be a liquid crystal display apparatus.

Figure 9:
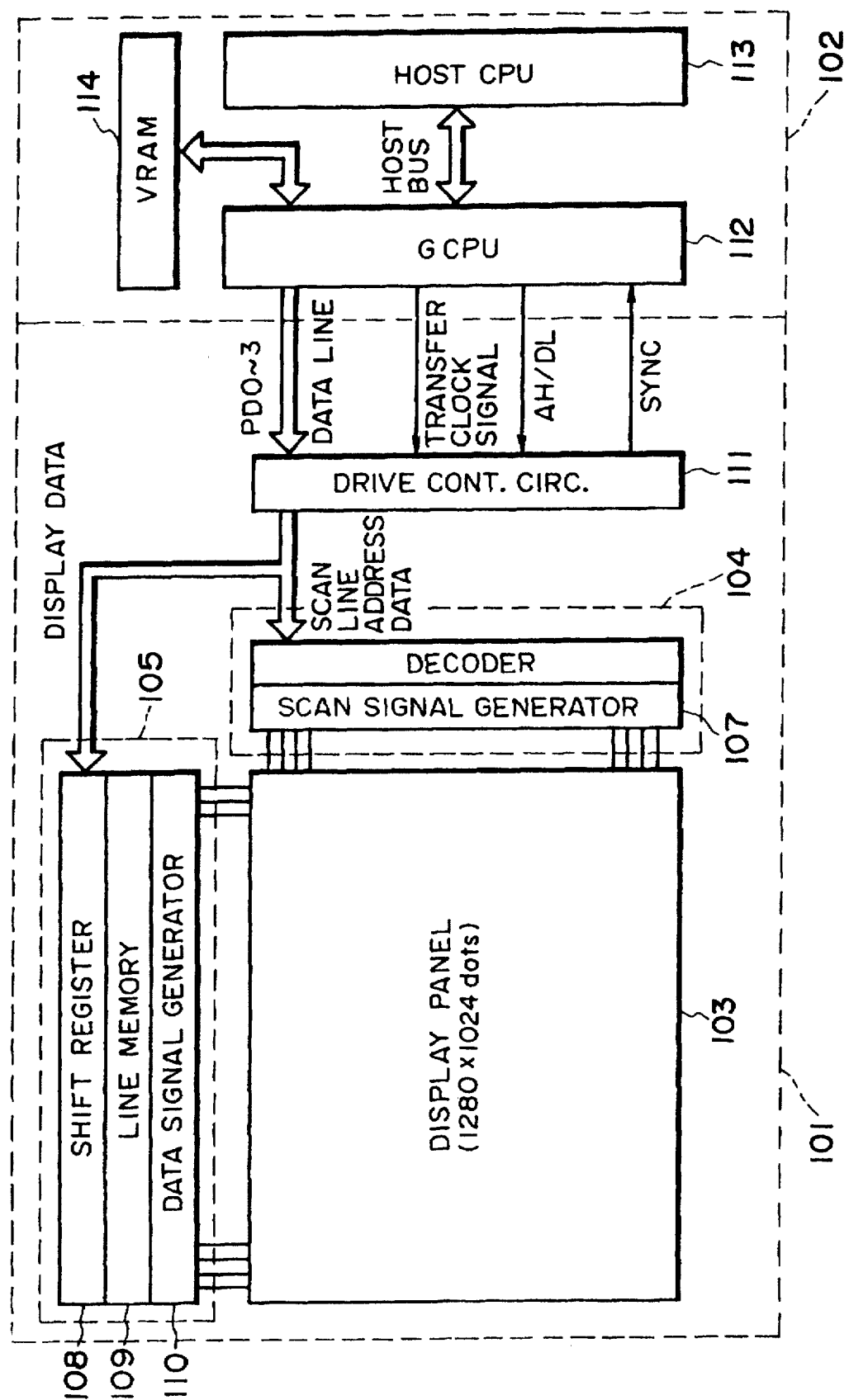
FIG. 9 is a block diagram of a liquid crystal display apparatus and a graphic controller.
Figure 10:
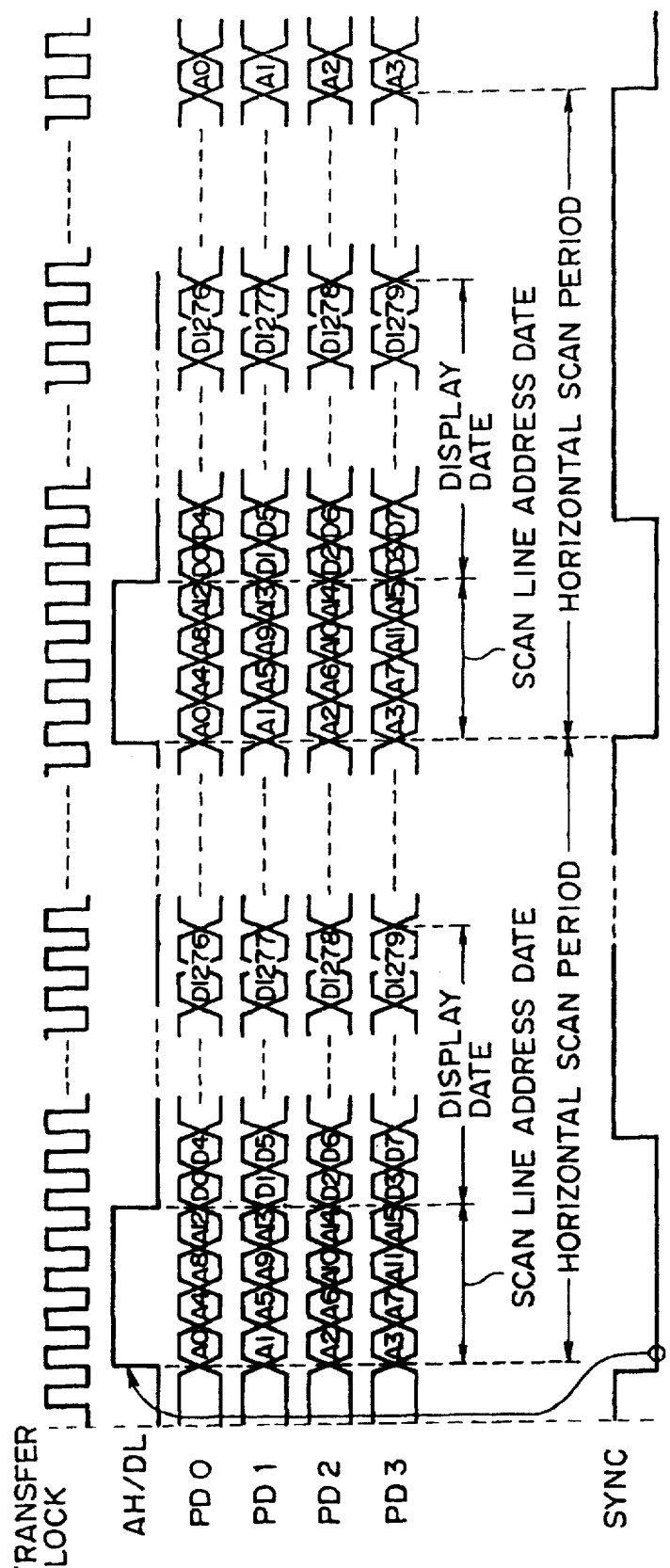
FIG. 10 is a time chart showing time correlation for image data communication between the liquid crystal display apparatus and the graphic controller.

The liquid crystal display apparatus may be constituted by using the liquid crystal device for a display panel and by adopting an arrangement and data format comprising image data accompanied with scanning line address data and also a communication synchronization scheme using a SYNC signal as shown in FIGS. 9 and 10.

Referring to FIG. 9, the liquid crystal display apparatus 101 includes a graphic controller 102, a display panel 103, a scanning line drive circuit 104, a data line drive circuit 105, a decoder 106, a scanning signal generator 107, a shift resistor 108, a line memory 109, a data signal generator 110, a drive control circuit 111, a graphic central processing unit (GCPU) 112, a host central processing unit (host CPU) 113, and an image data storage memory (VRAM) 114.

Image data are generated in the graphic controller 102 in an apparatus body and transferred to the display panel 103 by signal transfer means shown in FIGS. 9 and 10. The graphic controller 102 principally comprises a CPU (or GCPU, central processing unit) 112 and a VRAM (video-RAM, image data storage memory) 114 and is in charge of management and communication of image data between a host CPU 113 and the liquid crystal display apparatus (FLCD) 101. The control of image display in the present invention is principally accomplished by the graphic controller 102. Incidentally, a light source is disposed at the back of the display panel 103.

A simple matrix-type display apparatus using a liquid crystal device comprising a (chiral smectic or ferroelectric) liquid crystal composition disposed between a pair of substrates as described above may be driven by driving methods as disclosed by, e.g., JP-A 59-193426, JP-A 59-193427, JP-A 60-156046 and JP-A 60-156047.

Figure 4:
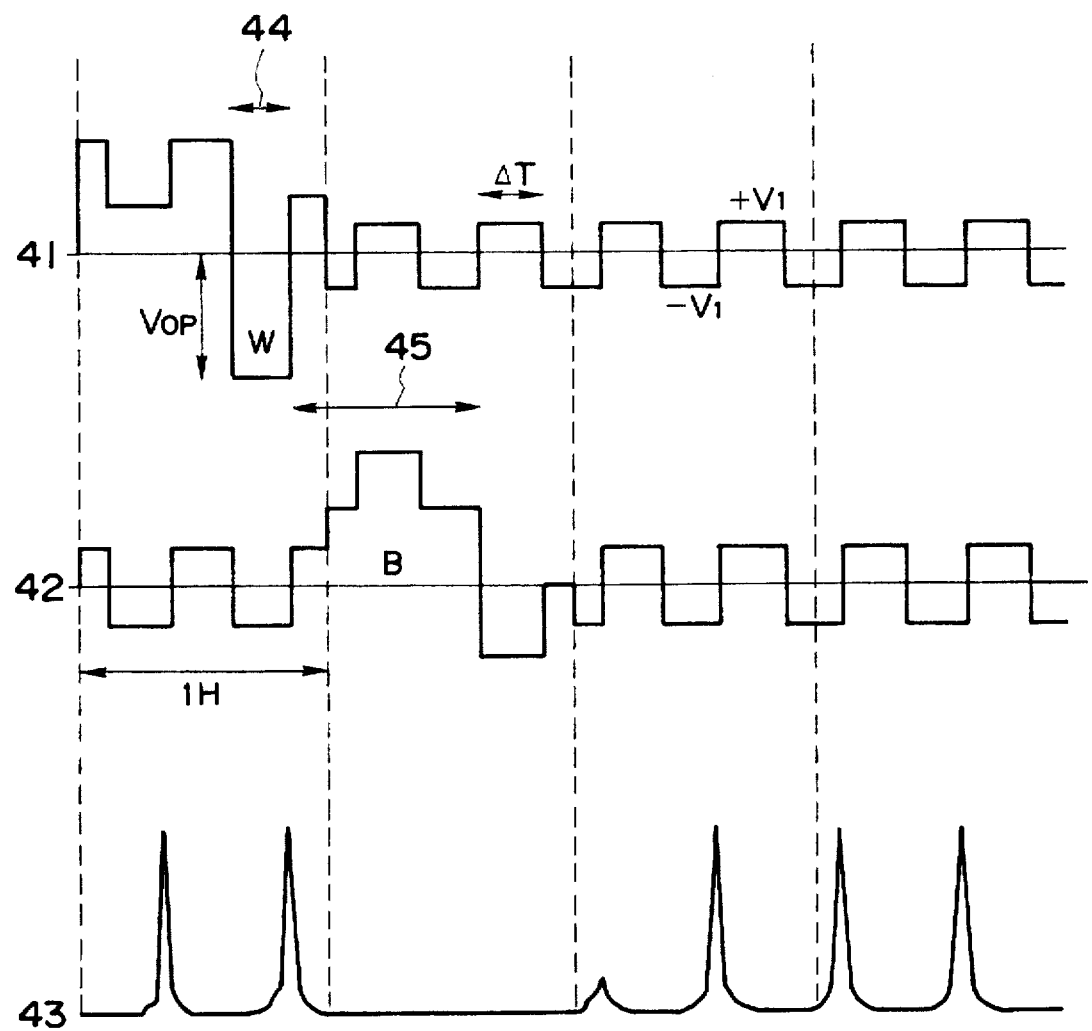
FIG. 4 is a waveform diagram illustrating driving waveforms and an optical response waveform in an embodiment of the present invention.

FIG. 4 is a waveform diagram showing an example set of driving waveforms used in such a driving method.

More specifically, FIG. 4 shows an embodiment of a set of drive waveforms and an optical response waveform, wherein a waveform 41 represents a voltage waveform for displaying a "white" state, a waveform 42 represents a voltage waveform for displaying a "black" state, and a waveform 43 represents an optical response waveform under application of the waveform 42. Referring to FIG. 4, in these waveforms 41 and 42, an electric field required to display "white" or "black" on each matrix or pixel at each intersection of scanning electrodes and data electrodes is applied in a selection period 44 or 45, respectively. In other periods (non-selection periods), weak positive and negative pulse electric fields not causing re-writing of "white" or "black" are alternately applied for a long period of time which by far exceeds the selection period (44 or 45) of time.

Figure 5:
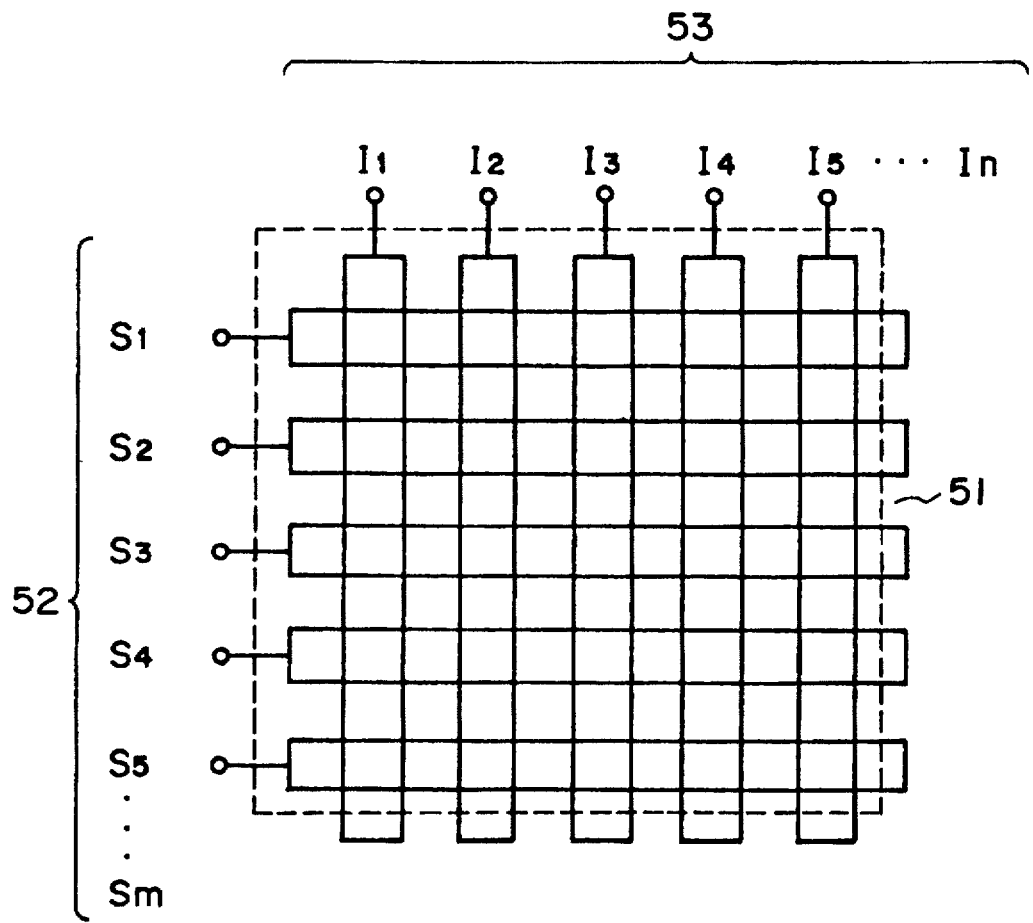
FIG. 5 is a plan view of an electrode matrix.

FIG. 5 is a plan view showing an electrode matrix used in a chiral smectic liquid crystal panel 51 of a simple matrix-type. The liquid crystal panel 51 shown in FIG. 5 includes scanning electrodes 52 and data electrodes 53 intersecting each other so as to constitute a pixel at each intersection together with a (chiral smectic) liquid crystal disposed between the scanning electrodes 52 and data electrodes 53.

Figure 6A:
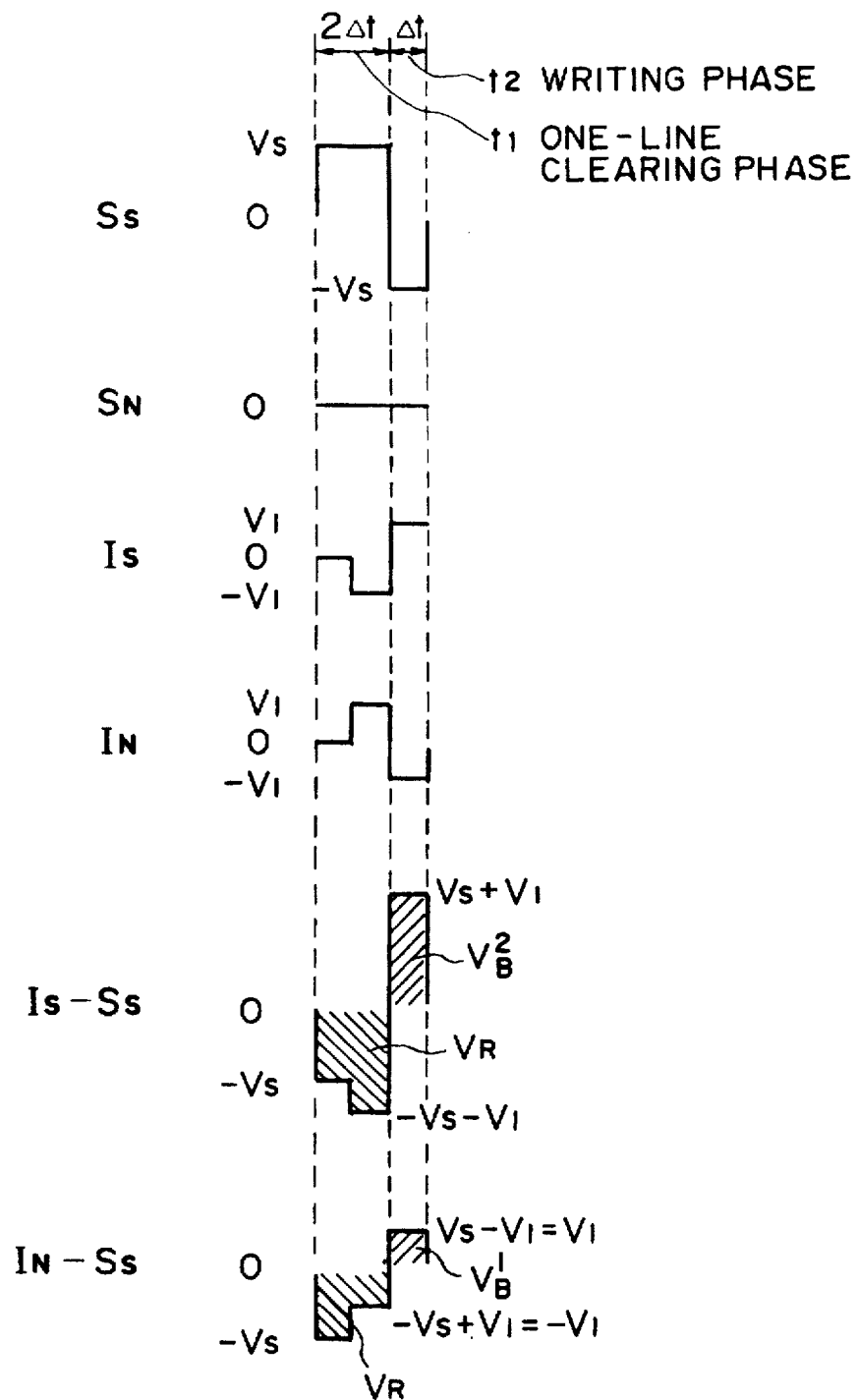
FIG. 6A shows an embodiment of unit driving waveforms and FIG. 6B is time-serial waveforms comprising a succession of such unit waveforms.
Figure 6B:
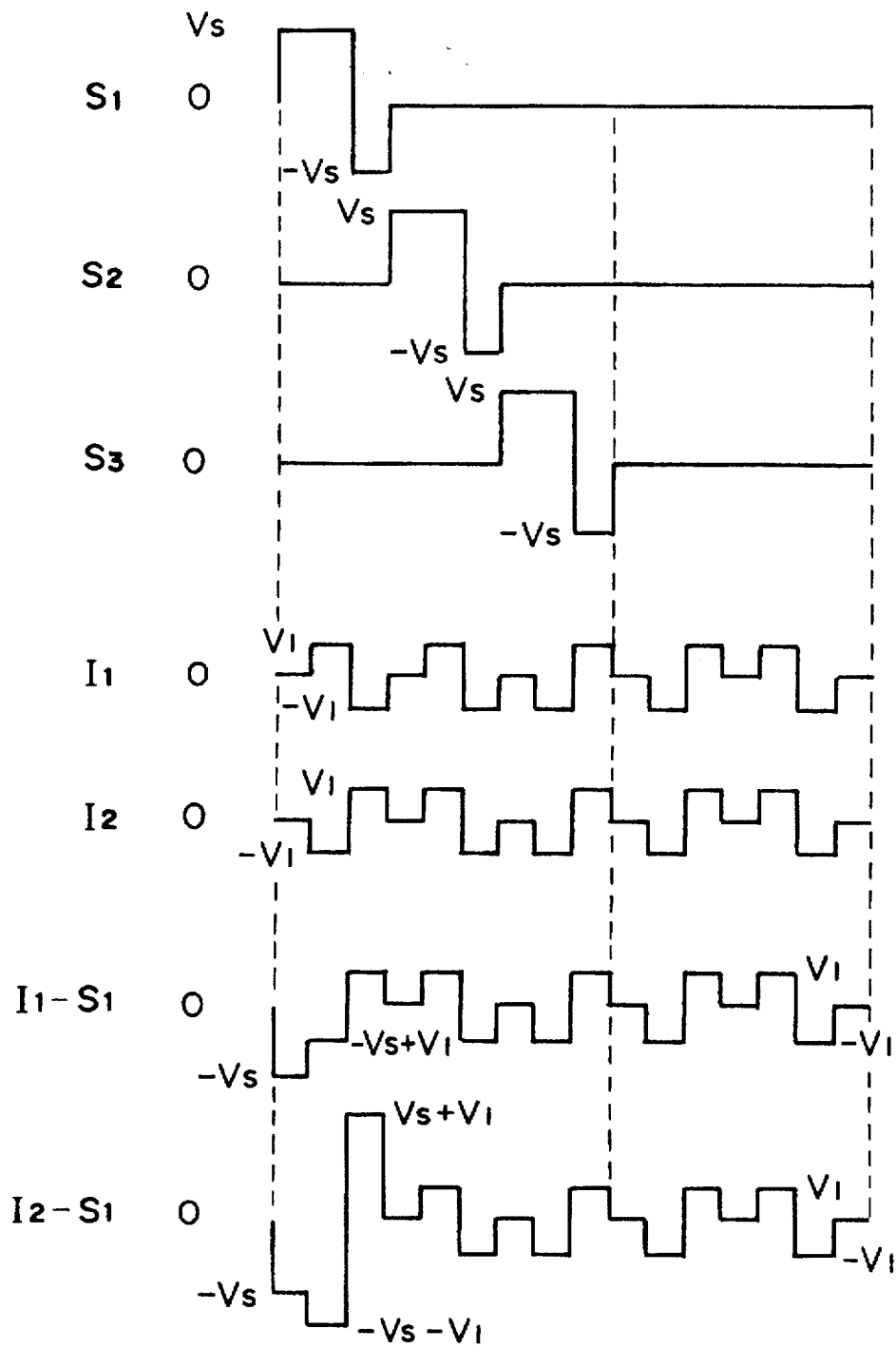

FIGS. 6A and 6B are waveform diagrams showing another example set of driving waveforms used in the above-described driving method.

Figure 7:
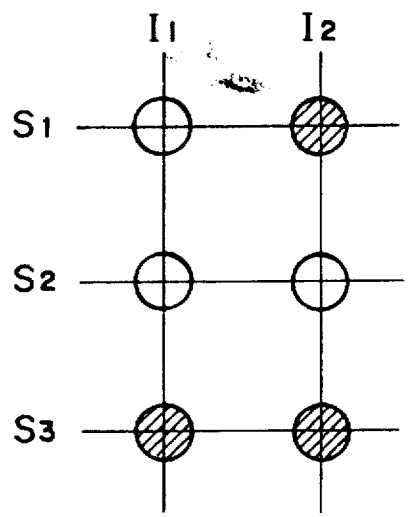
FIG. 7 is an illustration of a display pattern obtained by an actual drive using the time-serial waveforms shown in FIG. 6B.

Referring to FIG. 6A, at $S_S$ is shown a selection scanning signal waveform applied to a selected scanning line, at $S_N$ is shown a non-selection scanning signal waveform applied to a non-selected scanning line, at $I_S$ is shown a selection data signal waveform (providing a black display state) applied to a selected data line, and at $I_N$ is shown a non-selection data signal waveform applied to a non-selected data line. Further, at $I_S$–$S_S$ and $I_N$–$S_S$ in the figure are shown voltage waveforms applied to pixels on a selected scanning line, whereby a pixel supplied with the voltage $I_S$–$S_S$ assumes a black display state and a pixel supplied with the voltage $I_N$–$S_S$ assumes a white display state. FIG. 6B shows a time-serial waveform used for providing a display state as shown in FIG. 7.

In the driving embodiment shown in FIGS. 6A and 6B, a minimum duration (application time) Δt of a single polarity voltage applied to a pixel on a selected scanning line corresponds to the period of a writing phase $t_2$, and the period of a one-line clearing phase $t_1$ is set to 2Δt.

The parameters $V_S$, $V_I$ and Δt in the driving waveforms shown in FIGS. 6A and 6B are determined depending on switching characteristics of a liquid crystal material used.

Figure 8:
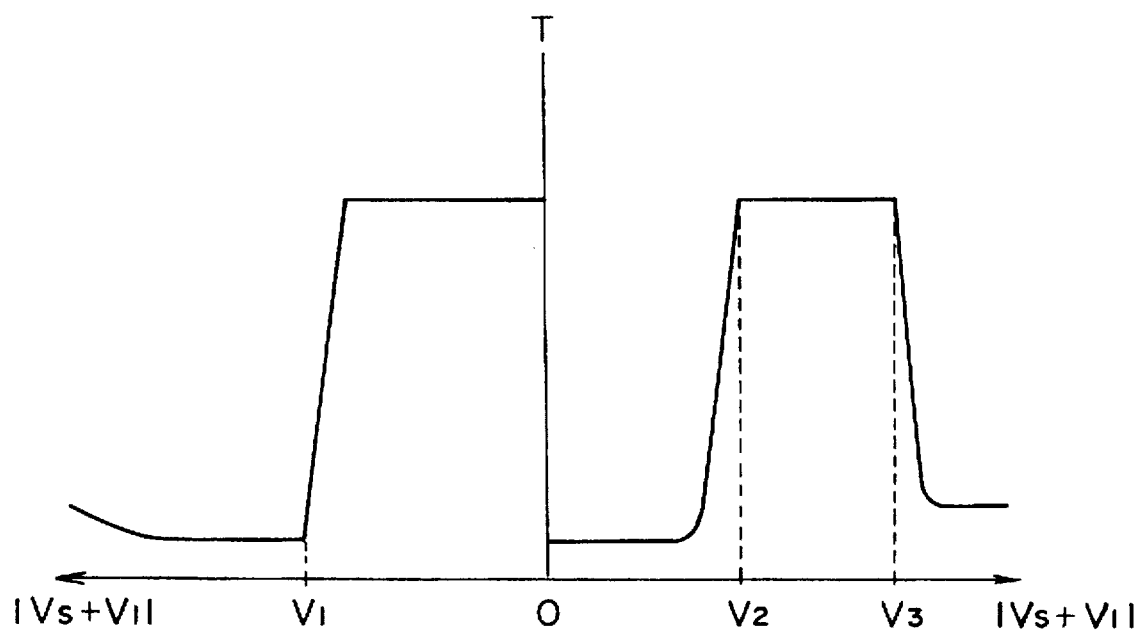
FIG. 8 is a V-T characteristic chart showing a change in transmittance under application of different drive voltages.

FIG. 8 shows a V–T characteristic, i.e., a change in transmittance T when a driving voltage denoted by ($V_S$+$V_I$) is changed while a bias ratio as mentioned hereinbelow is kept constant. In this embodiment, the parameters are fixed at constant values of Δt=50 μs and a bias ratio $V_I/(V_I+V_S)$ =1/3. On the right side of FIG. 8 is shown a result when the voltage ($I_N$–$S_S$) shown in FIG. 6A is applied to a pixel concerned, and on the left side of FIG. 8 is shown a result when the voltage ($I_S$–$S_S$) is applied to a pixel concerned, respectively while increasing the voltage ($V_S$+$V_I$). On both sides of the ordinate, the absolute value of the voltage ($V_S$+$V_I$) is separately indicated. At ($I_N$–$S_S$) and ($I_S$–$S_S$), a previous (display) state is cleared by applying a voltage $V_R$ and a subsequent (display) state is determined by voltages $V_B^1$ and $V_B^2$, respectively. Referring to FIG. 8, a relationship of $V_2$<$V_1$<$V_3$ holds. The voltage $V_1$ may be referred to as a threshold voltage in actual drive and the voltage $V_3$ may be referred to as a crosstalk voltage. More specifically, as shown in FIG. 6A, a voltage $V_1$ denotes a voltage value causing switching by applying a voltage signal $V_B^2$ and a voltage $V_3$ denotes a voltage value causing switching by applying a voltage signal $V_B^1$. Further, a voltage $V_2$ denotes a voltage value required for clearing the previous state by applying a voltage signal $V_R$. The crosstalk voltage $V_3$ is generally present in actual matrix drive of a ferroelectric liquid crystal device. In an actual drive, ΔV=($V_3$–$V_1$) provides a range of $|V_{s+vl}|$ allowing a matrix drive and may be referred to as a (drive) voltage margin, which is preferably large enough. It is of course possible to increase the value of $V_3$ and thus ΔV (=$V_3$–$V_1$) by increasing the bias ratio (i.e., by causing the bias ratio to approach a unity). However, a large bias ratio corresponds to a large amplitude of a data signal and leads to an increase in flickering and a lower contrast, thus being undesirable in respect of image quality. According to our study, a bias ratio of about 1/3–1/4 was practical. On the other hand, when the bias ratio is fixed, the voltage margin ΔV strongly depends on the switching characteristics of a liquid crystal material used, and it is needless to say that a liquid crystal material providing a large ΔV is very advantageous for matrix drive.

Further, it is possible to drive the liquid crystal device by changing a voltage application time (duration) Δt while keeping the driving voltage ($V_I$+$V_S$) so as to provide a certain (constant) value. In this case, the drive characteristic of the liquid crystal device can be evaluated in terms of a duration margin (voltage application time margin) ΔT=Δt$_2$–Δt$_1$ wherein Δt$_1$ denotes a threshold duration and Δt$_2$ denotes a crosstalk duration. The duration margin ΔT means a duration allowing a matrix drive under application of a certain driving voltage ($V_I$+$V_S$).

The upper and lower limits of application voltages or durations and a difference therebetween (driving voltage margin ΔV or duration margin ΔT) by which selected pixels are written in two states of "black" and "white" and non-selected pixels can retain the written "black" and "white" states at a constant temperature as described above, vary depending on and are intrinsic to a liquid crystal material used and a cell structure employed. Further, the driving margin (voltage or duration margin) is changed according to a change in environmental temperature, so that optimum driving conditions should be required of an actual display apparatus in view of a liquid crystal material used, a cell (device) structure and an environmental temperature.

The values of tilt angle (Ⓗ), apparent tilt angle θa, layer inclination angle δ in smectic layer, pretilt angle α and spontaneous polarization Ps referred to herein are based on values measured according to the following methods.

Measurement of tilt angle Ⓗ

A liquid crystal device was sandwiched between right angle-cross nicol polarizers and rotated horizontally relative to the polarizers under application of an AC voltage of ±30 V to ±50 V and 100 Hz between the upper and lower substrates of the device while measuring a transmittance through the device by a photomultiplier (available from Hamamatsu Photonics K. K.) to find a first extinction position (a position providing the lowest transmittance) and a second extinction position. A tilt angle Ⓗ was measured as a half of the angle between the first and second extinction positions.

Measurement of apparent tilt angle θa

A liquid crystal device sandwiched between right angle cross nicol polarizes was supplied with a single pulse of one polarity exceeding the threshold voltage of the liquid crystal and was then rotated under no electric field horizontally relative to the polarizers to find a first extinction position. Then, the liquid crystal device was supplied with a single pulse of the opposite polarity exceeding the threshold voltage of the liquid crystal and was then rotated under no electric field relative to the polarizers to find a second extinct position. An apparent tilt angle θa was measured as a half of the angle between the first and second extinction positions.

Measurement of liquid crystal layer inclination angle δ

The method used was basically similar to the method used by Clark and Lagerwall (Japanese Display '86, Sep. 30–Oct. 2, 1986, p.p. 456–458) or the method of Ohuchi et al (J.J.A.P., 27 (5) (1988), p.p. 725–728). The measurement was performed by using a rotary cathode-type X-ray diffraction apparatus (available from MAC Science), and 80 μm-thick microsheets (available from Corning Glass Works) were used as the substrates so as to minimize the X-ray absorption with the glass substrates of the liquid crystal cells.

Measurement of pretilt angle α

The measurement was performed according to the crystal rotation method as described at Jpn. J. Appl. Phys. vol. 19 (1980), No. 10, Short Notes 2013.

More specifically, a cell was filled with a standard liquid crystal mixture for measurement assuming SmA phase in the temperature range of 10°–55° C. obtained by mixing 80 wt. % of a ferroelectric liquid crystal ("CS-1014", mfd. by Chisso K. K.) with 20 wt. % of a compound represented by the following formula:

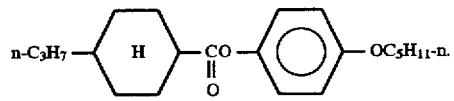

For measurement, the liquid crystal cell provided with an objective alignment control layer was rotated in a plane perpendicular to the pair of substrates and including the aligning treatment axis (rubbing axis) and, during the rotation, the cell was illuminated with a helium-neon laser beam having a polarization plane forming an angle of 45 degrees with respect to the rotation plane in a direction normal to the rotation plane, whereby the intensity of the transmitted light was measured by a photodiode from the opposite side through a polarizer having a transmission axis parallel to the polarization plane.

A pretilt angle α was obtained through a simulation wherein a fitting of a spectrum of the intensity of the transmitted light obtained by interference was effected with respect to the following theoretical curve (a) and relationship (b):

$$T(\phi) = \cos^2\left[\frac{\pi d}{\lambda}\left(\frac{NeNo\sqrt{N^2(\alpha) - \sin^2\phi}}{N^2(\alpha)} - \sqrt{No^2 - \sin^2\phi} - \frac{Ne^2 - No^2}{N^2(\alpha)}\sin\alpha \cdot \cos\alpha \cdot \sin\phi\right)\right], \quad (a)$$

and $$N(\alpha) \equiv \sqrt{No^2 \cdot \cos^2\alpha + Ne^2 \cdot \sin^2\alpha}, \quad (b)$$

wherein No denotes the refractive index of ordinary ray, Ne denotes the refractive index of extraordinary ray, φ denotes the rotation angle of the cell, T(φ) denotes the intensity of the transmitted light, d denotes the cell thickness, and λ denotes the wavelength of the incident light.

Measurement of spontaneous polarization Ps

The spontaneous polarization Ps was measured according to "Direct Method with Triangular Waves for Measuring Spontaneous Polarization in Ferroelectric Liquid Crystal", as described by K. Miyasato et al (Japanese J. Appl. Phys. 22, No. 10, L661 (1983)).

Hereinbelow, the present invention will be described more specifically based on Experimental Examples to which the present invention is not intended to be limited, however.

Experimental Example 1

A (base) liquid crystal composition 1 (Composition 1) was prepared by mixing the following compounds in the indicated proportions.

| Structural Formula | wt. % |
|---|---|
| $C_5H_{11}$—Ph—Td—Ph—$C_5H_{11}$ | 6.3 |
| $C_6H_{13}$—Ph—Td—Ph—$C_4H_9$ | 6.2 |
| $C_{11}H_{23}$—Py—Ph—OOC—Tn—$C_4H_9$ | 8.3 |
| $C_{11}H_{23}$—Py—PhOF—OOC—Tn—$C_4H_9$ | 4.2 |
| $C_6H_{13}$—Bta—Ph—$OC_8H_{17}$ | 25.0 |
| $C_6H_{13}$—Ph—Ph—$OC_{12}H_{25}$ | 5.0 |
| $C_8H_{17}$—Py—Ph—$OC_9H_{19}$ | 10.0 |
| $C_8H_{17}$—Py—Ph—$OC_{10}H_{21}$ | 10.0 |
| $C_9H_{19}$—Py—Ph—$OC_8H_{17}$ | 5.0 |
| $C_{10}H_{21}$O—Ph—COO—Ph—$OCH_2C(CH_3)HC_2H_5$ | 7.5 |
| $C_{10}H_{21}$—Py—Ph—$OCH_2C$(F)$H_6CH_{13}$ * | 12.5 |

In this and following experimental examples, the respective symbols represent the following cyclic groups or an element.

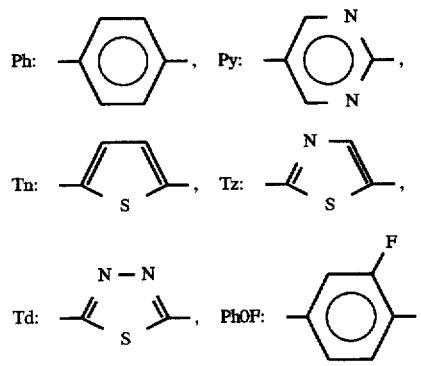

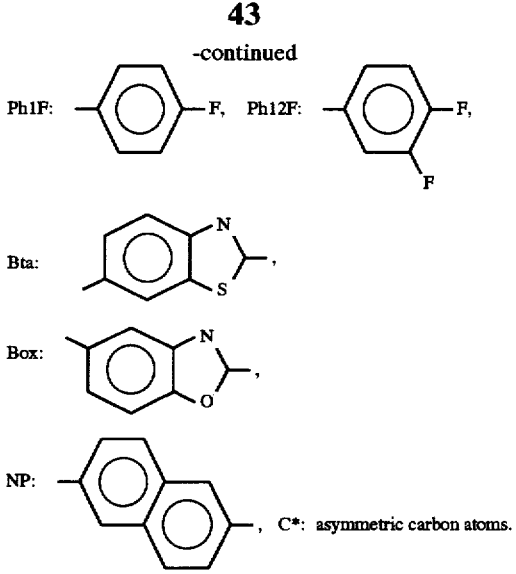

, C*: asymmetric carbon atoms.

The liquid crystal composition 1 was further mixed with the following compounds in the indicated proportions to prepare liquid crystal compositions 1-S, 1-A and 1-B, respectively.

| Composition or Ex. Comp. No. | wt. % |
|---|---|
| <Composition 1-S> | |
| Composition 1 | 87 |
| A-7 | 3 |
| A-35 | 2 |
| A-54 | 2 |
| B-3 | 2 |
| B-11 | 2 |
| C-105 | 2 |
| <Composition 1-A> | |
| Composition 1 | 87 |
| B-3 | 6 |
| B-11 | 5 |
| C-105 | 2 |
| <Composition 1-B> | |
| Composition 1 | 87 |
| A-7 | 5 |
| A-35 | 2 |
| A-54 | 3 |
| C-105 | 3 |
| <Composition 1-C> | |
| Composition 1 | 87 |
| A-7 | 2 |
| A-35 | 2 |
| A-54 | 4 |
| B-3 | 3 |
| B-11 | 2 |

The liquid crystal compositions 1, 1-S, 1-A, 1-B and 1-C showed phase transition temperatures (°C.) and some parameters at 30° C., including a magnitude of spontaneous polarization Ps (nC/cm²), a tilt angle Ⓗ (degrees), and a layer inclination angle δ (degrees), and an apparent tilt angle θa (degrees) summarized in Table 4 appearing hereinbelow.

Incidentally, the phase transition temperatures of the respective liquid crystal compositions were determined by measurement with a differential scanning calorimeter ("DSC 7", available from Perkin-Elmer Co.) and optical observation through a polarizing microscope while effecting temperature control by using a hot stage of an apparatus ("Thermosystem FP-80/FP-82", available from Metler Co.).

A sample cell for optical observation was prepared by injecting a liquid crystal composition into a blank cell comprising a pair of glass films each coated with a rubbing-treated alignment film.

Then, each of liquid crystal devices each having a picture area (size of about 280 mm (data line side)×about 220 mm (scanning line side); the number of pixels of 1280 (data line side)×1024 (scanning line side)) were prepared in the following manner.

Two 1.1 mm-thick glass plates were provided as a pair of substrates and were respectively coated with transparent ITO electrodes arranged in stripes each having a side metal wire of molybdenum, followed by coating with a 150 nm-thick tantalum oxide as a transparent dielectric film by sputtering.

A 1%-solution in NMP of a polyimide precursor ("LQ 1802"mfd. by Hitachi Kasei K. K.) was applied onto the tantalum oxide film by printing, followed by not during for 1 hour at 270° C. to form a 10–30 nm-thick polyimide alignment film (after drying). The resultant film was then rubbed with acetate fiber planted cloth (rubbing treatment). Then, on one of the substrates, epoxy resin adhesive particles having an average particle size of 5.5 μm ("Torepearl" (trade name), available from Toray K.K.) were dispersed at a density of 50 particles/mm² by the Nord Son electrostatic dispersion method and, on the other substrate, silica (micro)-beads having an average particle size of 1.2 μm were dispersed at a density of 300 particles/mm² by the Nord Son electrostatic dispersion method. Then, a liquid adhesive ("Struct Bond" (trade name), mfd. by Mitsui Toatsu Kagaku K.K.) as a sealing member was applied by printing in a thickness of 6 μm. Then, the two glass plates were applied to each other so that their rubbed directions extended generally in the same direction but intersected each other at a crossing angle of +8 (degrees), and bonded to each other by applying a pressure of 2.8 kg/cm² at 70° C. for 5 min, followed by further curing of the two types of adhesives under a pressure of 0.63 kg/cm² at 150° C. for 4 hours to form a blank cell having a cell gap of 1.0–1.2 μm.

Then, blank cells prepared in the above described manner were respectively evacuated to a reduced pressure of about 10 Pa. Thereafter, liquid crystal compositions 1, 1-S, 1-A, 1-B and 1-C, were respectively, injected into the respective blank cells in isotropic liquid phase and were cooled to 25° C. at a rate of 2° C./hour.

The thus-prepared liquid crystal devices showed a good uniform alignment characteristic at an initial stage at 30° C. except that the liquid crystal device using the liquid crystal composition 1 alone did not show a uniform alignment characteristic.

Each of the thus prepared liquid crystal devices was evaluated with respect to a drive voltage margin parameter M (hereinafter, referred to a "Parameter M"), a contrast (C/R) and a cell thickness change (μm) at an initial stage and after a durability test in the following manner at 30° C.

Contrast (C/R)

A liquid crystal device was sandwiched between right angle-cross nicol polarizer and arranged in one of the extinction positions (providing the lowest transmittance) under no electric field application while retaining a certain light quantity from a light source. In such a state, a transmitted light quantity (transmittance) through the liquid crystal device was measured by photomultiplier (available from Hamamatsu Photonics K.K.).

In this case, a display of "white" and "black" states was performed by using drive waveforms (1/3 bias ratio) shown in FIG. 4 to measure a transmittance while setting ΔT so as to provide $V_1$=150 volts (shown in FIG. 8).

A contrast (C/R) after a durability test (after 1000 hours) was also measured under drive conditions identical to those for measurement of parameter M described below.

Parameter M (drive voltage margin parameter)

A liquid crystal device was driven for displaying "white" and "black" tats in the same manner as in the measurement of contrast described above to measure values of $V_3$ by changing a voltage while keeping ΔT at a certain level.

The parameter of the driving voltage margin ΔV (=$V_3$−$V_1$) was determined based on an equation: M=($V_3$−$V_1$)/($V_3$+$V_1$). The larger value allows a more latitude in image-displaying ability against a change in drive voltage. Generally, a Parameter M of at least 0.1 allows a practically acceptable display level.

The parameters M after a durability test (after 300 hr, 500 hr, 800 hr and 100 hr) were measured by driving the liquid crystal device so as to display "white" and "black" states alternately in succession by using the drive waveforms shown in FIG. 4 wherein one horizontal scanning period (1H) was set to 1.1–1.2 times (60–120 μsec) a minimum 1H allowing good white and black display states over the entire display area of the liquid crystal device.

Cell thickness change

A liquid crystal display apparatus as shown in FIG. 9 was prepared by using a liquid crystal device as a display panel in combination with a prescribed drive means. In the display apparatus, an average rubbing direction was arranged in parallel with the scanning electrodes.

By using the display apparatus and the drive waveforms shown in FIG. 4, a vertical stripe display of alternate "white" and "black" lines (each comprising 100 lines) was performed for 300 hours (at 30° C.) under the following conditions:

voltage (scanning line side)=±13.9 V (partially ±6.1 V).

voltage (data line side)=±6.1 V, Vop=20.0 V.

After performing the above display for 300 hours, a portion where a cell thickness (cell gap) change (increase) could be regarded as most noticeable in respect of a change in color (tint) within an entire display region was subjected to measurement of a cell thickness by using a Berek compensator.

A cell thickness change (μm) was obtained as a difference in cell thickness between a cell thickness at an initial stage and that of after performing 300 hours of the above display.

The evaluation results are summarized in FIG. 13 and Table 5 appearing hereinafter together with a crossing angle (deg.) and a pretilt angle α (deg.).

Incidentally, the above evaluation of the liquid crystal devices was performed by controlling an ambient temperature (30° C.) in a constant-temperature equipment while directly monitoring a temperature at a panel surface by using a thermocouple.

Experimental Example 2

A liquid crystal composition 2–3 was prepared by mixing the following compounds in the indicated proportions.

| Structural Formula | wt. % |
|---|---|
| $C_8H_{17}$—Py—Ph—$OC_{10}H_{21}$ | 8 |
| $C_{10}H_{21}$—Py—Ph—$OC_8H_{17}$ | 9 |
| $C_9H_{19}$—Py—Ph—$OC_6H_{13}$ | 6 |
| $C_6H_{13}$—Py—Ph—$OC_{10}H_{21}$ | 5 |

-continued

| Structural Formula | wt. % |
|---|---|
| $C_7H_{15}$—Py—Ph—$OC_9H_{19}$ | 3 |
| $C_8H_{17}$—Py—Ph—$OC_6H_{13}$ | 6 |
| $C_6H_{13}$—Py—Ph—Ph—$C_5H_{11}$ | 6 |
| $C_6H_{13}$—Py—Ph—Ph—$C_7H_{15}$ | 6 |
| $C_6H_{13}$—Bta—Ph—$OC_8H_{17}$ | 5 |
| $C_6H_{13}$—Py—Tz—Py—$OOCC_6H_{13}$ | 6 |
| $C_{11}H_{23}$—Py—Ph—OOC—Tn—$C_4H_9$ | 9 |
| $C_6H_{13}$—Py—Tz—Ph—$C_9H_{19}$ | 11 |
| $C_4H_9$—Box—Np—$OC_{10}H_{21}$ | 10 |
| $C_{10}H_{21}$—Py—Ph—$OCH_2C(F)HC_6H_{13}$ * | 10 |

The liquid liquid crystal composition 2–3 was further mixed with compounds shown in Table 4 in the indicated proportions (similarly as in Experimental Example 1) to prepare liquid crystal compositions 2-S, 2-A, 2-B, 2-C, 3-S, 3-A, 3-B and 3-C, respectively.

In the respective liquid crystal compositions, the liquid crystal composition 2–3 as a base composition was used in an amount so as to provide a total amount of 100 wt. % together with the indicated weight percentages of other components (in Table 4).

Liquid crystal devices were prepared and evaluated in the same manner as in Experimental Example 1 except that the above-prepared liquid crystal compositions (2–3 (base), 2-S, 2-A, 2-B, 2-C, 3-S, 3-A, 3-B and 3-C), respectively and that appropriate rubbing conditions (e.g., rubbing cloth, rotation speed, substrate-moving speed, alignment film) were selected so as to provide a prescribed pretilt angle α.

All the liquid crystal devices prepared above showed a good uniform alignment characteristic at an initial stage at 30° C.

Figure 14:
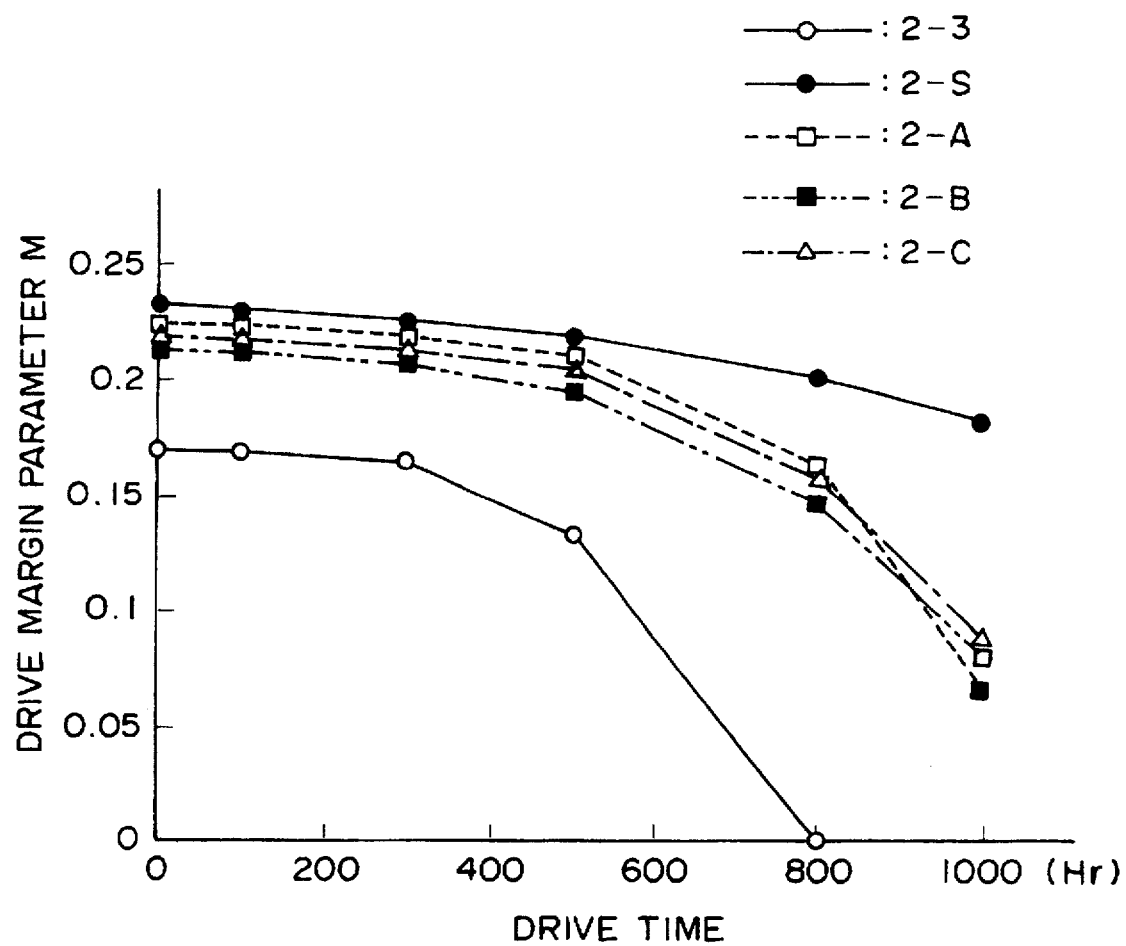

The results are shown in FIG. 14 and Tables 4 and 5.

Experimental Example 3

A liquid crystal composition 4–9 was prepared by mixing the following compounds in the indicated proportions.

| Structural Formula | wt. % |
|---|---|
| $C_8H_{17}$—Py—Ph—$OC_{10}H_{21}$ | 8 |
| $C_{10}H_{21}$—Py—Ph—$OC_8H_{17}$ | 8.5 |
| $C_9H_{19}$—Py—Ph—$OC_6H_{13}$ | 6 |
| $C_6H_{13}$—Py—Ph—$OC_{10}H_{21}$ | 6 |
| $C_7H_{15}$—Py—Ph—$OC_9H_{19}$ | 2 |
| $C_8H_{17}$—Py—Ph—$OC_6H_{13}$ | 6 |
| $C_6H_{13}$—Py—Ph—Ph—$C_5H_{11}$ | 7 |
| $C_6H_{13}$—Py—Ph—Ph—$C_7H_{15}$ | 7 |
| $C_6H_{13}$—Bta—Ph—$OC_8H_{17}$ | 2 |
| $C_6H_{13}$—Py—Tz—Ph—$OOCC_6H_{13}$ | 4 |
| $C_6H_{13}$—Py—Tz—Ph—$OOCC_8H_{17}$ | 5 |
| $C_{11}H_{23}$—Py—Ph—OOC—Tn—$C_4H_9$ | 7 |
| $C_{12}H_{25}$—Py—Ph—OOC—Ph1F | 5 |
| $C_{11}H_{23}$—Py—Ph—OOC—Ph2F | 1 |
| $C_6H_{13}$—Py—Tz—Ph—$C_9H_{19}$ | 11 |
| $C_8H_{17}$—Py—Tz—Ph—$C_{10}H_{21}$ | 1 |
| $C_4H_9$—Box—Np—$OC_{10}H_{21}$ | 3 |
| $C_{10}H_{21}$—Py—Ph—$OOCC_7H_{15}$ | 0.5 |
| $C_{10}H_{21}$—Py—Ph—$OCH_2C(F)HC_8H_{17}$ * | 10 |

The liquid liquid crystal composition 4–9 was further mixed with compounds shown in Table 4 in the indicated proportions (similarly as in Experimental Example 1) to prepare liquid crystal compositions 4-S, 4-A, 4-B, 4-C, 5-S, 5-A, 5-B, 5-C, 6-S, 7-S, 8-S and 9-S, respectively.

In the respective liquid crystal compositions, the liquid crystal composition 4–9 as a base composition was used in an amount so as to provide a total amount of 100 wt. % together with the indicated weight percentages of other components (in Table 4).

Liquid crystal devices were prepared and evaluated in the same manner as in Experimental Example 1 except that the above-prepared liquid crystal compositions (4–9 (base), 4-S, 4-A, 4-B, 4-C, 5-S, 5-A, 5-B, 5-C, 6-S, 7-S, 8-S and 9-S), respectively and that appropriate rubbing conditions (e.g., rubbing cloth, rotation speed, substrate-moving speed, alignment film) were selected so as to provide a prescribed pretilt angle α.

All the liquid crystal devices prepared above showed a good uniform alignment characteristic at an initial stage at 30°C.

Figure 15:
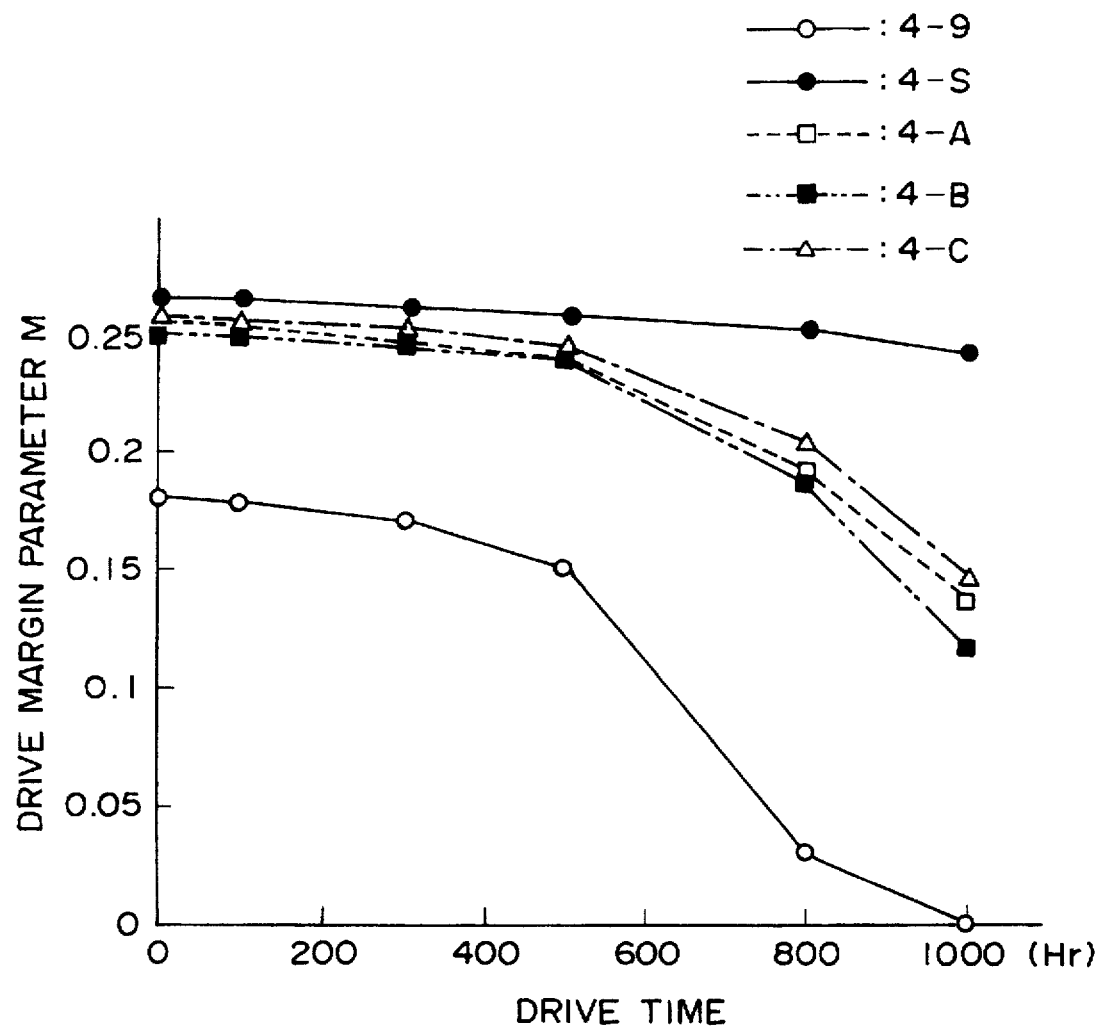

The results are shown in FIG. 15 and Tables 4 and 5.

TABLE 4

| Ex. No. | Composition No. | Comp. (A) No. | wt. % | Comp. (B) No. | wt. % | Comp. (C) No. | wt. % | Phase transition (°C.) Cry.→SmC*→SmA→Ch.→Iso. | | | | at 30° C. | | | |
|---|---|---|---|---|---|---|---|---|---|---|---|---|---|---|---|
| | | | | | | | | | | | | Ps | θ | δ | θa |
| 1 | 1 | — | 0 | — | 0 | — | 0 | <−10.0 | 65.7 | 75 | 83.5 | 12.6 | 21.2 | 14.1 | 13.7 |
| | 1-S | 7 | 3 | 3 | 2 | 105 | 2 | <−10.0 | 61.2 | 78.2 | 85.7 | 11.3 | 18.3 | 12.4 | 12 |
| | | 35 | 2 | 11 | 2 | | | | | | | | | | |
| | | 54 | 2 | | | | | | | | | | | | |
| | 1-A | 7 | 0 | 3 | 6 | 105 | 2 | <−10.0 | 63.2 | 77.6 | 83.9 | 11.6 | 19.6 | 12.7 | 12.2 |
| | | 35 | 0 | 11 | 5 | | | | | | | | | | |
| | | 54 | 0 | | | | | | | | | | | | |
| | 1-B | 7 | 5 | 3 | 0 | 105 | 3 | <−10.0 | 61.3 | 79.5 | 87.8 | 11.2 | 18.2 | 12.4 | 12 |
| | | 35 | 2 | 11 | 0 | | | | | | | | | | |
| | | 54 | 3 | | | | | | | | | | | | |
| | 1-C | 7 | 2 | 3 | 3 | 105 | 0 | <−10.0 | 61.8 | 77 | 85.2 | 11.4 | 18.5 | 12.5 | 12.3 |
| | | 35 | 2 | 11 | 2 | | | | | | | | | | |
| | | 54 | 4 | | | | | | | | | | | | |
| 2 | 2-3 | — | 0 | — | 0 | — | 0 | <−10.0 | 66.3 | 85.6 | 92.4 | 5.8 | 14.9 | 10 | 11.8 |
| | 2-S | 21 | 0.5 | 4 | 1 | 61 | 0.5 | <−10.0 | 66.4 | 88 | 94.5 | 5.5 | 14.1 | 9.5 | 11.3 |
| | | 42 | 0.5 | 22 | 3 | 62 | 0.5 | | | | | | | | |
| | | 72 | 6 | | | 88 | 1 | | | | | | | | |
| 2 | 2-A | 21 | 0 | 4 | 1 | 61 | 1 | <−10.0 | 67.9 | 83.6 | 89.6 | 5.9 | 15.1 | 10.1 | 11.5 |
| | | 42 | 0 | 22 | 5 | 62 | 1 | | | | | | | | |
| | | 72 | 0 | | | 88 | 5 | | | | | | | | |
| | 2-B | 21 | 0.5 | 4 | 0 | 61 | 1 | <−10.0 | 64.7 | 84.9 | 91 | 5.6 | 14.2 | 9.5 | 11.2 |
| | | 42 | 0.5 | 22 | 0 | 62 | 1 | | | | | | | | |
| | | 72 | 5 | | | 88 | 5 | | | | | | | | |
| | 2-C | 21 | 1.5 | 4 | 0.5 | 61 | 0 | <−10.0 | 68.1 | 87.6 | 94.2 | 5.6 | 14.2 | 9.6 | 11.2 |
| | | 42 | 1 | 22 | 6 | 62 | 0 | | | | | | | | |
| | | 72 | 4 | | | 88 | 0 | | | | | | | | |
| | 3-S | 22 | 1 | 5 | 1 | 5 | 3 | <−10.0 | 64.4 | 87.7 | 94.1 | 5.9 | 15 | 10 | 11.4 |
| | | 57 | 1 | 12 | 1 | 14 | 1 | | | | | | | | |
| | | 66 | 4 | | | 116 | 1 | | | | | | | | |
| | | | | | | 123 | 1 | | | | | | | | |
| | 3-A | 22 | 0 | 5 | 1 | 5 | 4 | <−10.0 | 66.6 | 86.9 | 93 | 6.1 | 15.9 | 10.7 | 11.6 |
| | | 57 | 0 | 12 | 1 | 14 | 0.5 | | | | | | | | |
| | | 66 | 0 | | | 116 | 7 | | | | | | | | |
| | | | | | | 123 | 0.5 | | | | | | | | |
| | 3-B | 22 | 1 | 5 | 0 | 5 | 3 | <−10.0 | 64.7 | 87.2 | 93.6 | 6 | 15.3 | 10.2 | 11.3 |
| | | 57 | 2.5 | 12 | 0 | 14 | 1.5 | | | | | | | | |
| | | 66 | 1.5 | | | 116 | 4 | | | | | | | | |
| | | | | | | 123 | 0.5 | | | | | | | | |
| | 3-C | 22 | 3 | 5 | 3 | 5 | 0 | <−10.0 | 65.9 | 88.2 | 94.3 | 5.7 | 14.7 | 9.9 | 11.3 |
| | | 57 | 3 | 12 | 3 | 14 | 0 | | | | | | | | |
| | | 66 | 2 | | | 116 | 0 | | | | | | | | |
| | | | | | | 123 | 0 | | | | | | | | |
| 3 | | — | 0 | — | 0 | 0 | 0 | <−10.0 | 66.4 | 89 | 96.1 | 6.3 | 14.8 | 10.2 | 11.7 |
| | 4-S | 29 | 3 | 19 | 2 | 105 | 3 | <−10.0 | 64.7 | 92.4 | 99.3 | 5.8 | 14.6 | 9.9 | 11.4 |
| | | 41 | 2 | 23 | 1 | 116 | 2 | | | | | | | | |
| | | 62 | 2 | 25 | 1 | | | | | | | | | | |
| | 4-A | 29 | 0 | 19 | 1 | 105 | 5 | <−10.0 | 69.5 | 90.7 | 97.8 | 6.5 | 16.2 | 10.8 | 11.5 |
| | | 41 | 0 | 23 | 3 | 116 | 1 | | | | | | | | |
| | | 62 | 0 | 25 | 6 | | | | | | | | | | |
| | 4-B | 29 | 5 | 19 | 0 | 105 | 5 | <−10.0 | 65.2 | 93.1 | 99.2 | 6.2 | 15 | 10.4 | 11.5 |
| | | 41 | 1 | 23 | 0 | 116 | 3 | | | | | | | | |
| | | 62 | 2 | 25 | 0 | | | | | | | | | | |
| | 4-C | 29 | 1 | 19 | 4 | 105 | 0 | <−10.0 | 66.8 | 91 | 97.6 | 6.1 | 14.9 | 10.1 | 11.3 |
| | | 41 | 1 | 23 | 4 | 116 | 0 | | | | | | | | |
| | | 62 | 2 | 25 | 4 | | | | | | | | | | |
| | 5-S | 28 | 1 | 14 | 1 | 67 | 1 | <−10.0 | 66.2 | 90.4 | 97.6 | 5.8 | 14.6 | 9.9 | 11.4 |
| | | 43 | 1 | 15 | 1 | 71 | 2 | | | | | | | | |
| | | 56 | 3 | 25 | 1 | 80 | 3 | | | | | | | | |
| | 5-A | 28 | 0 | 14 | 2 | 67 | 2 | <−10.0 | 67 | 90.6 | 96.6 | 6.4 | 15.1 | 10.3 | 11.5 |
| | | 43 | 0 | 15 | 2 | 71 | 3 | | | | | | | | |
| | | 56 | 0 | 25 | 1 | 80 | 3 | | | | | | | | |
| | 5-B | 28 | 2 | 14 | 0 | 67 | 2 | <−10.0 | 66.2 | 89.9 | 97.4 | 6.3 | 15.2 | 10.4 | 11.4 |
| | | 43 | 1 | 15 | 0 | 71 | 2 | | | | | | | | |
| | | 56 | 1 | 25 | 0 | 80 | 5 | | | | | | | | |

TABLE 4-continued

| Ex. No. | Composition No. | Comp. (A) No. | wt. % | Comp. (B) No. | wt. % | Comp. (C) No. | wt. % | Phase transition (°C.) Cry.→SmC*→SmA→Ch.→Iso. | | | | at 30° C. Ps | θ | δ | θa |
|---|---|---|---|---|---|---|---|---|---|---|---|---|---|---|---|
| 3 | 5-C | 28 | 0.5 | 14 | 1 | 67 | 0 | <−10.0 | 62.8 | 88.9 | 95.9 | 5.6 | 13.9 | 9.7 | 11.3 |
|   |     | 43 | 6.5 | 15 | 0.5 | 71 | 0 | | | | | | | | |
|   |     | 56 | 4   | 25 | 0.5 | 80 | 0 | | | | | | | | |
|   | 6-S | 22 | 1 | 4 | 1 | 5 | 0.5 | <−10.0 | 66.8 | 91.1 | 98.5 | 6.2 | 15.2 | 10.3 | 11.5 |
|   |     | 29 | 1 | 16 | 0.5 | 68 | 1 | | | | | | | | |
|   |     | 58 | 5 | 19 | 5 | 105 | 3 | | | | | | | | |
|   | 7-S | 22 | 1 | 5 | 2 | 4 | 1 | <−10.0 | 67.4 | 93.4 | 98.5 | 5.9 | 14.9 | 10.1 | 11.4 |
|   |     | 57 | 3 | 12 | 3 | 10 | 1 | | | | | | | | |
|   |     | 66 | 4 |   |   | 19 | 1 | | | | | | | | |
|   |     |    |   |   |   | 27 | 2 | | | | | | | | |
|   | 8-S | 29 | 1 | 19 | 3 | 5 | 1 | <−10.0 | 66.9 | 90.9 | 101 | 5.8 | 14.7 | 9.9 | 11.3 |
|   |     | 41 | 1 | 23 | 4 | 26 | 1 | | | | | | | | |
|   |     | 62 | 1 | 25 | 3 | 67 | 1 | | | | | | | | |
|   |     |    |   |   |   | 80 | 2 | | | | | | | | |
|   | 9-S | 7  | 1 | 3 | 2 | 68 | 2 | <−10.0 | 67.8 | 91.4 | 98.4 | 5.8 | 14.9 | 10 | 11.4 |
|   |     | 35 | 1 | 11 | 3 | 87 | 1 | | | | | | | | |
|   |     | 54 | 5 |   |   | 116 | 3 | | | | | | | | |

TABLE 5

| Ex. No. | Comp. No. | Initial Contrast (C/R) | Initial Parameter M | After durabliity test Change in thickness (μm) | After durabliity test Contrast (C/R) | After durabliity test Parameter M | ( at 30° C.) Crossing angle (deg.) | Pre-tilt angle (deg.) |
|---|---|---|---|---|---|---|---|---|
| 1 | 1   | 20 | *** | 0.43 | *** | *** | 8 | 24 |
|   | 1-S | 41 | 0.23 | 0.04 | 38 | 0.156 | | |
|   | 1-A | 40 | 0.22 | 0.37 | *** | *** | | |
|   | 1-B | 41 | 0.211 | 0.28 | *** | *** | | |
|   | 1-C | 39 | 0.216 | 0.35 | *** | *** | | |
| 2 | 2-3 | 22 | 0.17 | 0.41 | *** | *** | 8 | 17 |
|   | 2-S | 42 | 0.232 | 0.02 | 37 | 0.182 | | |
|   | 2-A | 42 | 0.224 | 0.27 | 29 | 0.066 | | |
|   | 2-B | 40 | 0.213 | 0.27 | 30 | 0.08 | | |
|   | 2-C | 40 | 0.22 | 0.28 | 30 | 0.088 | | |
|   | 3-S | 42 | 0.235 | 0.01 | 37 | 0.193 | 8 | 16 |
|   | 3-A | 40 | 0.223 | 0.26 | 27 | 0.07 | | |
|   | 3-B | 39 | 0.21 | 0.27 | 28 | 0.075 | | |
|   | 3-C | 41 | 0.211 | 0.25 | 29 | 0.08 | | |
| 3 | 4-9 | 22 | 0.18 | 0.34 | *** | *** | 8 | 17 |
|   | 4-S | 43 | 0.264 | not changed | 38 | 0.24 | | |
|   | 4-A | 41 | 0.255 | 0.23 | 29 | 0.136 | | |
|   | 4-B | 43 | 0.25 | 0.22 | 30 | 0.116 | | |
|   | 4-C | 42 | 0.258 | 0.21 | 30 | 0.146 | | |
| 3 | 5-S | 43 | 0.255 | not changed | 39 | 0.231 | 6 | 16 |
|   | 5-A | 41 | 0.245 | 0.24 | 29 | 0.128 | | |
|   | 5-B | 40 | 0.248 | 0.23 | 28 | 0.115 | | |
|   | 5-C | 42 | 0.232 | 0.22 | 29 | 0.132 | | |
|   | 6-S" | 45 | 0.25 | not changed | 40 | 0.226 | 6 | 19 |
|   | 7-S | 43 | 0.248 | 0.01 | 39 | 0.225 | 8 | 16 |
|   | 8-S | 41 | 0.245 | 0.03 | 38 | 0.222 | 8 | 17 |
|   | 9-S | 42 | 0.238 | 0.02 | 38 | 0.216 | 8 | 16 |

***: Not measurable.

As apparent from the above results (in Table 5), at an initial stage, the liquid crystal compositions (1-S, 2-S, 3-S, 4-S, 5-S, 6-S, 7-S, 8-S and 9-S) each containing the compounds of the formulae (A), (B) and (C) according to the present invention provided comparable results compared with other compositions (lacking any one of the compounds of the formulae (A), (B) and (C)).

However, after the durability test, the liquid crystal compositions of the present invention were found to be effective in improving a contrast and a parameter M and suppression a change (increase) in cell thickness compared with other compositions.

Further, the liquid crystal devices providing a larger cell thickness change caused a local change in color (tint) at a part (portion) of a display region to lower a display quality.

In addition, after the durability test, an influence of some factors (e.g., heat generation from a light source or a drive circuit, a change in ambient (operation) temperature, a cell thickness distribution) or drive characteristics gradually became large. This led to a large difference in latitude allowing (and retaining) a stable image quality between the liquid crystal devices providing a larger parameter M and those providing a smaller parameter M, so that a superiority of the former devices over the latter devices became clearer.

Further, when the liquid crystal devices providing a larger parameter M and the liquid crystal devices providing a smaller parameter M were subjected to microscope observation of a display region after the durability test, the latter devices provided a larger area of a switching failure region (or crosstalk voltage-lowering region), e.g., a region 125 as shown in FIG. 12 which was observed around the stepwise portions, spacer beads and adhesive beads within the cells (FIG. 12). A lowering in contrast values of the latter devices may be attributable to this phenomenon.

As described hereinabove, according to the present invention, it is possible to remedy practical problems of a liquid crystal device (or apparatus) such as lowering in display (image) qualities and drive characteristics when driven for a long time by using the liquid crystal composition containing the compounds of the formulae (A), (B) and (C) described above.

What is claimed is:

1. A liquid crystal composition, comprising:

a compound represented by the following formula (A):

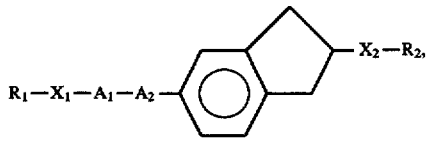

wherein $R_1$ and $R_2$ independently denote a linear or branched alkyl group having 1–18 carbon atoms; $X_1$ and $X_2$ independently denote a single bond, —O—, —CO—O— or —O—CO—; and $A_1$ denotes a single bond,

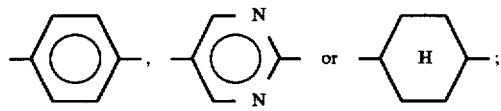

and $A_2$ denotes

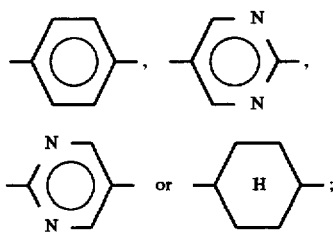

a compound represented by the following formula (B):

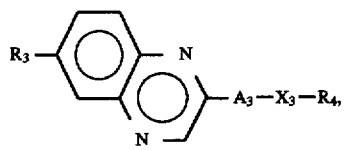

wherein $R_3$ and $R_4$ independently denote a linear or branched alkyl group having 1–18 carbon atoms; $X_3$ denotes a single bond, —O—, —CO—O— or —O—CO—; and $A_3$ denotes

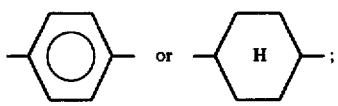

and a compound represented by the following formula (C):

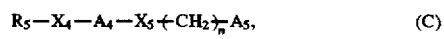

wherein $R_5$ denotes a linear or branched alkyl group having 1–18 carbon atoms; $X_4$ denotes a single bond, —O—, —CO—O— or —O—CO—; $X_5$ denotes a single bond, —OCH$_4$—, —CO—O— or —O—CO—; n is an integer of 3–16; and $A_4$ denotes

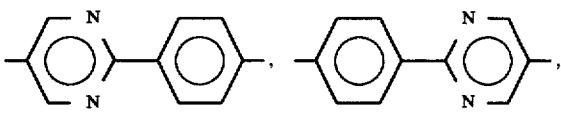
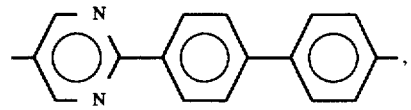
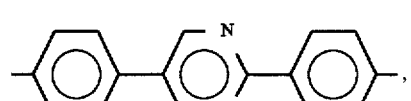
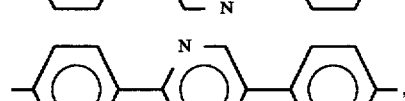
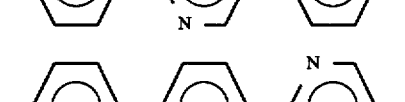
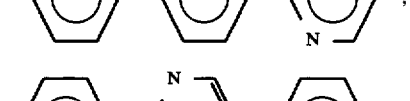
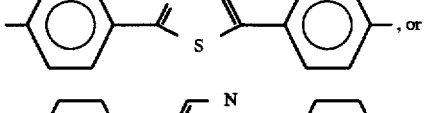

and $A_5$ denotes

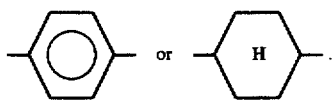

2. A composition according to claim 1, which further comprises at least one species of an optically active compound.

3. A composition according to claim 2, which exhibits at least a chiral smectic phase.

4. A composition according to claim 2, which exhibits ferroelectricity.

5. A composition according to claim 3, which exhibits an isotropic phase, a cholesteric phase, a smectic phase and a chiral smectic phase on temperature decrease.

6. A composition according to claim 3, wherein said chiral smectic phase is a chiral smectic C phase.

7. A composition according to claim 1, which comprises 1.0–30 wt. % of a compound of the formula (A), 0.3–20 wt. % of a compound of the formula (B), and 0.3–20 wt. % of a compound of the formula (C).

8. A composition according to claim 1, which comprises 1.0–20 wt. % of a compound of the formula (A), 0.5–10 wt.

% of a compound of the formula (B), and 0.5–10 wt. % of a compound of the formula (C).

9. A composition according to claim 1, which further comprises 20–75 wt. % of a compound represented by a formula (1) shown below, 5–25 wt. % of a compound represented by a formula (2) shown below, 5–30 wt. % of a compound represented by a formula (3) shown below, and 0.1–30 wt. % of a compound represented by a formula (4) shown below:

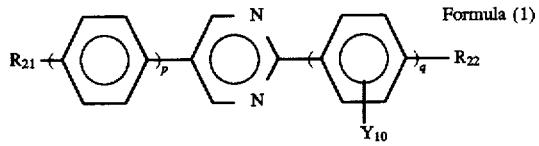

Formula (1)

wherein p and q independently denote 0, 1 or 2 satisfying p+q=1 or 2; $Y_{10}$ is hydrogen or fluorine; and $R_{21}$ and $R_{22}$ independently denote a linear or branched alkyl group having 1–18 carbon atoms capable of including at least one methylene group which can be replaced by —O—, —S—, —CO—, —CH=CH—, —C≡C—, or —CHW— where W is halogen, CN or $CF_3$ provided that heteroatoms are not adjacent to each other;

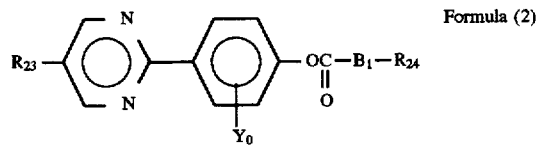

Formula (2)

wherein $B_1$ is

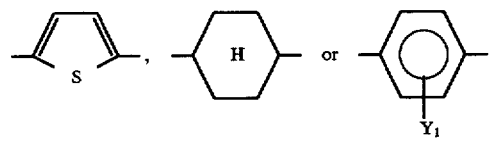

where $Y_1$ is hydrogen or fluorine; $Y_0$ is hydrogen or fluorine; $R_{23}$ is a linear or branched alkyl group having 1–18 carbon atoms; $R_{24}$ is hydrogen, halogen, CN, or a linear or branched alkyl group having 1–18 carbon atoms; and at least one methylene group in the alkyl group of $R_{23}$ or $R_{24}$ can be replaced by —O—, —S—, —CO—, —CH=CH—, —C≡C—, or —CHW— where W is halogen, CN or $CF_3$ provided that heteroatoms are not adjacent to each other;

Formula (3)

wherein $B_2$

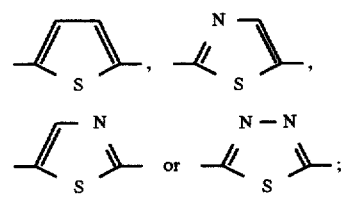

and and $R_{25}$ and $R_{26}$ independently denote a linear or branched alkyl group having 1–18 carbon atoms capable of including at least one methylene group which can be replaced by —O—, —S—, —CO—, —CH=CH—, —C≡C—, or —CHW— where W is halogen, CN or $CF_3$ provided that heteroatoms are not adjacent to each other; and

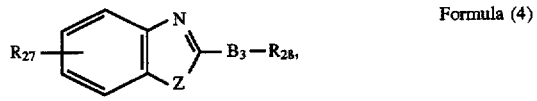

Formula (4)

wherein Z is —O— or —S—; $B_3$ is

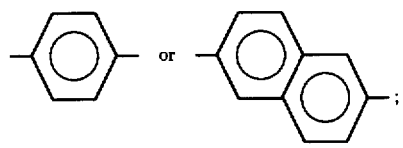

and $R_{27}$ and $R_{28}$ independently denote a linear or branched alkyl group having 1–18 carbon atoms capable of including at least one methylene group which can be replaced by —O—, —S—, —CO—, —CH=CH—, —C≡C—, or —CHW— where W is halogen, CN or $CF_3$ provided that heteroatoms are not adjacent to each other.

10. A composition according to claim 9, wherein said compound of the formula (1) includes at least one species of compounds of the formulae (1-1) to (1-7); said compound of the formula (2) includes at least one species of compounds of the formulae (2-1) to (2-5); said compound of the formula (3) includes at least one species of compounds of the formulae (3-1) to (3-9); and said compound of the formula (4) includes at least one species of compounds of the formulae (4-1) to (4-6), respectively shown below:

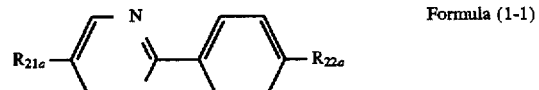

Formula (1-1)

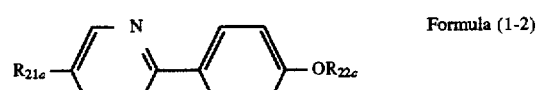

Formula (1-2)

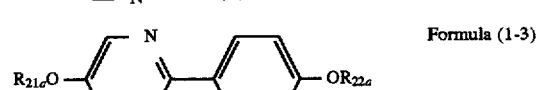

Formula (1-3)

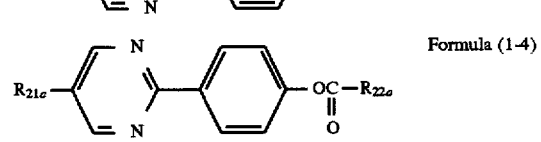

Formula (1-4)

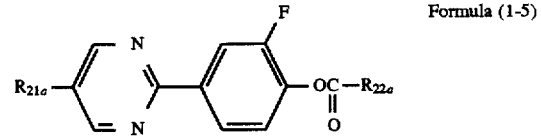

Formula (1-5)

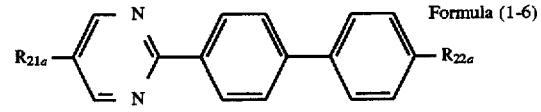

Formula (1-6)

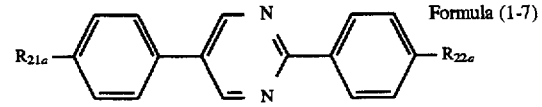

Formula (1-7)

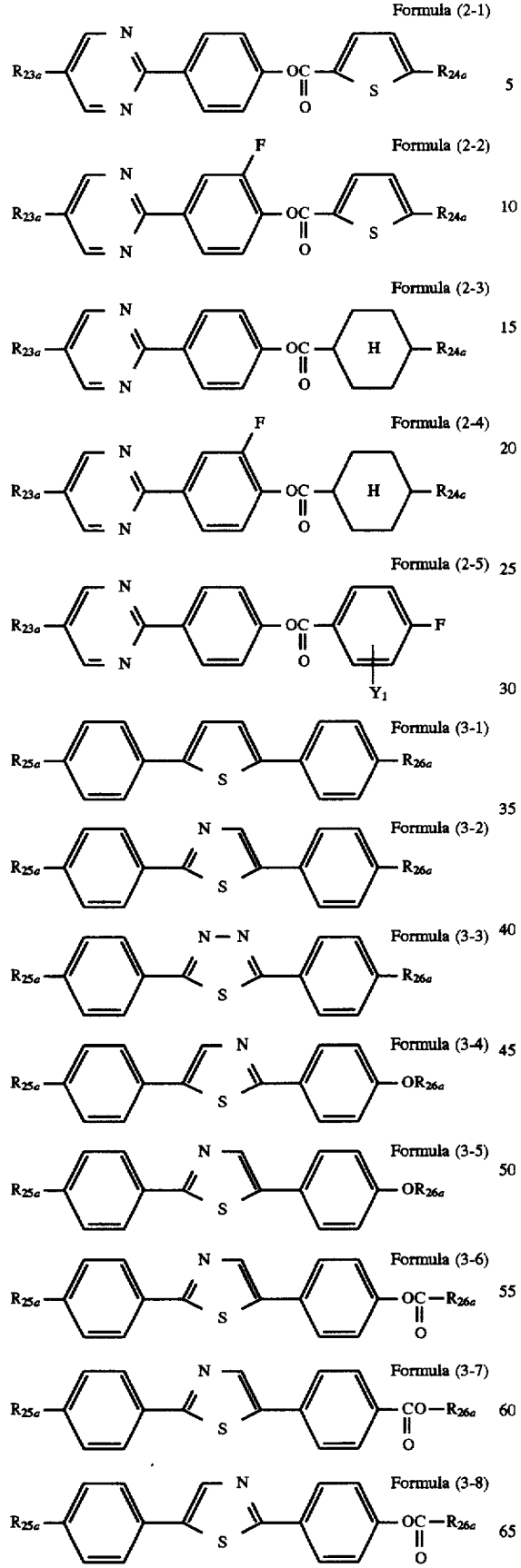
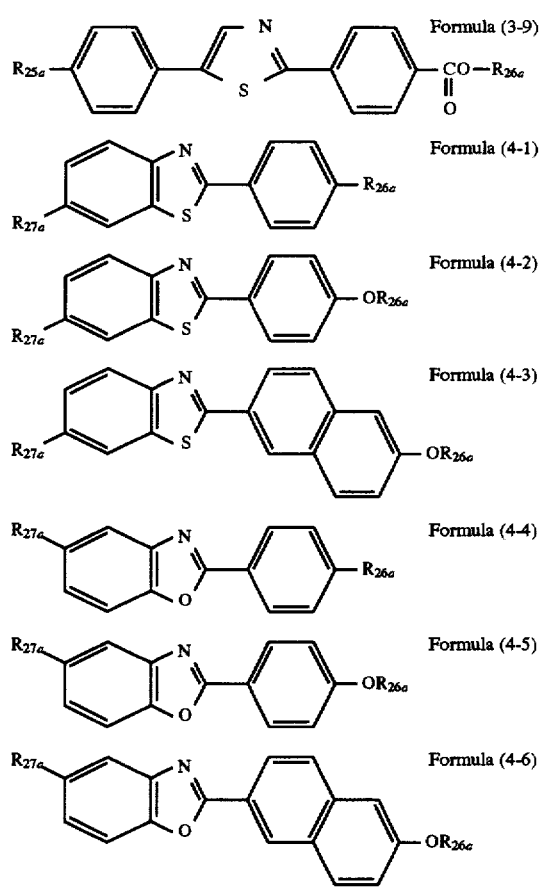

wherein $R_{21a}$ to $R_{28a}$ have the same meanings as $R_{21}$ to $R_{28}$ defined above and $Y_1$ has the same meaning as defined above, respectively.

11. A composition according to claim 6, which provides a layer inclination angle δ in chiral smectic C phase of 3–15 degrees in a temperature range of 0°–60° C.

12. A liquid crystal device, comprising: a pair of oppositely disposed substrates each provided with an electrode at a corresponding opposite surface thereof for applying a voltage to a liquid crystal composition disposed between said substrates; wherein at least one of said substrates is further provided with an alignment control layer for controlling an alignment state of said liquid crystal composition at said corresponding opposite surface, and said liquid crystal composition is a liquid crystal composition according to claim 1.

13. A device according to claim 12, wherein said device provides a pretilt angle α and said liquid crystal composition is a chiral smectic liquid crystal composition placed in such an alignment state that the chiral smectic liquid crystal shows a tilt angle Ⓗ, a layer inclination angle δ in chiral smectic C phase, and an apparent tilt angle θa satisfying the following relationships (I), (II) and (III) in combination with the pretilt angle α:

Ⓗ < α + δ      (I),

δ < α           (II), and

Ⓗ > θa > Ⓗ/2   (III).

14. A device according to claim 12, wherein said alignment control layer is provided with a uniaxial alignment axis and is disposed on both of said pair of substrates and the respective uniaxial alignment axes are parallel to each other.

15. A device according to claim 12, wherein said alignment control layer is provided with a uniaxial alignment axis and is disposed on both of said pair of substrates, and the respective uniaxial alignment axes intersect with each other at a prescribed crossing angle.

16. A device according to claim 15, wherein said crossing angle is at most 25 degrees.

17. A device according to claim 13, wherein said pretilt angle is at least 5 degrees.

18. A liquid crystal apparatus, including: a liquid crystal device according to claim 12 and a drive circuit for driving the liquid crystal device.

* * * * *

UNITED STATES PATENT AND TRADEMARK OFFICE
CERTIFICATE OF CORRECTION

PATENT NO. : 5,785,890

DATED : July 28, 1998

INVENTOR(S): MASATAKA YAMASHITA ET AL.   Page 1 of 7

It is certified that error appears in the above-identified patent and that said Letters Patent is hereby corrected as shown below:

ON THE TITLE PAGE AT [56] References Cited
FOREIGH PATENT DOCUMENTS,
```
     "64022990" should read --64-022990--;
     "640341740" should read --64-031740--;
     "64038077" should read --64-038077--;
     "01121244" should read --01-121244--;
     "01140198" should read --01-140198--;
     "01160986" should read --01-160986--;
     "01207280" should read --01-207280--;
     "01242543" should read --01-242543--;
     "01265052" should read --01-265052--;
     "01272571" should read --01-272571--;
     "02000127" should read --02-000127--;
     "0200227" should read --02-000227--;
     "02028158" should read --02-028158--;
     "02069427" should read --02-069427--;
     "02069440" should read --02-069440--;
     "02069467" should read --02-069467--;
     "02115145" should read --02-115145--;
     "02295943" should read --02-295943--;
     "03035220" should read --03-035220--;
     "03043488" should read --03-043488--;
     "03058980" should read --03-058980--;
     "03193774" should read --03-193774--;
     "03223232" should read --03-223232--;
     "03227980" should read --03-227980--;
     "03236353" should read --03-236353--;
     "03252624" should read --03-252624--;
     "04013977" should read --04-013977--;
```

UNITED STATES PATENT AND TRADEMARK OFFICE
CERTIFICATE OF CORRECTION

PATENT NO. : 5,785,890

DATED : July 28, 1998

INVENTOR(S): MASATAKA YAMASHITA ET AL.

It is certified that error appears in the above-identified patent and that said Letters Patent is hereby corrected as shown below:

ON THE TITLE PAGE AT [56] References Cited
FOREIGN PATENT DOCUMENTS, (cont.)
      "04253789" should read --04-253789--;
      "04264052" should read --04-264052--;
      "04300871" should read --04-300871--;
      "05262678" should read --05-262678--;
      "05273537" should read --05-273537--;
      "06242450" should read --06-242450--;
      "06256231" should read --06-256231--;
      "07010849" should read --07-010849--;
      "07118178" should read --07-118178--.

ON THE TITLE PAGE AT [56] References Cited
OTHER PUBLICATIONS, "Yukio Ouchi et al," should read --Yukio Ouchi et al.,-- and "Fumio Nakamo et al," should read --Fumio Nakano et al.,--.

ON THE TITLE PAGE AT [56] References Cited
U.S. PATENT DOCUMENTS, "Tereda et al." should read --Terada et al.--.

COLUMN 2
Line 8, "plats," should read --plates,--.

COLUMN 3
Line 28, "realizing" should read --realizing a--.

UNITED STATES PATENT AND TRADEMARK OFFICE
CERTIFICATE OF CORRECTION

PATENT NO. : 5,785,890

DATED : July 28, 1998

INVENTOR(S): MASATAKA YAMASHITA ET AL.

It is certified that error appears in the above-identified patent and that said Letters Patent is hereby corrected as shown below:

COLUMN 6
  Line 26, "value)" should read --value) and--;
  Line 35, "abovedescribed" should read --above-described--.

COLUMN 8
  Line 3, "EP-A0546338" should read --EP-A-0546338--.

COLUMN 9
  Line 18, "A-48 dex-" should read --A-48 hex- --.

COLUMN 11
  Line 26, "-phe-phe-phe2-" should read -- -phe-phe-pyr2- --.

COLUMN 15
  Line 14, "contain" should read --containing--;
  Line 41, "-C≡-C-," should read -- -C≡C-, --;
  Line 66, "-C≡-C-," should read -- -C≡C-, --.

COLUMN 16
  Line 17, "and and" should read --and--.

COLUMN 19
  Line 51, "atom;" should read --atoms;--.

COLUMN 20
  Line 7, "are" should read --as--;
  Line 20, "Σ3" should read --Σ2:--.

UNITED STATES PATENT AND TRADEMARK OFFICE
CERTIFICATE OF CORRECTION

PATENT NO. : 5,785,890

DATED : July 28, 1998

INVENTOR(S): MASATAKA YAMASHITA ET AL.

It is certified that error appears in the above-identified patent and that said Letters Patent is hereby corrected as shown below:

COLUMN 23
Line 20, "35 $C_7H_{17}$" should read --35 $C_7H_{15}$--.

COLUMN 25
Line 25, "formula (6)" should read --Formula (6)-- at right margin;
Line 27, "(IV)" should be deleted;
Line 28, "—$R_{32}$," should read -- —$R_{32}$--;
Line 48, "atom;" should read --atoms;--.

COLUMN 29
Line 63, "atoms;" should read --atoms;--.

COLUMN 30
Line 49, "62093248," should read --62-093248,--.

COLUMN 33
Line 63, "provides" should read --provide--.

COLUMN 35
Line 14, "in a" should read --is--;
Line 52, "have" should read --has--.

COLUMN 36
Line 47, "been also" should read --also been--;
Line 61, "this" should read --these--.

UNITED STATES PATENT AND TRADEMARK OFFICE
CERTIFICATE OF CORRECTION

PATENT NO. : 5,785,890

DATED : July 28, 1998

INVENTOR(S): MASATAKA YAMASHITA ET AL.

It is certified that error appears in the above-identified patent and that said Letters Patent is hereby corrected as shown below:

COLUMN 37
Line 46, "films" should read --film--;
Line 61, "case" should read --cases--;
Line 62, "one" should read --one of the--.

COLUMN 38
Line 25, "IIa" should read --11a--;
Line 26, "such" should read --such as an epoxy adhesive.--;
Line 27, "Further, y adhesive." should be deleted.

COLUMN 40
Line 27, "$|V_{s+vI}|$" should read --$|V_s+V_I|$--;
Line 30, "$\Delta V\ (=V_3-V_1)$" should read --$\Delta V=(V_3-V_1)$--.

COLUMN 41
Line 14, "angle" should read --angle- --;
Line 28, "al" should read --al.--.

COLUMN 42
Line 22, "al" should read --al.--.

COLUMN 43
Line 24, "and 1-B," should read --, 1-B and 1-C,--.

COLUMN 44
Line 54, "a" should read --as--;
Line 59, "polarizer" should read --polarizers--;
Line 64, "by" should read --by a--.

UNITED STATES PATENT AND TRADEMARK OFFICE
CERTIFICATE OF CORRECTION

PATENT NO. : 5,785,890

DATED : July 28, 1998

INVENTOR(S): MASATAKA YAMASHITA ET AL.

It is certified that error appears in the above-identified patent and that said Letters Patent is hereby corrected as shown below:

COLUMN 45
Line 11, "$\Delta V\ (=V_3-$" should read $--\Delta V=(V_3-\ --;$
Line 13, "a" should be deleted.

COLUMN 47
Line 5, "as in Experimental Example 1" should read --(as in Experimental Example 1)--.

COLUMN 49
Line 62, "suppression" should read --suppressing--.

COLUMN 52
Line 55, "exhibits" should read --exhibits a--.

COLUMN 53
Line 52, "$B_2$" should read --$B_2$ is--.

UNITED STATES PATENT AND TRADEMARK OFFICE
CERTIFICATE OF CORRECTION

PATENT NO. : 5,785,890

DATED : July 28, 1998

INVENTOR(S): MASATAKA YAMASHITA ET AL.

It is certified that error appears in the above-identified patent and that said Letters Patent is hereby corrected as shown below:

<u>COLUMN 56</u>
Line 8, "$-R_{26a}$" should read -- $-R_{28a}$ --;
Line 13, "$-O_{26a}$" should read -- $-OR_{28a}$ --;
Line 19, "$-O_{26a}$" should read -- $-OR_{28a}$ --;
Line 23, "$-R_{26a}$" should read -- $-R_{28a}$ --;
Line 29, "$OR_{26a}$" should read -- $OR_{28a}$ --;
Line 33, "$OR_{26a}$" should read -- $OR_{28a}$ --.

Signed and Sealed this

Thirty-first Day of August, 1999

Q. TODD DICKINSON

*Attest:*

*Attesting Officer*  *Acting Commissioner of Patents and Trademarks*